US012670626B2

(12) United States Patent
Naganuma et al.

(10) Patent No.: US 12,670,626 B2
(45) Date of Patent: Jun. 30, 2026

(54) INFORMATION PROCESSING APPARATUS AND METHOD

(71) Applicant: Sony Group Corporation, Tokyo (JP)

(72) Inventors: Tomoya Naganuma, Kanagawa (JP); Satoru Kuma, Tokyo (JP); Hiroyuki Yasuda, Saitama (JP); Ohji Nakagami, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 334 days.

(21) Appl. No.: 18/683,053

(22) PCT Filed: Mar. 1, 2022

(86) PCT No.: PCT/JP2022/008514
§ 371 (c)(1),
(2) Date: Feb. 12, 2024

(87) PCT Pub. No.: WO2023/021742
PCT Pub. Date: Feb. 23, 2023

(65) Prior Publication Data
US 2024/0346704 A1 Oct. 17, 2024

(30) Foreign Application Priority Data
Aug. 20, 2021 (JP) ................................. 2021-134577

(51) Int. Cl.
*G06T 9/00* (2006.01)
(52) U.S. Cl.
CPC .................................... *G06T 9/001* (2013.01)
(58) Field of Classification Search
CPC .................................................... G06T 9/001
See application file for complete search history.

(56) References Cited

U.S. PATENT DOCUMENTS 10,757,422 B2 * 8/2020 Ohgose ................ H04N 19/176

FOREIGN PATENT DOCUMENTS

WO WO 2019/065297 A1 4/2019
WO WO 2019/240215 A1 12/2019

OTHER PUBLICATIONS

Liu et al, "Unsupervised Learning for Intrinsic Image Decomposition from a Single Image", 2020, IEEE/CVF conference on computer vision and pattern recognition, pp. 3248-3257 (Year: 2020).*

(Continued)

*Primary Examiner* — David F Dunphy
(74) *Attorney, Agent, or Firm* — Paratus Law Group, PLLC

(57) ABSTRACT

There is provided an information processing apparatus and method to make it possible to reduce a decrease in encoding efficiency. A predictive residual that is a difference between a reflected light intensity that is attribute data of a point cloud representing an object having a three-dimensional shape as a set of points and a predicted value of the reflected light intensity generated by using a reflection model of light on a surface of the object is generated by decoding encoded data of the predictive residual, a coefficient of the reflection model is derived, a predicted value is derived by performing prediction processing by using the reflection model and the coefficient, and the reflected light intensity is generated by adding the predictive residual obtained by decoding the encoded data and the derived predicted value. The present disclosure can be applied to, for example, an information processing apparatus, an electronic device, an image processing method, a program or the like.

20 Claims, 30 Drawing Sheets

(56) References Cited

OTHER PUBLICATIONS

Paul et al, "Reflectance Prediction Modelling for Residual-Based Hyperspectral Image Coding", 2016, PLOS ONE | DOI: 10.1371/journal.pone.0161212 (16 PAGES) (Year: 2016).*

Information technology—MPEG-I (Coded Representation of Immersive Media)—Part 9: Geometry-based Point Cloud Compression, CD stage, ISO/IEC JTC 1/SC 29/WG 11, 2019, pp. 1-123, ISO/IEC 23090-9:2019(E).

Tatoglu et al., Point Cloud Segmentation with LIDAR Reflection Intensity Behavior, 2012 IEEE International Conference on Robotics and Automation, 2012, pp. 786-790.

Information technology—MPEG-I (Coded Representation of Immersive Media)—Part 9: Geometry-based Point Cloud Compression, DIS stage, ISO/IEC JTC 1/SC 29/WG 11, 2020, pp. 1-154, ISO/IEC 23090-9:2020(E).

Anonymous: "G-PCC codec description", WG7, MPEG 3D Graphics Coding, ISO IEC JTC 1/SC 29/WG 7, N0011, Oct. 31, 2020, pp. 1-149.

* cited by examiner

*FIG. 1*

| REFLECTED LIGHT INTENSITY | PREDICTED VALUE | RESIDUAL |
|---|---|---|
| 120 | intra | 120 |
| 130 | 120 | 10 |
| 140 | 130 | 10 |
| 200 | 140 | 60 |
| 180 | 200 | -20 |
| 140 | 180 | -40 |

FIG. 2

| 1 | DERIVE PREDICTED VALUE OF REFLECTED LIGHT INTENSITY BY USING REFLECTION MODEL |
|---|---|
| 1 — 1 | REFLECTION MODEL |
|  | DIFFUSE REFLECTION MODEL |
|  | SPECULAR REFLECTION MODEL |
| 1 — 2 | DIFFUSE REFLECTION COEFFICIENT kd |
|  | ESTIMATE DIFFUSE REFLECTION COEFFICIENT kd OF TARGET POINT FROM DIFFUSE REFLECTION COEFFICIENT kd OF NEIGHBOR POINT |
|  | DIFFUSE REFLECTION COEFFICIENT kd OF NEAREST NEIGHBOR POINT |
|  | DIFFUSE REFLECTION COEFFICIENT kd OF NEIGHBOR POINT WITHIN RADIUS r |
|  | DIFFUSE REFLECTION COEFFICIENT kd OF NEIGHBOR POINT ACCORDING TO RELATION IN PredTree |
|  | APPLY DIFFUSE REFLECTION COEFFICIENT kd OF TRANSMITTED TARGET POINT |
|  | ALWAYS TRANSMITTED (FOR EACH POINT) |
|  | TRANSMITTED AT REGULAR INTERVALS |
|  | TRANSMITTED WHEN PREDETERMINED CONDITION IS SATISFIED |
|  | TRANSMITTED ONLY FOR FIRST TARGET POINT |
|  | SWITCH BETWEEN ESTIMATION OF DIFFUSE REFLECTION COEFFICIENT AND APPLICATION OF TRANSMITTED DIFFUSE REFLECTION COEFFICIENT, ACCORDING TO CONDITION |
|  | PERFORM ESTIMATION IF THERE IS NEIGHBOR POINT WITHIN RADIUS r, AND IF NOT, APPLY TRANSMITTED DIFFUSE REFLECTION COEFFICIENT kd |
| 1 — 3 | DISTANCE ATTENUATION COEFFICIENT Zatt |
|  | DERIVE BY UTILIZING MODEL OF DISTANCE ATTENUATION |
|  | DERIVE BY USING TABLE PREPARED IN ADVANCE |

FIG. 3

| 1 — 4 | INCIDENT ANGLE θ |
|---|---|
| | CALCULATE BY USING NORMAL VECTOR AND INCIDENT VECTOR |
| 1 — 4 — 1 | INCIDENT VECTOR |
| | APPLY TRANSMITTED INCIDENT VECTOR |
| 1 — 4 — 2 | NORMAL VECTOR |
| | ESTIMATE FROM GEOMETRY |
| | ESTIMATE FROM DECODED GEOMETRY |
| | ESTIMATE FROM GEOMETRIES OF k NUMBER OF NEIGHBOR POINTS |
| | ESTIMATE FROM GEOMETRY OF NEIGHBOR POINT ACCORDING TO RELATION IN PredTree |
| | APPLY TRANSMITTED NORMAL VECTOR |
| 1 — 5 | APPLY SPECULAR REFLECTION MODEL |
| 1 — 5 — 1 | SPECULAR REFLECTION COEFFICIENT ks |
| | CONSTANT |
| | ESTIMATE BY SETTING UP TWO SIMULTANEOUS EQUATIONS FROM TWO NEIGHBOR POINTS |
| | APPLY TRANSMITTED SPECULAR REFLECTION COEFFICIENT ks |
| 1 — 5 — 2 | SWITCH REFLECTION MODEL TO BE APPLIED |
| | ON BASIS OF CONDITION, SELECT REFLECTION MODEL TO BE APPLIED |
| | SELECT ON BASIS OF WHETHER OR NOT INCIDENT ANGLE IS CLOSE TO ANGLE OF NORMAL VECTOR |
| | SELECT ON BASIS OF TRANSMITTED CONTROL FLAG |

FIG. 4

| 2 | DERIVE PREDICTED VALUE OF REFLECTED LIGHT INTENSITY BY USING REFLECTION MODEL | | |
|---|---|---|---|
| 2－1 | REFLECTION MODEL | | |
| | DIFFUSE REFLECTION MODEL | | |
| | SPECULAR REFLECTION MODEL | | |
| 2－2 | DIFFUSE REFLECTION COEFFICIENT kd | | |
| | ESTIMATE DIFFUSE REFLECTION COEFFICIENT kd OF TARGET POINT FROM DIFFUSE REFLECTION COEFFICIENT kd OF NEIGHBOR POINT | | |
| | | DIFFUSE REFLECTION COEFFICIENT kd OF NEAREST NEIGHBOR POINT | |
| | | DIFFUSE REFLECTION COEFFICIENT kd OF NEIGHBOR POINT WITHIN RADIUS r | |
| | | DIFFUSE REFLECTION COEFFICIENT kd OF NEIGHBOR POINT ACCORDING TO RELATION IN PredTree | |
| | TRANSMIT DIFFUSE REFLECTION COEFFICIENT kd OF TARGET POINT | | |
| | | ALWAYS TRANSMITTED (FOR EACH POINT) | |
| | | TRANSMITTED AT REGULAR INTERVALS | |
| | | TRANSMITTED WHEN PREDETERMINED CONDITION IS SATISFIED | |
| | | TRANSMITTED ONLY FOR FIRST TARGET POINT | |
| | SWITCH BETWEEN ESTIMATION AND TRANSMISSION OF DIFFUSE REFLECTION COEFFICIENT, ACCORDING TO CONDITION | | |
| | | PERFORM ESTIMATION IF THERE IS NEIGHBOR POINT WITHIN RADIUS r, AND IF NOT, TRANSMIT | |
| 2－3 | DISTANCE ATTENUATION COEFFICIENT Zatt | | |
| | DERIVE BY UTILIZING MODEL OF DISTANCE ATTENUATION | | |
| | DERIVE BY USING TABLE PREPARED IN ADVANCE | | |

FIG. 5

| 2—4 | INCIDENT ANGLE θ | | |
| --- | --- | --- | --- |
| | CALCULATE BY USING NORMAL VECTOR AND INCIDENT VECTOR | | |
| 2—4—1 | INCIDENT VECTOR | | |
| | KNOWN | | |
| 2—4—2 | NORMAL VECTOR | | |
| | ESTIMATE FROM GEOMETRY | | |
| | ESTIMATE FROM DECODED GEOMETRY | | |
| | | ESTIMATE FROM GEOMETRIES OF k NUMBER OF NEIGHBOR POINTS | |
| | | ESTIMATE FROM GEOMETRY OF NEIGHBOR POINT ACCORDING TO RELATION IN PredTree | |
| | TRANSMIT | | |
| 2—5 | APPLY SPECULAR REFLECTION MODEL | | |
| 2—5—1 | SPECULAR REFLECTION COEFFICIENT ks | | |
| | CONSTANT | | |
| | ESTIMATE BY SETTING UP TWO SIMULTANEOUS EQUATIONS FROM TWO NEIGHBOR POINTS | | |
| | TRANSMIT | | |
| 2—5—2 | SWITCH REFLECTION MODEL TO BE APPLIED | | |
| | ON BASIS OF CONDITION, SELECT REFLECTION MODEL TO BE APPLIED | | |
| | | SELECT ON BASIS OF WHETHER OR NOT INCIDENT ANGLE IS CLOSE TO ANGLE OF NORMAL VECTOR | |
| | TRANSMIT CONTROL FLAG | | |

*FIG. 8*

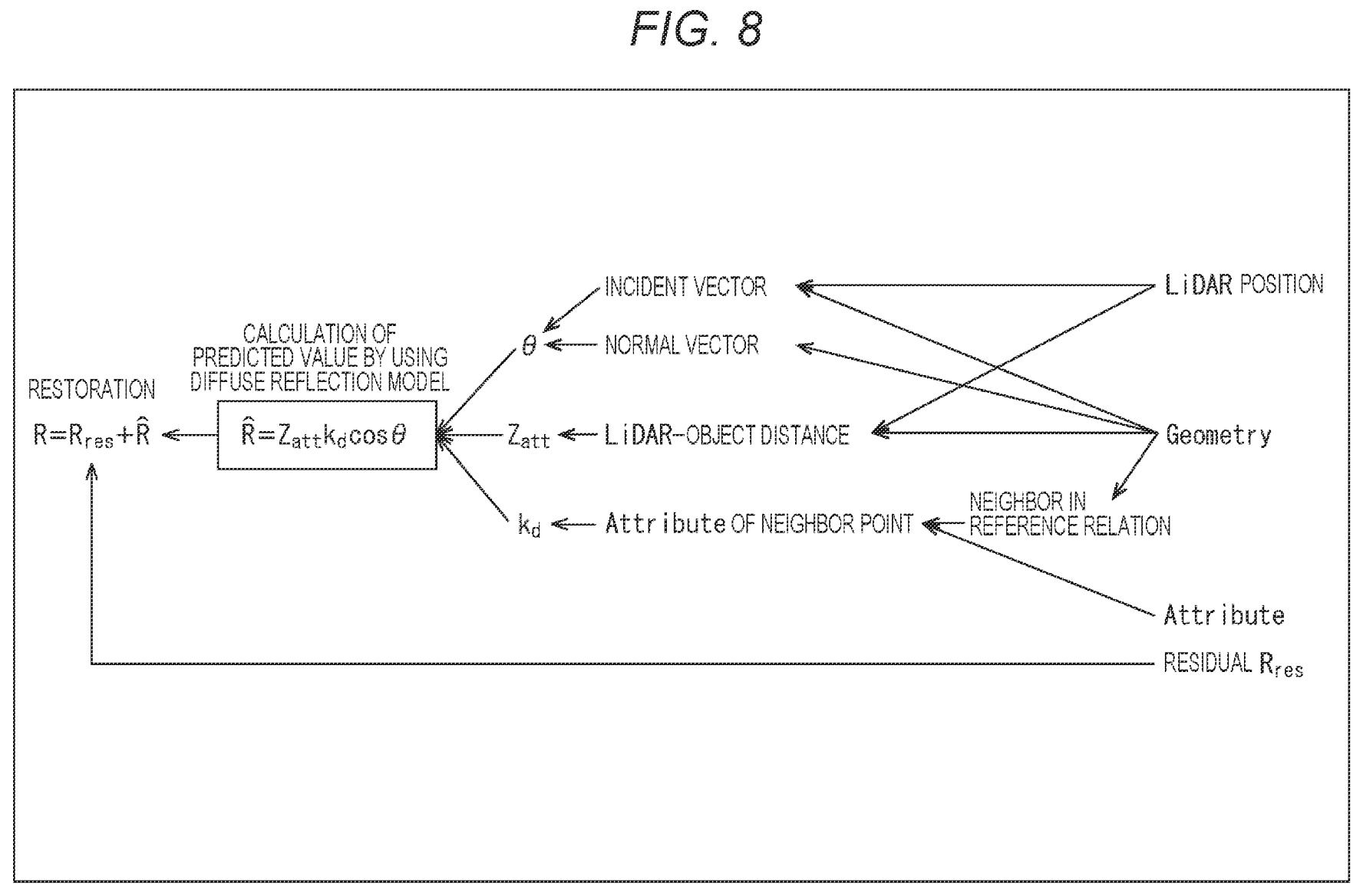

LiDAR POSITION

Geometry

Attribute

RESIDUAL $R_{res}$

NEIGHBOR IN REFERENCE RELATION

INCIDENT VECTOR

NORMAL VECTOR $\theta$ $Z_{att}$ ← LiDAR–OBJECT DISTANCE $k_d$ ← Attribute OF NEIGHBOR POINT

CALCULATION OF PREDICTED VALUE BY USING DIFFUSE REFLECTION MODEL $$\hat{R} = Z_{att} k_d \cos \theta$$

RESTORATION $$R = R_{res} + \hat{R}$$

Figure 14:
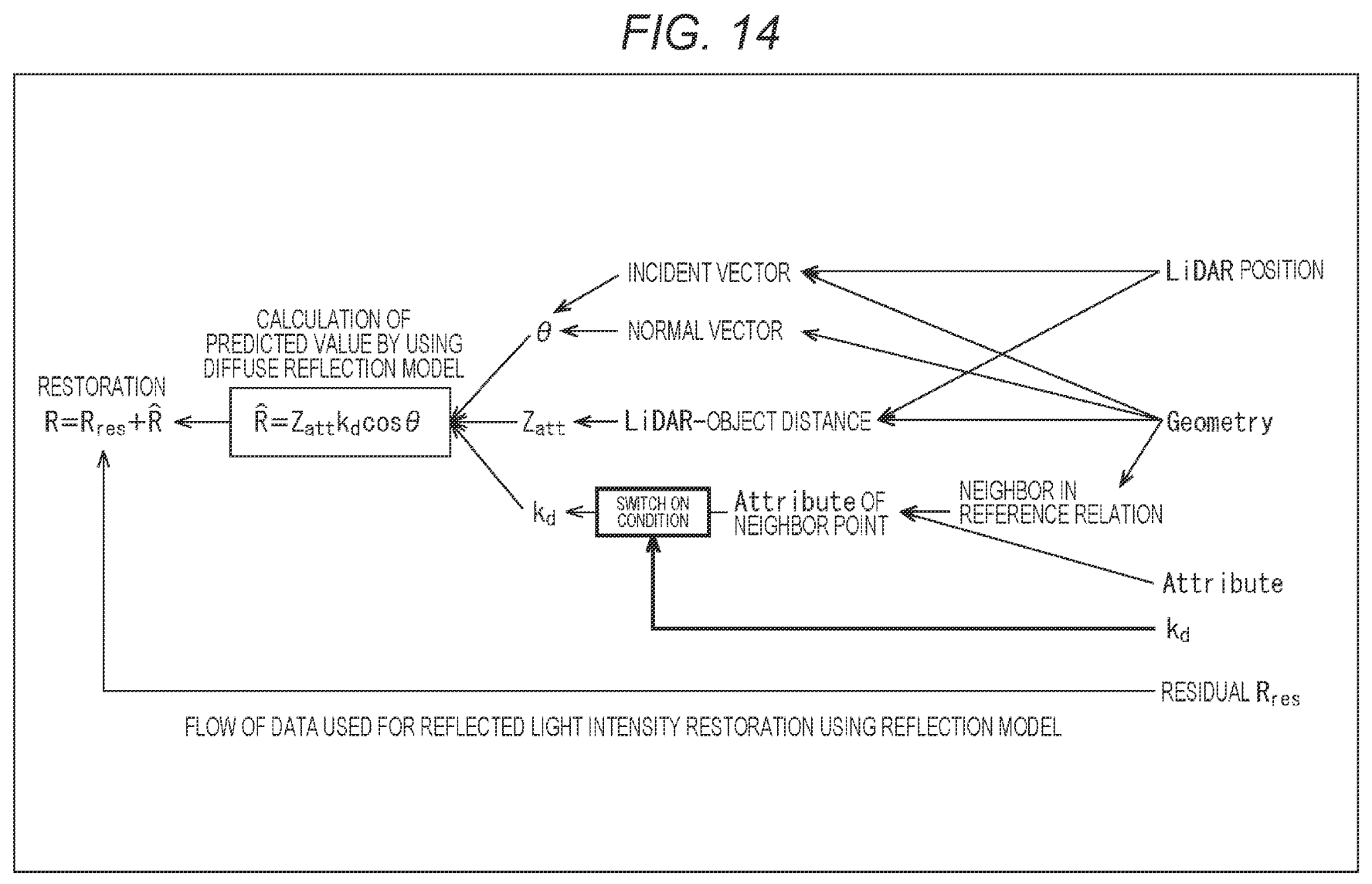

LiDAR POSITION

Geometry

Attribute $k_d$

RESIDUAL $R_{res}$

INCIDENT VECTOR

NORMAL VECTOR

LiDAR-OBJECT DISTANCE

NEIGHBOR IN REFERENCE RELATION

Attribute OF NEIGHBOR POINT $\theta$ $Z_{att}$ $k_d$

SWITCH ON CONDITION

CALCULATION OF PREDICTED VALUE BY USING DIFFUSE REFLECTION MODEL $\hat{R} = Z_{att} k_d \cos \theta$ RESTORATION $R = R_{res} + \hat{R}$ FLOW OF DATA USED FOR REFLECTED LIGHT INTENSITY RESTORATION USING REFLECTION MODEL

Figure 19:
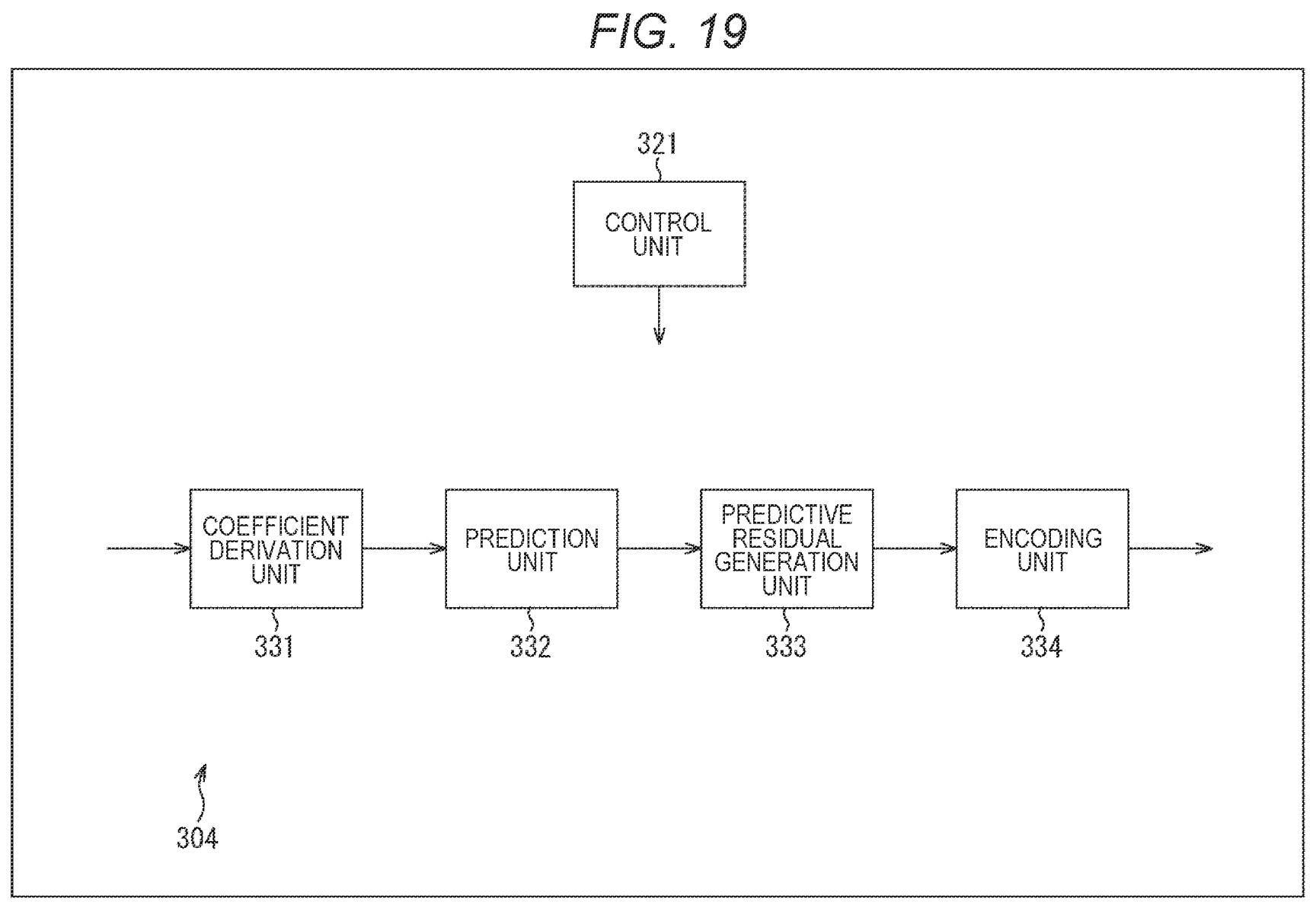

321 CONTROL UNIT

331 COEFFICIENT DERIVATION UNIT

332 PREDICTION UNIT

333 PREDICTIVE RESIDUAL GENERATION UNIT

334 ENCODING UNIT

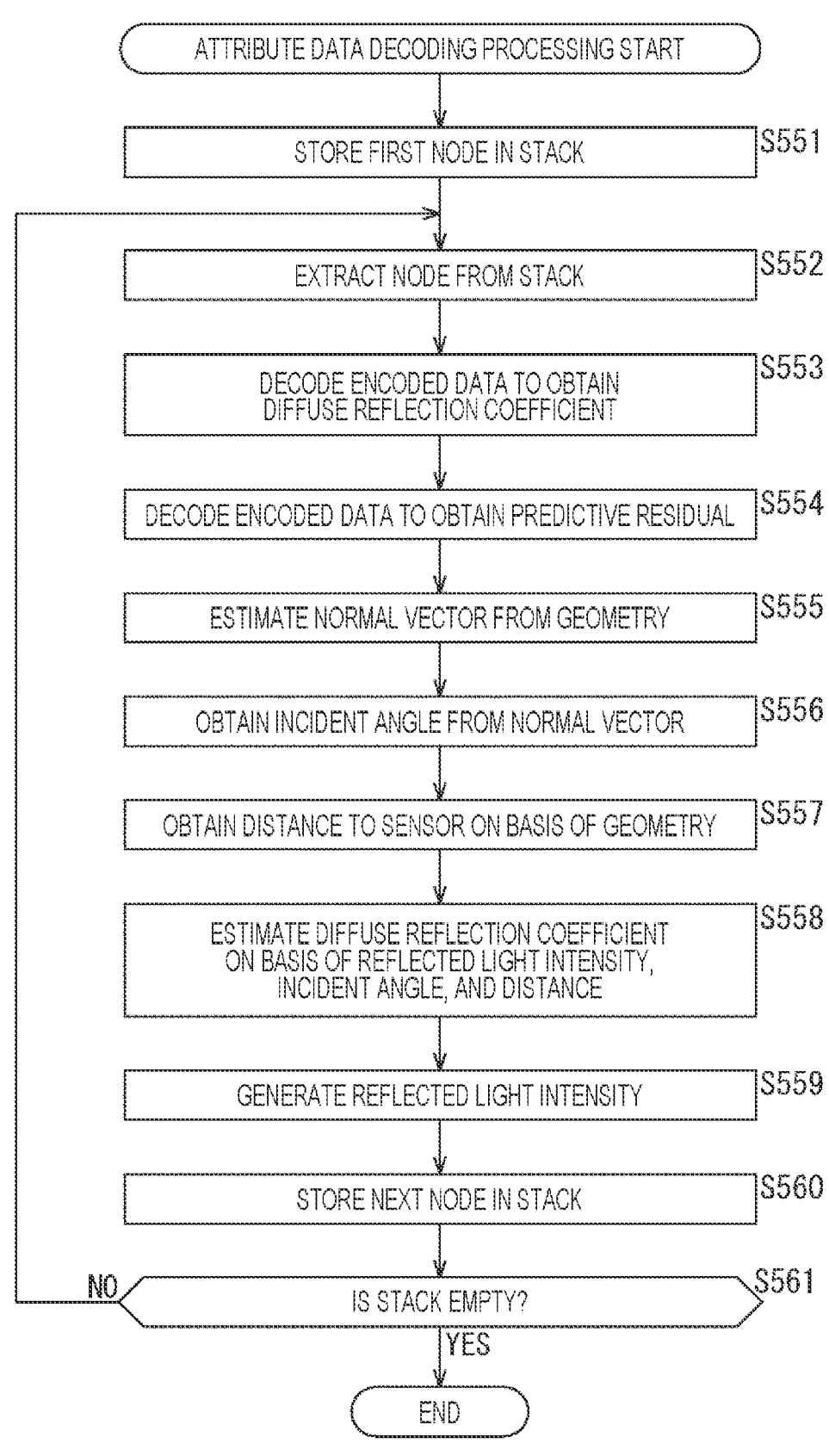

ATTRIBUTE DATA DECODING PROCESSING START

STORE FIRST NODE IN STACK — S551

EXTRACT NODE FROM STACK — S552

DECODE ENCODED DATA TO OBTAIN DIFFUSE REFLECTION COEFFICIENT — S553

DECODE ENCODED DATA TO OBTAIN PREDICTIVE RESIDUAL — S554

ESTIMATE NORMAL VECTOR FROM GEOMETRY — S555

OBTAIN INCIDENT ANGLE FROM NORMAL VECTOR — S556

OBTAIN DISTANCE TO SENSOR ON BASIS OF GEOMETRY — S557

ESTIMATE DIFFUSE REFLECTION COEFFICIENT ON BASIS OF REFLECTED LIGHT INTENSITY, INCIDENT ANGLE, AND DISTANCE — S558

GENERATE REFLECTED LIGHT INTENSITY — S559

STORE NEXT NODE IN STACK — S560

IS STACK EMPTY? — S561

NO

YES

END

*FIG. 30*

INFORMATION PROCESSING APPARATUS AND METHOD

CROSS REFERENCE TO PRIOR APPLICATION

This application is a National Stage Patent Application of PCT International Patent Application No. PCT/JP2022/008514 (filed on Mar. 1, 2022) under 35 U.S.C. § 371, which claims priority to Japanese Patent Application No. 2021-134577 (filed on Aug. 20, 2021), which are all hereby incorporated by reference in their entirety.

TECHNICAL FIELD

The present disclosure relates to an information processing apparatus and method, and more particularly relates to an information processing apparatus and method capable of reducing a decrease in encoding efficiency.

BACKGROUND ART

Conventionally, there has been a light detection and ranging (LiDAR), which is sensing technology for irradiating a real space with laser light and detecting a distance to an object, a property of the object, and the like. With such sensing technology, for example, 3D data having a three-dimensional structure such as data of a reflected light intensity for each three-dimensional position (that is, a reflected light intensity distribution in a 3D space) is obtained as sensor data. Then, it has been considered to represent this reflected light intensity distribution as attribute data (attribute information) of a point cloud representing an object having a three-dimensional shape as a set of points (refer to Non-Patent Document 1, for example).

Such 3D data generally has a large amount of information, and thus is required to be compressed (encoded) for recording and reproduction, transmission, and the like. For example, in a case of geometry-based point cloud compression (G-PCC), the attribute data is encoded by predictive coding utilizing correlations between neighbor points (refer to Non-Patent Document 2, for example).

CITATION LIST

Non-Patent Document

Non-Patent Document 1: A. Tatoglu and K. Pochiraju, "Point cloud segmentation with LIDAR reflection intensity behavior,", 2012 IEEE International Conference on Robotics and Automation, 2012, pp. 786-790
Non-Patent Document 2: "G-PCC Future Enhancements", ISO/IEC 23090-9:2019 (E), ISO/IEC JTC 1/SC 29/WG 11 N18887, 2019 Dec. 20

SUMMARY OF THE INVENTION

Problems to be Solved by the Invention

However, for example, when the object has an irregular surface, the reflected light intensity varies greatly even if distances between the points are short, by which prediction accuracy may decrease, and encoding efficiency may decrease.

The present disclosure has been made in view of such a situation, and an object thereof is to make it possible to reduce a decrease in encoding efficiency.

Solutions to Problems

An information processing apparatus according to one aspect of the present technology includes a decoding unit that generates a predictive residual that is a difference between a reflected light intensity that is attribute data of a point cloud representing an object having a three-dimensional shape as a set of points and a predicted value of the reflected light intensity generated by using a reflection model of light on a surface of the object, by decoding encoded data of the predictive residual, a coefficient derivation unit that derives a coefficient of the reflection model, a prediction unit that derives the predicted value by performing prediction processing by using the reflection model and the coefficient, and a generation unit that generates the reflected light intensity by adding the predictive residual obtained by the decoding unit and the predicted value derived by the prediction unit.

An information processing method according to one aspect of the present technology includes generating a predictive residual that is a difference between a reflected light intensity that is attribute data of a point cloud representing an object having a three-dimensional shape as a set of points and a predicted value of the reflected light intensity generated by using a reflection model of light on a surface of the object, by decoding encoded data of the predictive residual, deriving a coefficient of the reflection model, deriving the predicted value by performing prediction processing by using the reflection model and the coefficient, and generating the reflected light intensity by adding the predictive residual obtained by decoding the encoded data and derived the predicted value.

An information processing apparatus according to another aspect of the present technology includes a coefficient derivation unit that derives a coefficient of a reflection model of light on a surface of an object having a three-dimensional shape, a prediction unit that derives a predicted value of a reflected light intensity that is attribute data of a point cloud representing the object as a set of points, by performing prediction processing by using the reflection model and the coefficient, a generation unit that generates a predictive residual that is a difference between the reflected light intensity and the predicted value derived by the prediction unit, and an encoding unit that encodes the predictive residual generated by the generation unit.

An information processing method according to another aspect of the present technology includes deriving a coefficient of a reflection model of light on a surface of an object having a three-dimensional shape, deriving a predicted value of a reflected light intensity that is attribute data of a point cloud representing the object as a set of points, by performing prediction processing by using the reflection model and the coefficient, generating a predictive residual that is a difference between the reflected light intensity and derived the predicted value, and encoding generated the predictive residual.

In the information processing apparatus and method according to one aspect of the present technology, a predictive residual that is a difference between a reflected light intensity that is attribute data of a point cloud representing an object having a three-dimensional shape as a set of points and a predicted value of the reflected light intensity generated by using a reflection model of light on a surface of the object is generated by decoding encoded data of the predictive residual, a coefficient of the reflection model is derived, a predicted value is derived by performing prediction processing by using the reflection model and the coefficient, and the reflected light intensity is generated by adding the predictive residual obtained by decoding the encoded data and the derived predicted value.

In the information processing apparatus and method according to another aspect of the present technology, a coefficient of a reflection model of light on a surface of an object having a three-dimensional shape is derived, a predicted value of a reflected light intensity that is attribute data of a point cloud representing the object as a set of points is derived by performing prediction processing by using the reflection model and the coefficient, a predictive residual that is a difference between the reflected light intensity and the derived predicted value is generated, and the generated predictive residual is encoded.

BRIEF DESCRIPTION OF DRAWINGS

FIG. 1 is a diagram describing an example of predictive coding utilizing correlations between neighbor points.

FIG. 2 is a diagram describing an example of predictive decoding using the reflection model.

FIG. 3 is a diagram describing an example of predictive decoding using a reflection model.

FIG. 4 is a diagram describing an example of predictive coding using the reflection model.

FIG. 5 is a diagram describing an example of predictive coding using a reflection model.

FIG. 8 is a diagram describing an example of predictive decoding using a reflection model when a diffuse reflection coefficient of a target point is estimated on the basis of a diffuse reflection coefficient of a neighbor point.

FIG. 13 is a diagram describing an example of predictive decoding using a reflection model when a transmitted diffuse reflection coefficient is applied.

FIG. 14 is a diagram describing an example of predictive decoding using a reflection model when a method for deriving a diffuse reflection coefficient is switched.

FIG. 15 is a diagram describing an example of predictive decoding using a reflection model when a transmitted normal vector is applied.

FIG. 19 is a block diagram illustrating a main configuration example of an attribute data encoding unit.

FIG. 28 is a flowchart describing an example of a flow of attribute data decoding processing.

FIG. 30 is a block diagram illustrating a main configuration example of a computer.

MODE FOR CARRYING OUT THE INVENTION

Figure 6:
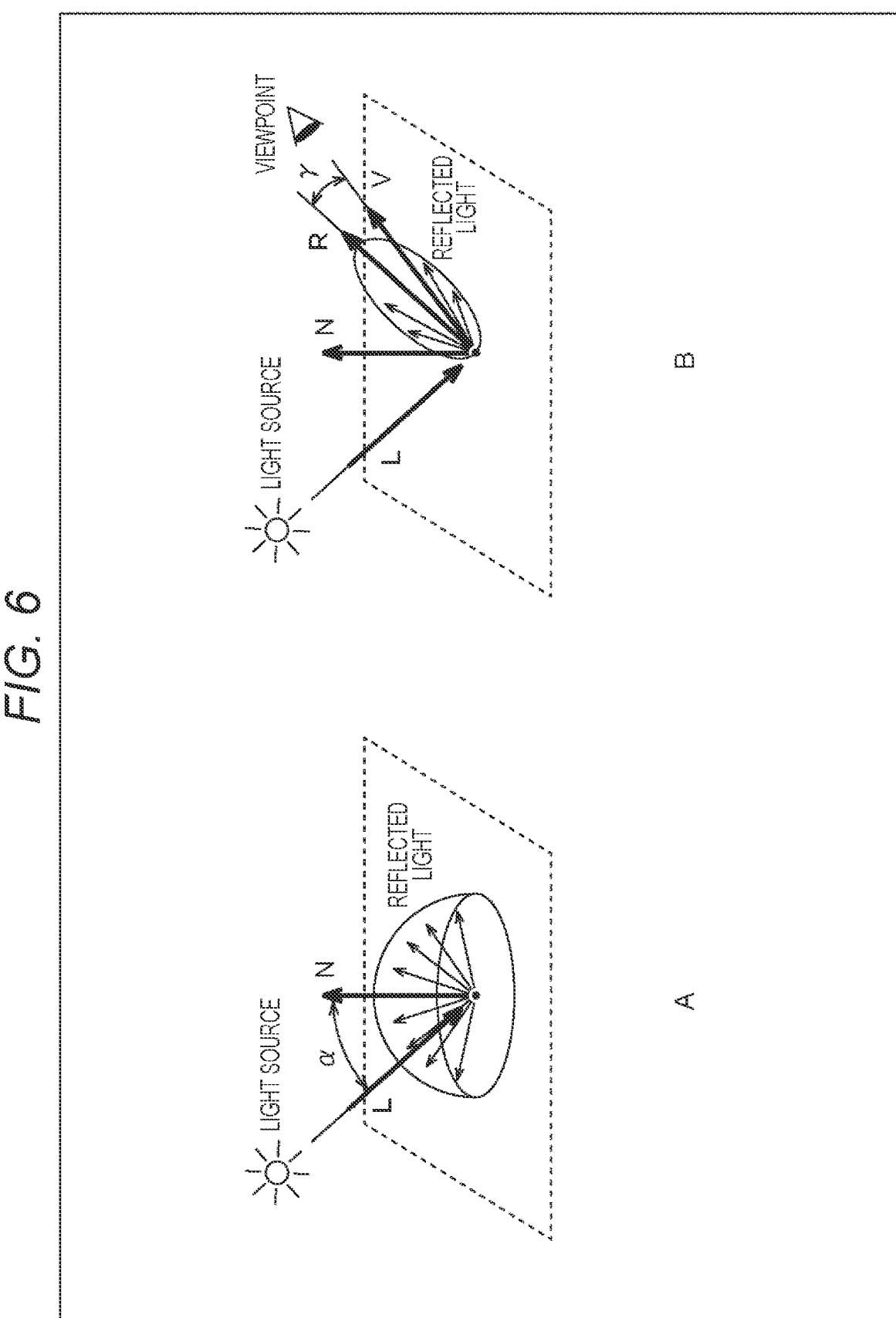
FIG. 6 is a diagram describing examples of a reflection model.

Hereinafter, modes for carrying out the present disclosure (hereinafter referred to as embodiments) will be described. Note that the description will be given in the following order.

1. Encoding and decoding of LiDAR data
2. Predictive coding and predictive decoding using reflection model
3. First embodiment (encoding apparatus)
4. Second embodiment (decoding apparatus)
5. Supplementary Note

1. Encoding and Decoding of LiDAR Data

Documents and the Like that Support Technical Contents and Technical Terms

The scope disclosed in the present technology includes, in addition to the contents disclosed in the embodiments, contents described in following Non-Patent Documents and the like known at the time of filing, the contents of other documents referred to in following Non-Patent Documents and the like.

Non-Patent Document 1: (described above)

Non-Patent Document 2: (described above)

That is, the contents described in the above-described Non-Patent Documents, the contents of other documents referred to in the above-described Non-Patent Documents, and the like are also basis for determining the support requirement.

<LiDAR Data>

Conventionally, there has been a light detection and ranging (LiDAR), which is sensing technology for irradiating a real space with laser light and detecting a distance to an object, a property of the object, and the like. By the LiDAR, for example, information of a reflected light intensity for each three-dimensional position (that is, a reflected light intensity distribution in a 3D space) or the like is obtained as sensor data (also referred to as LiDAR data). Therefore, for example, as described in Non-Patent Document 1, it has been considered to represent this reflected light intensity distribution as attribute data (attribute information) of a point cloud representing an object having a three-dimensional shape as a set of points.

<Point Cloud>

Data of the point cloud (also referred to as point cloud data) includes position information (also referred to as a geometry) and attribute information (also referred to as an attribute) of each point. The attribute may include any information. For example, by using each reflected light intensity of the above-described LiDAR data (reflected light intensity distribution) as an attribute, and by using position information thereof as a geometry, the LiDAR data (reflected light intensity distribution) can be represented by a point cloud.

As described above, the point cloud has a relatively simple data structure, and can represent any three-dimensional structure with sufficient accuracy by using a sufficiently large number of points. That is, the LiDAR data (reflected light intensity distribution) can be easily represented. Furthermore, by increasing resolution, the LiDAR data (reflected light intensity distribution) can be represented with high accuracy.

<Compression of Point Cloud Data>

Such 3D data generally has a large amount of information, and thus is required to be compressed (encoded) for recording and reproduction, transmission, and the like. As a method for encoding point cloud data, for example, there is geometry-based point cloud compression (G-PCC) described in Non-Patent Document 2. In a case of the G-PCC, the attribute data is encoded by predictive coding utilizing correlations between neighbor points.

For example, a reference relation of neighbor points is constructed by using a distance between the points, and, by using an attribute of each of the neighbor points as a predicted value, a difference between an attribute of a target point and the predicted value is encoded (the difference is also referred to as a predictive residual). In general, the closer the distance between the points, the higher a correlation of the attributes. Therefore, by performing predictive coding as described above by using attributes of neighbor points, encoding efficiency can be improved as compared with a case where an attribute of each point is encoded as is.

Figure 1:
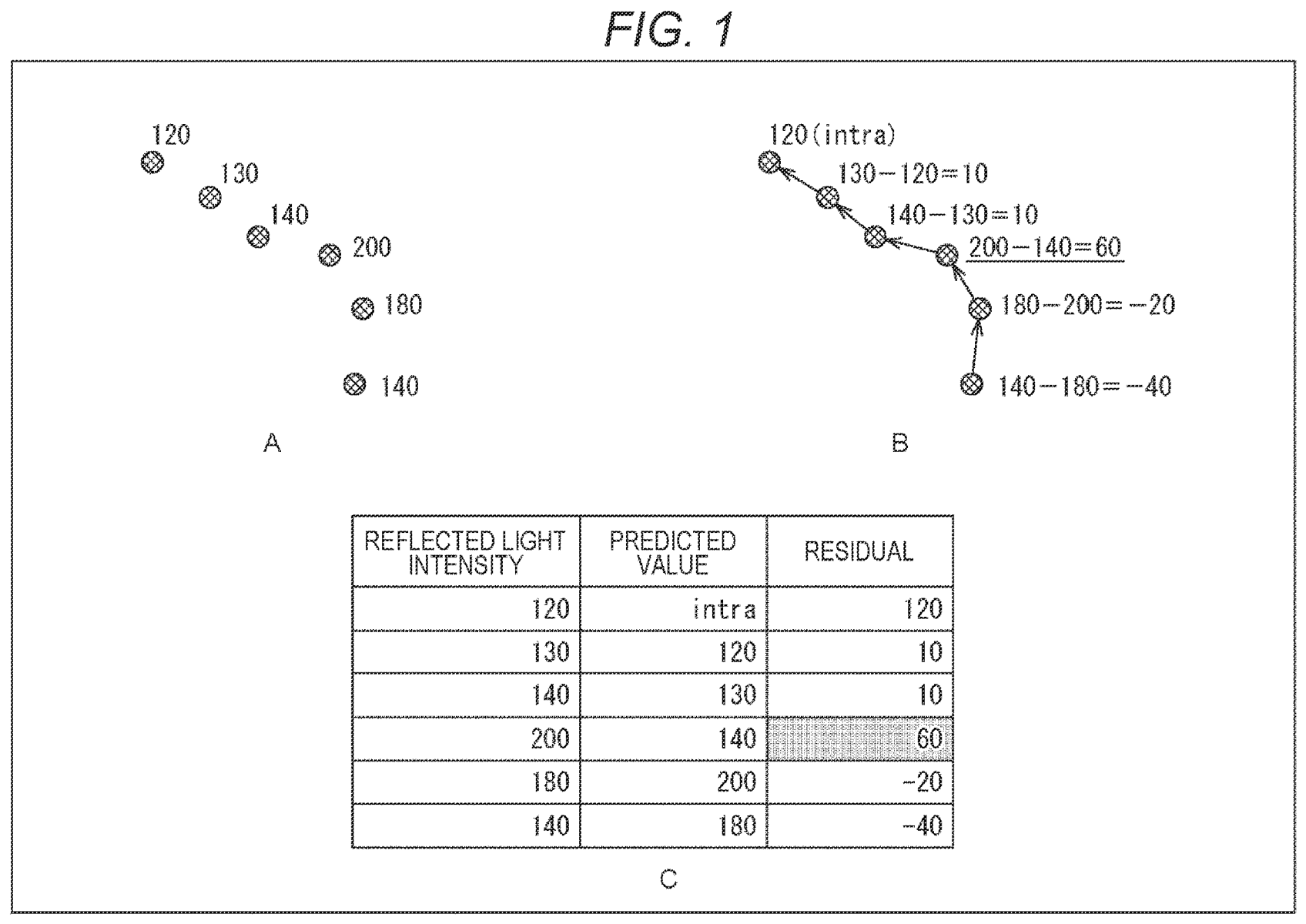

For example, it is assumed that there is point cloud data having reflected light intensities as attributes as illustrated in A of FIG. 1. In A of FIG. 1, black circles indicate a geometry (position information) of the points, and numbers in vicinity of the points indicate reflected light intensities at the respective points. When the reflected light intensity of each point is encoded, each value in a middle column of the table illustrated in C of FIG. 1 is encoded.

In a case of predictive coding of the G-PCC, as illustrated in B of FIG. 1, the reflected light intensity of each point is encoded as a difference from a reflected light intensity of the neighbor point. For example, the encoding is sequentially performed from a top point, and a point processed one before is set as a neighbor point. In this case, because there is no neighbor point for a first point from the top, the reflected light intensity thereof is encoded as is (intra). That is, a reflected light intensity "120" is encoded. Meanwhile, a reflected light intensity of a second point from the top is encoded with the first point from the top as the neighbor point. That is, a difference "10" is encoded. A difference (predictive residual) is similarly encoded for a third and subsequent points from the top. That is, each value in the rightmost column of the table illustrated in C of FIG. 1 is encoded.

Therefore, in the predictive coding of the G-PCC, values encoded can be smaller than values encoded in a case of encoding each point. That is, an increase in an amount of encoding is reduced, by which a decrease in encoding efficiency is reduced.

However, for example, when the object has an irregular surface, a reflected light intensity varies greatly even if a distance between the points is short. For example, in B of FIG. 1, a difference in reflected light intensity between the third point from the top and the fourth point from the top is larger than a difference between other points. That is, in such a case, prediction accuracy may decrease, and encoding efficiency may decrease. In addition, there has been a possibility that as the three-dimensional shape of the object is more complicated, prediction accuracy decreases, and encoding efficiency decreases.

2. Predictive Coding and Predictive Decoding Using Reflection Model

Therefore, predictive coding and predictive decoding are performed by using a light reflection model. That is, as illustrated in the top row of the table in FIG. 2, at a time of decoding, a predicted value of the reflected light intensity is derived by using the light reflection model.

For example, in an information processing method, a predictive residual that is a difference between a reflected light intensity that is attribute data of a point cloud representing an object having a three-dimensional shape as a set of points and a predicted value of the reflected light intensity generated by using a reflection model of light on a surface of the object is generated by decoding encoded data of the predictive residual, a coefficient of the reflection model is derived, a predicted value is derived by performing prediction processing by using the reflection model and the coefficient, and the reflected light intensity is generated by adding the predictive residual obtained by decoding the encoded data and the derived predicted value.

For example, an information processing apparatus includes a decoding unit that generates a predictive residual that is a difference between a reflected light intensity that is attribute data of a point cloud representing an object having a three-dimensional shape as a set of points and a predicted value of the reflected light intensity generated by using a reflection model of light on a surface of the object, by decoding encoded data of the predictive residual, a coefficient derivation unit that derives a coefficient of the reflection model, a prediction unit that derives the predicted value by performing prediction processing by using the reflection model and the coefficient, and a generation unit that generates the reflected light intensity by adding the predictive residual obtained by the decoding unit and the predicted value derived by the prediction unit.

Furthermore, as illustrated in the top row of the table in FIG. 4, at a time of encoding, a predicted value of the reflected light intensity is derived by using the light reflection model.

For example, in the information processing method, a coefficient of a reflection model of light on a surface of an object having a three-dimensional shape is derived, a predicted value of a reflected light intensity that is attribute data of a point cloud representing the object as a set of points is derived by performing prediction processing by using the reflection model and the coefficient, a predictive residual that is a difference between the reflected light intensity and the derived predicted value is generated, and the generated predictive residual is encoded.

For example, the information processing apparatus includes a coefficient derivation unit that derives a coefficient of a reflection model of light on a surface of an object having a three-dimensional shape, a prediction unit that derives a predicted value of a reflected light intensity that is attribute data of a point cloud representing the object as a set of points, by performing prediction processing by using the reflection model and the coefficient, a generation unit that generates a predictive residual that is a difference between the reflected light intensity and the predicted value derived by the prediction unit, and an encoding unit that encodes the predictive residual generated by the generation unit.

With this arrangement, it is possible to encode and decode, instead of a difference (predictive residual) in reflected light intensity from a neighbor point, a difference (predictive residual) between a reflected light intensity of a target point and a reflected light intensity derived by using a reflection model at the target point. Accordingly, an effect of orientation of the object surface on the predictive residual can be reduced. Therefore, it is possible to reduce a decrease in prediction accuracy due to a change in the orientation of the object surface, that is, to reduce a decrease in encoding efficiency.

<Diffuse Reflection Model>

Next, the reflection model will be described. First, a general reflection model will be described. For example, as illustrated in A of FIG. 6, when light is incident at an angle α (vector L) with respect to a normal vector N of a predetermined surface, the light is reflected in various directions. This is referred to as diffuse reflection. The Lambertian reflection model, which is one of light reflection models, is a diffuse reflection model in which such diffuse reflection is modeled. In the Lambertian reflection model, a reflected light intensity IR of diffuse reflection as in A of FIG. 6 can be expressed as the following mathematical formulas (1) and (2).

$$IR = Ia + Iin * kd * \cos\alpha \qquad (1)$$

$$\cos\alpha = \frac{N \cdot L}{|N||L|} \qquad (2)$$

Here, IR represents a reflected light intensity, Ia represents an ambient light intensity, Iin represents an incident light intensity, kd represents a diffuse reflection coefficient, N represents a normal line (normal vector) of a surface, and L represents a light incident direction (incident vector).

In a case of LiDAR data, incident light is laser light and can ideally be constant (Iin=1). Furthermore, because it is not easily affected by an ambient light component, the ambient light intensity can be ideally regarded as 0 (Ia=0). Furthermore, the laser light attenuates according to distance. That is, the reflected light intensity depends on a shape, material, and distance of an object surface on which the laser light is reflected.

Figure 7:
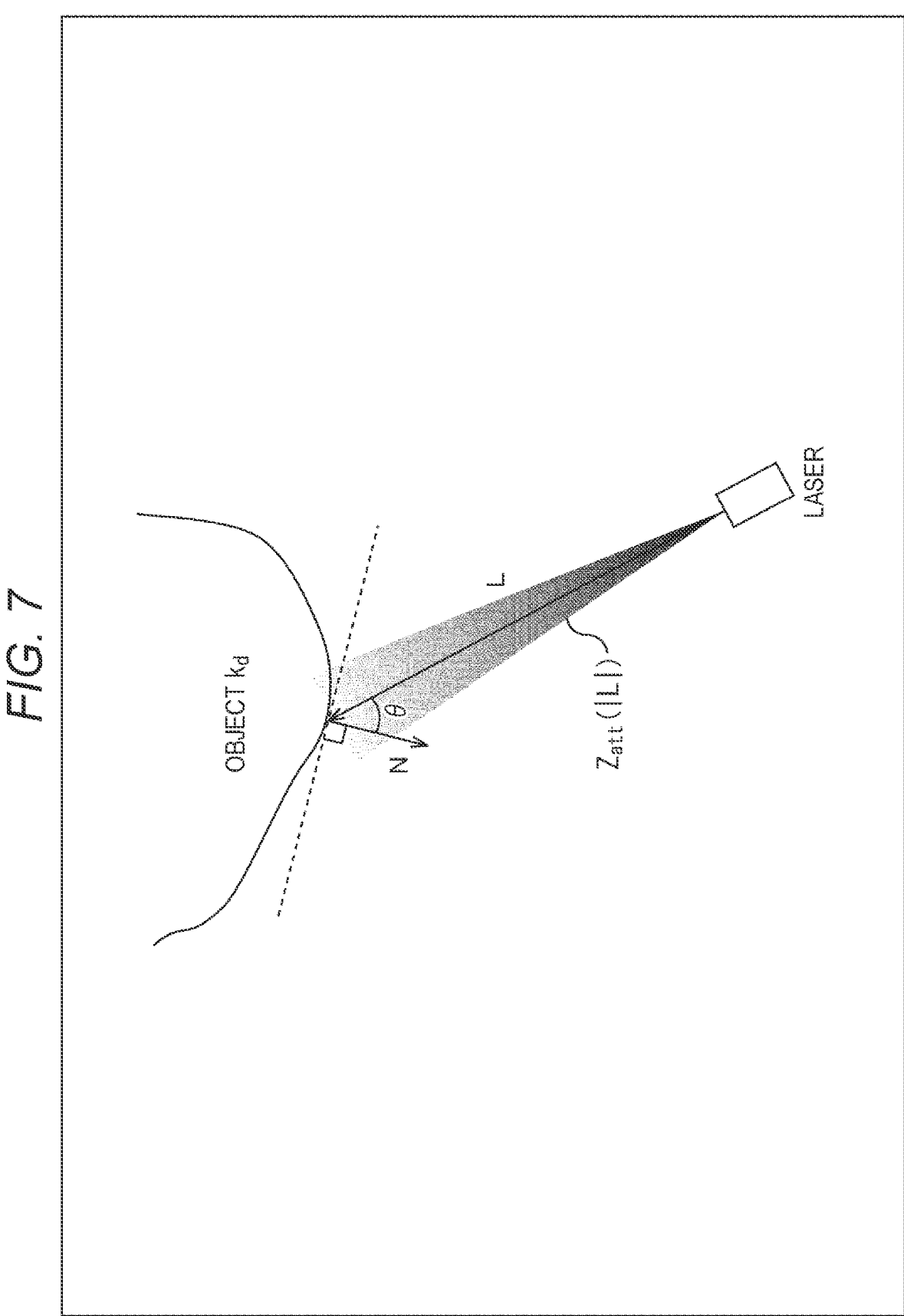
FIG. 7 is a diagram describing an example of a diffuse reflection model.

As illustrated in FIG. 7, the material of the object surface can be represented by a diffuse reflection coefficient kd.

A distance to the object surface can be represented by a distance attenuation Zatt of the laser light. Furthermore, the shape of the object surface can be represented by an incident angle θ of the laser light with respect to (a normal line of) the object surface.

That is, in a case of LiDAR data, a reflected light intensity R of diffuse reflection can be expressed by the following mathematical formulas (3) and (4).

$$R = Zatt * kd * \cos\theta \qquad (3)$$

$$\cos\theta = \frac{-L \cdot N}{|L||N|} \qquad (4)$$

As illustrated in the third row from the top of the table in FIG. 2, a diffuse reflection model as in the mathematical formulas (3) and (4) may be applied as the reflection model when deriving the predicted value in predictive decoding of the reflected light intensity of diffuse reflection. Then, in order to derive the predicted value, a diffuse reflection coefficient representing the material of the object surface, distance attenuation representing attenuation of the laser light emitted on the object surface, the attenuation being due to distance, and the incident angle of the laser light with respect to the object surface may be derived as coefficients of the diffuse reflection model.

Furthermore, as illustrated in the third row from the top of the table in FIG. 4, a diffuse reflection model as in the mathematical formulas (3) and (4) may be applied as the reflection model when deriving the predicted value in predictive coding of the reflected light intensity of diffuse reflection. Then, in order to derive the predicted value, a diffuse reflection coefficient representing the material of the object surface, distance attenuation representing attenuation of the laser light emitted on the object surface, the attenuation being due to distance, and the incident angle of the laser light with respect to the object surface may be derived as coefficients of the diffuse reflection model.

<Predictive Decoding>

In this case, in the predictive decoding of the reflected light intensity of the diffuse reflection, a decoder restores the reflected light intensity R as in the following mathematical formula (5), for example.

$$R = Rres + R' \qquad (5)$$

Here, Rres represents predictive residual. R' represents a predicted value of the reflected light intensity R.

That is, the decoder acquires a predictive residual Rres from an encoder, derives the predicted value R', and adds the predictive residual Rres and the predicted value R' to obtain the reflected light intensity R as in the mathematical formula (5). Here, the decoder derives the predicted value R' by using the diffuse reflection model, that is, the above-described mathematical formulas (3) and (4). That is, the decoder derives the predicted value R' by obtaining respective coefficients of the diffuse reflection model that are the diffuse reflection coefficient kd, the distance attenuation Zatt, and the incident angle θ.

<Predictive Coding>

In the predictive coding of the reflected light intensity of the diffuse reflection, the reflected light intensity R is known, and the predictive residual Rres is derived from the reflected light intensity R. For this purpose, the encoder derives the predicted value R' with a method similar to a method used by the decoder.

<Estimation of Diffuse Reflection Coefficient Kd>

Next, derivation of each coefficient will be described. First, the diffuse reflection coefficient kd will be described. The diffuse reflection coefficient kd is a parameter indicating a property related to diffusion of light on the object. That is, the diffuse reflection coefficient kd corresponds to the material of the object surface. Although details will be described later, the distance attenuation Zatt and the incident angle θ can be derived from a geometry, a LiDAR position (laser-light irradiation position), and the like.

Meanwhile, although it is difficult to derive the diffuse reflection coefficient kd from these pieces of information, it is possible to derive the diffuse reflection coefficient kd by using the mathematical formula (3). That is, if the reflected light intensity R is known, the diffuse reflection coefficient kd can be obtained. However, the reflected light intensity R is unknown in the decoder.

Therefore, as illustrated in the sixth row from the top of the table in FIG. 2, the decoder may estimate the diffuse reflection coefficient kd of the target point on the basis of the diffuse reflection coefficient kd of a neighbor point positioned in vicinity of the target point. That is, as illustrated in FIG. 8, to derive a reflected light intensity R of the target point, the decoder may obtain the diffuse reflection coefficient kd of the neighbor point by using a decoded reflected light intensity of the neighbor point and the mathematical formula (3), obtain the distance attenuation Zatt and the incident angle θ by estimating the diffuse reflection coefficient kd of the target point on the basis of the diffuse reflection coefficient kd of the neighbor point, derive the predicted value R' by using these coefficients and the mathematical formula (3), and add the predictive residual Rres transmitted from the encoder and the predicted value R'.

At that time, a method for estimating the diffuse reflection coefficient kd of the target point on the basis of the diffuse reflection coefficient kd of the neighbor point is arbitrary. For example, the decoder may regard the diffuse reflection coefficient kd of the target point the same as the diffuse reflection coefficient kd of the neighbor point (that is, the diffuse reflection coefficient kd of the neighbor point may be duplicated). When the distance between the target point and the neighbor point is short, there is a high possibility that materials of the object at both the points are the same, and therefore the diffuse reflection coefficient kd of the neighbor point and the diffuse reflection coefficient kd of the target point can be regarded as the same. Furthermore, the decoder may perform a predetermined calculation on the diffuse reflection coefficient kd of the neighbor point and regard a result of the calculation as the diffuse reflection coefficient kd of the target point.

In order that the decoder can restore the reflected light intensity R in this manner, the encoder derives the predicted value R' with a similar method, and derives the predictive residual Rres by using the predicted value R'. That is, as illustrated in the sixth row from the top of the table in FIG. 4, the encoder may estimate the diffuse reflection coefficient kd of the target point on the basis of the diffuse reflection coefficient kd of a neighbor point positioned in vicinity of the target point. That is, as in a case of FIG. 8, to derive the reflected light intensity R of the target point, the encoder may obtain the diffuse reflection coefficient kd of the neighbor point, which is processed before the target point, by using a reflected light intensity of the neighbor point and the mathematical formula (3), obtain the distance attenuation Zatt and the incident angle θ by estimating the diffuse reflection coefficient kd of the target point on the basis of the diffuse reflection coefficient kd of the neighbor point, derive the predicted value R' by using these coefficients and the mathematical formula (3), and add the predictive residual Rres transmitted from the encoder and the predicted value R'.

At that time, as in the case of the decoder, the method for estimating the diffuse reflection coefficient kd of the target point on the basis of the diffuse reflection coefficient kd of the neighbor point is arbitrary. For example, the encoder may duplicate the diffuse reflection coefficient kd of the neighbor point and regard the duplication as the diffuse reflection coefficient kd of the target point, or may perform a predetermined calculation on the diffuse reflection coefficient kd of the neighbor point and regard a result of the calculation as the diffuse reflection coefficient kd of the target point. However, it is necessary to apply the method similar to the method used by the decoder.

<Neighbor Point>

As described above, a definition of the neighbor point when the diffuse reflection coefficient kd of the target point is estimated on the basis of the diffuse reflection coefficient kd of the neighbor point is arbitrary.

For example, as illustrated in the seventh row from the top of the table in FIG. 2, the decoder may regard a nearest neighbor point, which is a point closest to the target point, as the neighbor point. That is, the decoder may estimate the diffuse reflection coefficient kd of the target point on the basis of the diffuse reflection coefficient kd of the nearest neighbor point (a point closest to the target point among decoded points). The estimation method in that case is arbitrary as described above.

In order that the decoder can restore the reflected light intensity R in this manner, the encoder also estimates the diffuse reflection coefficient kd of the target point with a similar method. That is, as illustrated in the seventh row from the top of the table in FIG. 4, the encoder may regard a nearest neighbor point, which is a point closest to the target point, as the neighbor point. That is, the encoder may estimate the diffuse reflection coefficient kd of the target point on the basis of the diffuse reflection coefficient kd of the nearest neighbor point (a point closest to the target point among points processed before the target point). The estimation method in that case is arbitrary as long as the method is similar to the method used by the decoder, as described above.

Furthermore, for example, as illustrated in the eighth row from the top of the table in FIG. 2, the decoder may regard a decoded point positioned within a radius r centered on the target point as the neighbor point. That is, the decoder may estimate the diffuse reflection coefficient kd of the target point on the basis of the diffuse reflection coefficient kd of the neighbor point positioned within a predetermined distance from the target point.

Figure 9:
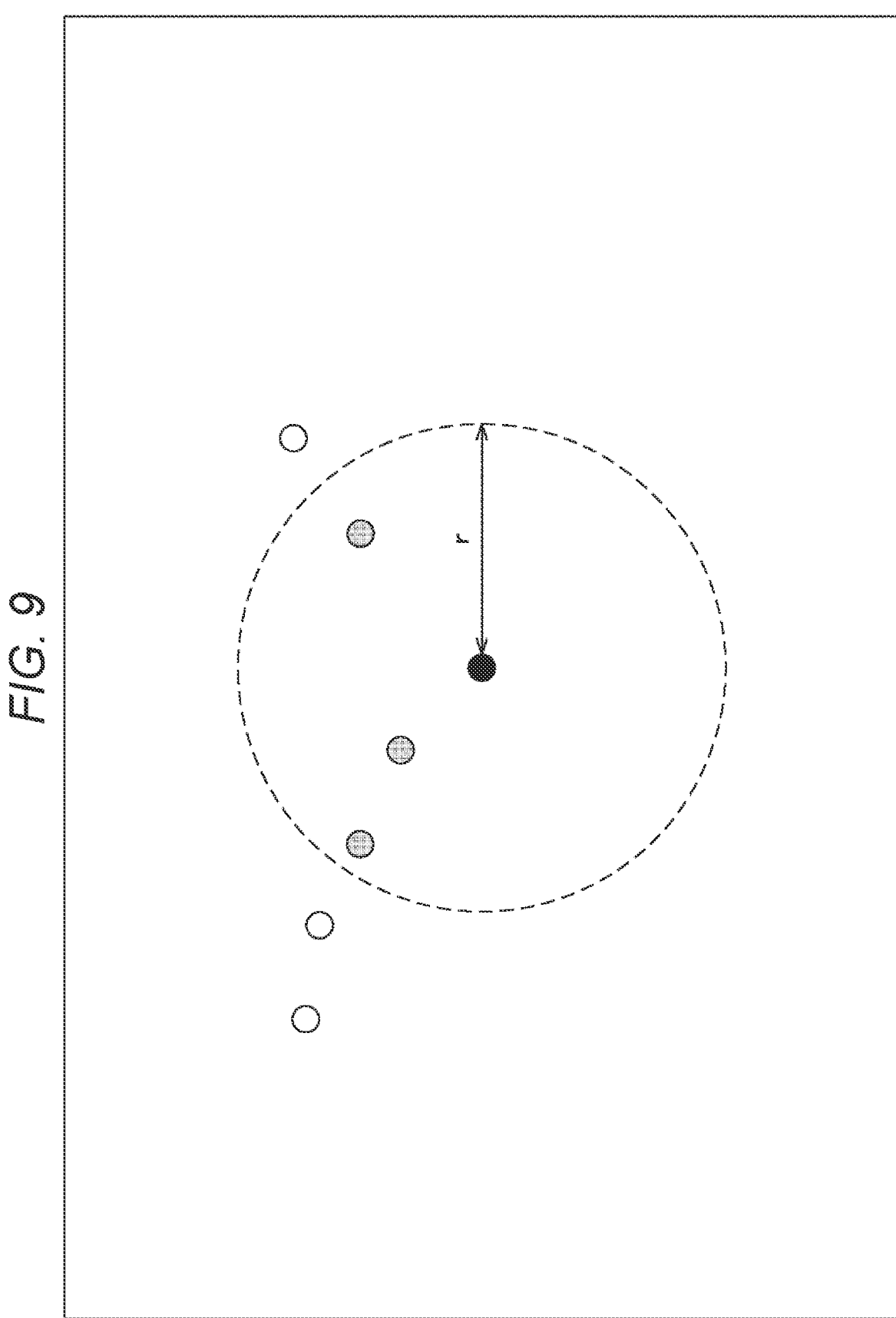
FIG. 9 is a diagram illustrating an example of neighbor points.

For example, when the black circle is used as the target point in FIG. 9, the decoder regards the gray points positioned within the radius r from the black circle as neighbor points. In this case, as illustrated in FIG. 9, a plurality of points can be set as neighbor points.

The estimation method in this case is arbitrary as described above. Furthermore, when there is a plurality of neighbor points, the decoder may duplicate a diffuse reflection coefficient kd of any one of the neighbor points and estimate the diffuse reflection coefficient kd of the target point. Furthermore, the decoder may perform a predetermined calculation on a diffuse reflection coefficient kd of any one of the plurality of neighbor points and regard a result of the calculation as the diffuse reflection coefficient kd of the target point. Moreover, the decoder may regard a result of calculation using diffuse reflection coefficients kd of the plurality of neighbor points (for example, a (weighted) average of the diffuse reflection coefficients kd of the plurality of neighbor points, or the like) as the diffuse reflection coefficient kd of the target point.

In this case also, the encoder also estimates the diffuse reflection coefficient kd of the target point with a similar method. That is, as illustrated in the eighth row from the top of the table in FIG. 4, the encoder may regard a point processed before the target point and positioned within the radius r centered on the target point as the neighbor point. That is, the encoder may estimate the diffuse reflection coefficient kd of the target point on the basis of the diffuse reflection coefficient kd of the neighbor point positioned within a predetermined distance from the target point.

The estimation method in this case is arbitrary as long as the method is similar to the method used by the decoder, as described above.

Furthermore, when there is a plurality of neighbor points, the encoder may duplicate a diffuse reflection coefficient kd of any one of the neighbor points and estimate the diffuse reflection coefficient kd of the target point. Furthermore, the encoder may perform a predetermined calculation on a diffuse reflection coefficient kd of any one of the plurality of neighbor points and regard a result of the calculation as the diffuse reflection coefficient kd of the target point. Moreover, the encoder may regard a result of calculation using diffuse reflection coefficients kd of the plurality of neighbor points (for example, a (weighted) average of the diffuse reflection coefficients kd of the plurality of neighbor points, or the like) as the diffuse reflection coefficient kd of the target point.

Furthermore, for example, as illustrated in the ninth row from the top of the table in FIG. 2, the decoder may regard a point close to the target point in a relation in PredTree as the neighbor point. The PredTree is a tree structure indicating, in encoding of attributes in a point cloud in the G-PCC or the like, a reference relation of the attributes. In such a reference relation, a point close to the target point may be regarded as the neighbor point. That is, the decoder may estimate the diffuse reflection coefficient kd of the target point on the basis of the diffuse reflection coefficient kd of the neighbor point in a predetermined reference relation determined in advance. The estimation method in that case is arbitrary as described above.

In this case also, the encoder also estimates the diffuse reflection coefficient kd of the target point with a similar method. That is, as illustrated in the ninth row from the top of the table in FIG. 4, the encoder may regard a point close to the target point in the relation in the PredTree as the neighbor point. That is, the encoder may estimate the diffuse reflection coefficient kd of the target point on the basis of the diffuse reflection coefficient kd of the neighbor point in the predetermined reference relation determined in advance. The estimation method in that case is arbitrary as long as the method is similar to the method used by the decoder, as described above.

<Derivation of Distance Attenuation>

Next, the distance attenuation Zatt will be described. The distance attenuation Zatt is a parameter corresponding to a distance from a LiDAR position (laser-light irradiation position) to the object surface. That is, as illustrated in FIG. 8, the distance attenuation Zatt can be derived by using information of the LiDAR position (laser-light irradiation position), a geometry of the object (target point), or the like.

For example, as illustrated in the 18th row from the top of the table in FIG. 2, according to a model of attenuation of light due to distance, the decoder may derive the distance attenuation Zatt corresponding to the distance from the LiDAR position to the object surface. Laser light in a LiDAR attenuates due to beam spreading and a medium in the air. Such an attenuation model may be applied.

Figure 10:
FIG. 10 is a diagram illustrating an example of a model of attenuation of light due to distance.

The light attenuation model is arbitrary. For example, as illustrated in FIG. 10, a model in which light attenuates in proportion to an inverse square of a distance may be applied. Furthermore, a model for calculating a distance attenuation Zatt by utilizing a light source area, a diffusion angle, or the like, other than a distance, may be applied. Moreover, a model in consideration of, for example, attenuation due to a medium in the air may be applied.

The encoder also estimates the distance attenuation Zatt of the target point with a similar method. That is, for example, as illustrated in the 18th row from the top of the table in FIG. 4, according to a model of attenuation of light due to distance, the encoder may derive the distance attenuation Zatt corresponding to the distance from the LiDAR position to the object surface. The attenuation model in that case is arbitrary as long as the model is the same as the model applied by the decoder.

Furthermore, for example, as illustrated in the bottom row of the table in FIG. 2, on the basis of predetermined table information prepared in advance, the decoder may derive the distance attenuation Zatt corresponding to the distance from the LiDAR position to the object surface. That is, the table information may be applied instead of the attenuation model.

The table information is arbitrary. For example, the table information may be table information indicating a relation between a distance and an attribute (distance attenuation Zatt). Furthermore, a plurality of types of tables may be prepared in the decoder, and the encoder may transmit a table ID or the like to the decoder to specify a table to be applied by the decoder. For example, table information corresponding to a difference in external environment such as weather may be prepared, and a table corresponding to the external environment may be selected.

The encoder also estimates the distance attenuation Zatt of the target point with a similar method. That is, for example, as illustrated in the bottom row of the table in FIG. 4, on the basis of the predetermined table information prepared in advance, the encoder may derive the distance attenuation Zatt corresponding to the distance from the LiDAR position to the object surface. The table information in that case is arbitrary as long as the information is the same as the information applied by the decoder.

<Derivation of Incident Angle>

Next, the incident angle θ will be described. The incident angle θ is a parameter corresponding to a shape of the object (an angle of the object surface). That is, as illustrated in FIG. 8, the distance attenuation Zatt can be derived by using information of the LiDAR position (laser-light irradiation position), a geometry of the object (target point), or the like.

Figure 11:
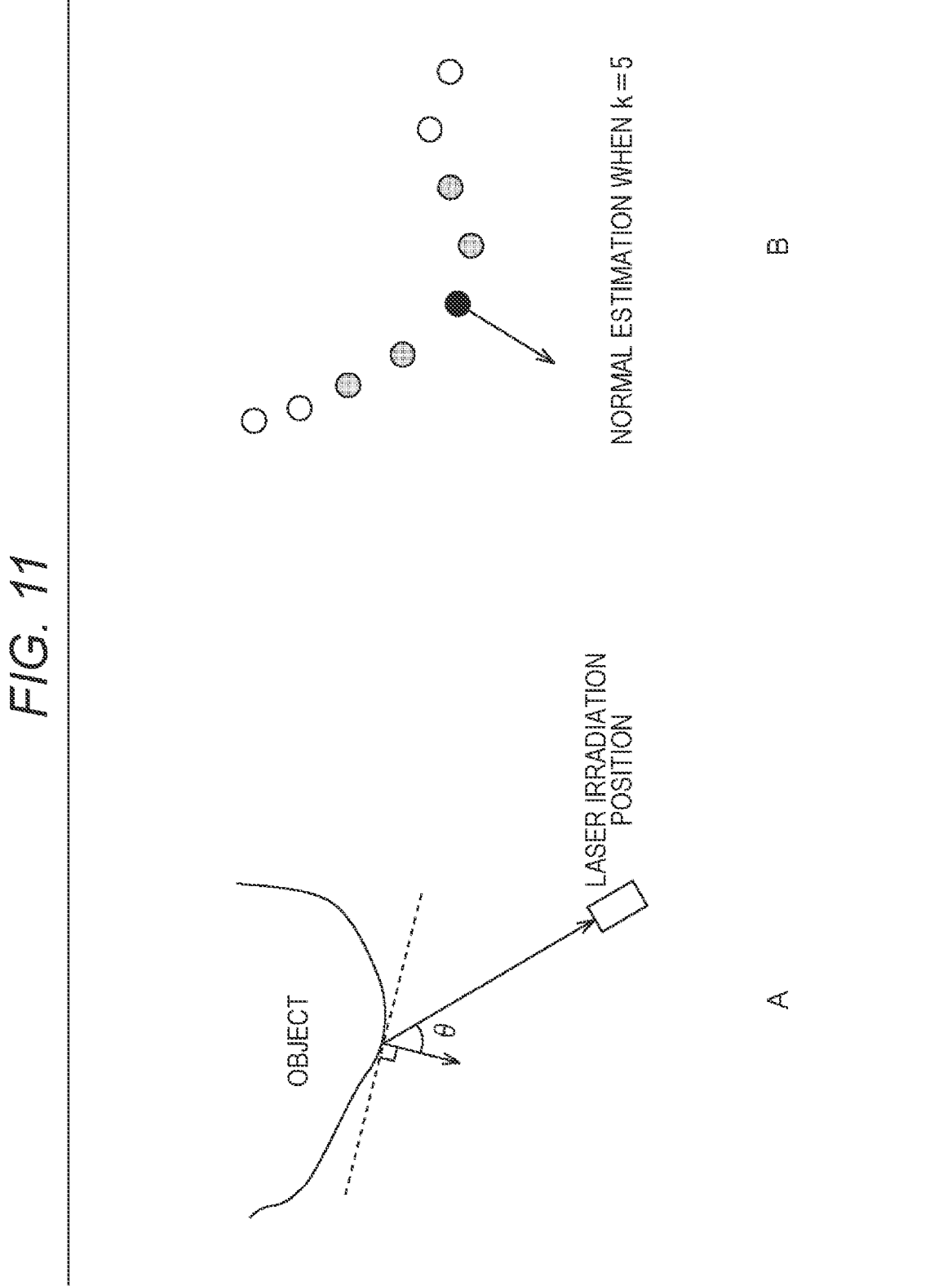
FIG. 11 is a diagram describing an example of an incident angle calculation method.

As illustrated in A of FIG. 11, the incident angle θ indicates an incident angle of the laser light with respect to the normal line of the object surface. That is, for example, as illustrated in the second row from the top of the table in FIG. 3, the decoder may derive the incident angle θ by using the normal vector N of the object surface and an incident vector L indicating the light incident direction.

The encoder also estimates the incident angle θ of the target point with a similar method. That is, for example, as illustrated in the second row from the top of the table in FIG. 5, the encoder may derive the incident angle θ by using the normal vector N of the object surface and the incident vector L indicating the light incident direction.

<Incident Vector>

The laser-light irradiation position (LiDAR position) is known information for the encoder. Meanwhile, the decoder does not know the laser-light irradiation position (LiDAR position). Therefore, the laser-light irradiation position (LiDAR position) may be transmitted from the encoder to the decoder. For example, information indicating the laser-light irradiation position (LiDAR position) may be included in an attribute. Furthermore, the data may be separately transmitted as metadata or the like.

Then, for example, as illustrated in the fourth row from the top of the table in FIG. 3, the decoder may derive the incident vector L on the basis of the information indicating the laser-light irradiation position (LiDAR position) transmitted from the encoder and the geometry of the target point. Note that, instead of the laser-light irradiation position (LiDAR position), the incident vector L may be transmitted from the encoder to the decoder. Then, the incident angle may be derived by using the incident vector L.

For example, as illustrated in the fourth row from the top of the table in FIG. 5, the encoder may derive the incident vector L by using known information (laser-light irradiation position). Note that the encoder may encode the laser-light irradiation position (LiDAR position) and transmit the position to the decoder. Furthermore, instead of the laser-light irradiation position (LiDAR position), the encoder may encode the incident vector L and transmit the encoded incident vector L to the decoder.

<Normal Vector>

Next, the normal vector N will be described. For example, as illustrated in the sixth row from the top of the table in FIG. 3, the decoder may estimate the normal vector N from a geometry. For example, the decoder may estimate the normal vector of the target point on the basis of the geometry of the target point, and derive the incident angle $\theta$ by using the estimated normal vector.

The encoder also estimates the incident angle $\theta$ of the target point with a similar method. That is, for example, as illustrated in the sixth row from the top of the table in FIG. 5, the encoder may estimate the normal vector N from a geometry. For example, the encoder may estimate the normal vector of the target point on the basis of the geometry of the target point, and derive the incident angle $\theta$ by using the estimated normal vector.

Furthermore, for example, as illustrated in the seventh row from the top of the table in FIG. 3, the decoder may estimate the normal vector N from a geometry of a decoded point. For example, the decoder may estimate the normal vector of the target point on the basis of the geometry of a neighbor point positioned in vicinity of the target point, and derive the incident angle by using the estimated normal vector.

The encoder also estimates the incident angle $\theta$ of the target point with a similar method. That is, for example, as illustrated in the seventh row from the top of the table in FIG. 5, the encoder may estimate the normal vector N from a geometry of a point processed before the target point. For example, the encoder may estimate the normal vector of the target point on the basis of the geometry of a neighbor point positioned in vicinity of the target point, and derive the incident angle by using the estimated normal vector.

For example, as illustrated in the eighth row from the top of the table in FIG. 3, the decoder may estimate the normal vector N from geometries of k number of decoded neighbor points. For example, when k=5, the normal vector N is estimated as illustrated in B of FIG. 11. That is, the decoder may estimate the normal vector of the target point on the basis of the geometries of a predetermined number of neighbor points, and derive the incident angle $\theta$ by using the estimated normal vector.

The encoder also estimates the incident angle $\theta$ of the target point with a similar method. That is, for example, as illustrated in the eighth row from the top of the table in FIG. 5, the encoder may estimate the normal vector N from geometries of k number of points processed before the target point. That is, the encoder may estimate the normal vector of the target point on the basis of the geometries of the predetermined number of neighbor points, and derive the incident angle $\theta$ by using the estimated normal vector.

For example, as illustrated in the ninth row from the top of the table in FIG. 3, the decoder may estimate the normal vector N from a geometry of a neighbor point according to the relation in the PredTree. That is, the decoder may estimate the normal vector of the target point on the basis of the geometry of the neighbor point in a predetermined reference relation determined in advance, and derive the incident angle by using the estimated normal vector.

The encoder also estimates the incident angle $\theta$ of the target point with a similar method. That is, for example, as illustrated in the ninth row from the top of the table in FIG. 5, the encoder may estimate the normal vector N from a geometry of a neighbor point according to the relation in the PredTree. That is, the encoder may estimate the normal vector of the target point on the basis of the geometry of the neighbor point in a predetermined reference relation determined in advance, and derive the incident angle by using the estimated normal vector.

Figure 12:
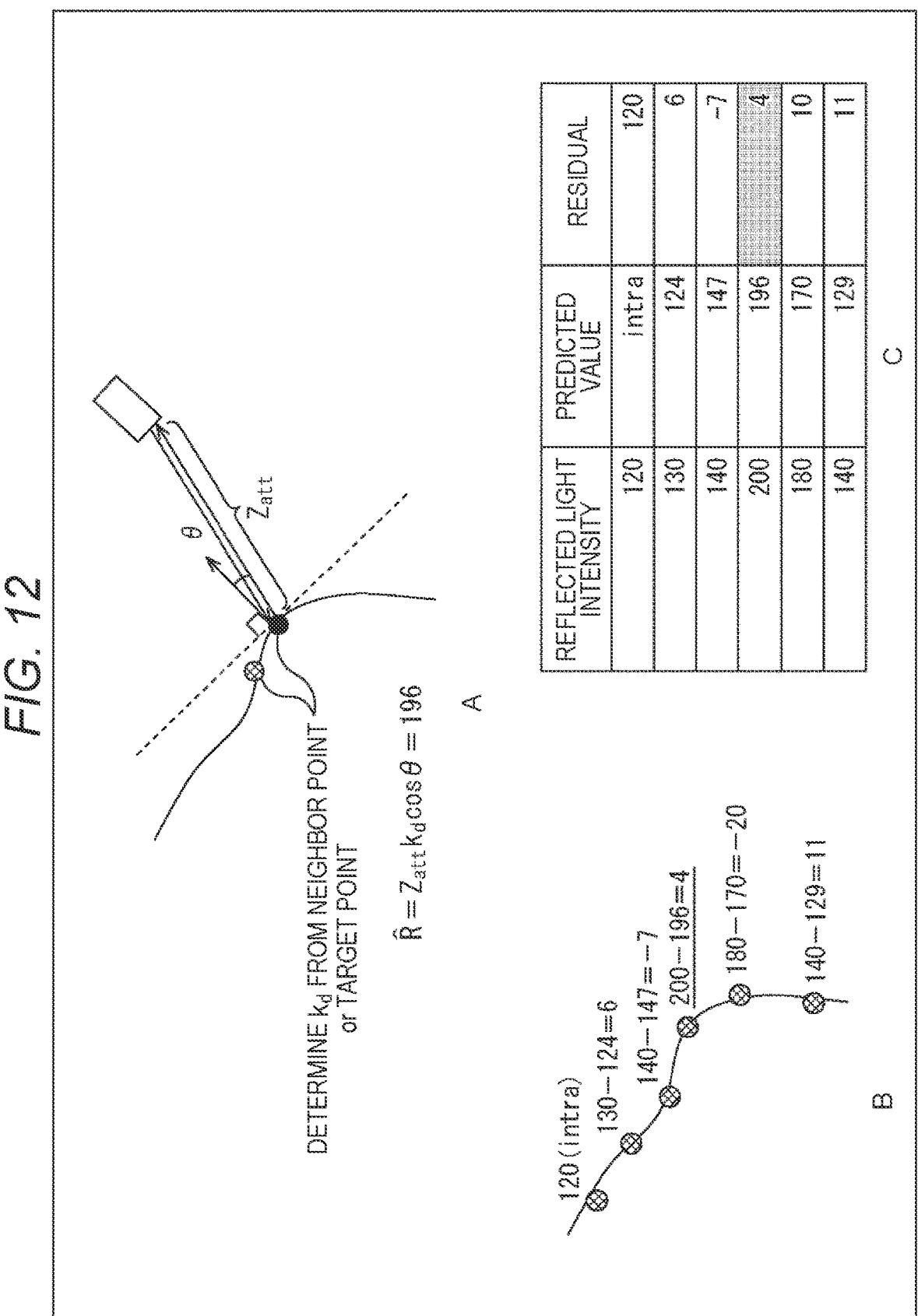
FIG. 12 is a diagram describing an example of predictive decoding using a reflection model.

If a predicted value R' of a reflected light intensity is derived by using a diffuse reflection model as illustrated in A of FIG. 12, predictive residuals as illustrated in B of FIG. 12 can be obtained. That is, in this case, the predictive residuals of values in the rightmost column of the table in C of FIG. 12 are encoded. Therefore, absolute values of the predictive residuals to be encoded can be reduced as compared with the example in FIG. 1. Furthermore, even when the angle of the object surface greatly changes, a decrease in prediction accuracy can be reduced. Therefore, it is possible to reduce a decrease in prediction accuracy due to a change in the orientation of the object surface, that is, to reduce a decrease in encoding efficiency.

<Application of Transmitted Diffuse Reflection Coefficient Kd>

In description in <Estimation of diffuse reflection coefficient kd>, the diffuse reflection coefficient kd is estimated from the information of the neighbor point. However, the present invention is not limited thereto, and, for example, the diffuse reflection coefficient kd may be transmitted from the encoder to the decoder.

Figure 13:
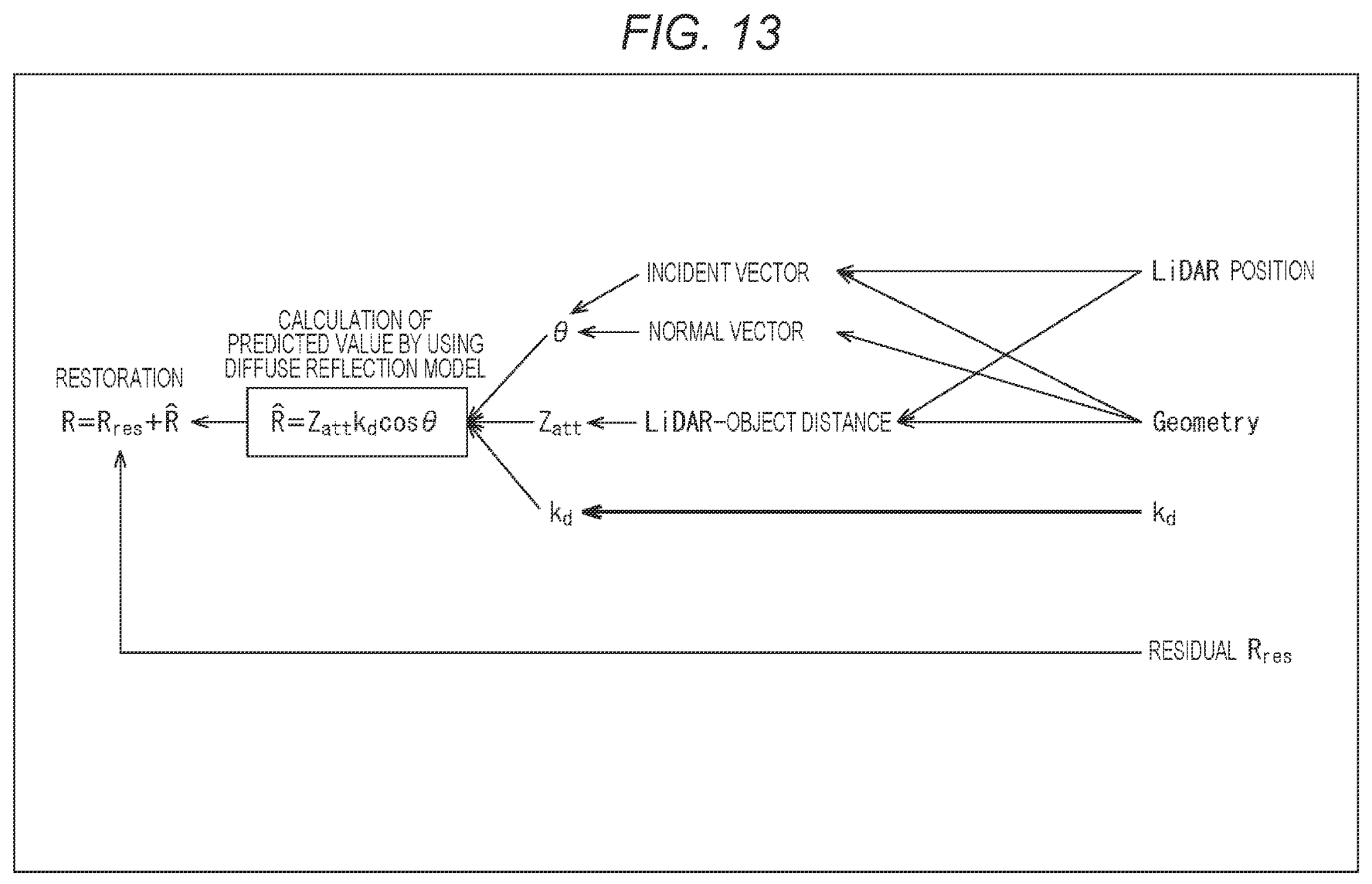

That is, as illustrated in FIG. 13, to derive reflected light intensity R of the target point, the decoder may obtain the distance attenuation Zatt and the incident angle $\theta$ by applying, as the diffuse reflection coefficient kd of the target point, the diffuse reflection coefficient kd transmitted from the encoder, derive the predicted value R' by using these coefficients and the mathematical formula (3), and add the predictive residual Rres transmitted from the encoder and the predicted value R'.

For example, as illustrated in the 10th row from the top of the table in FIG. 2, the decoder may apply the diffuse reflection coefficient kd of the transmitted target point. That is, the decoder may apply the diffuse reflection coefficient kd used for generation of the predictive residual of the target point in the encoder.

The encoder may derive the diffuse reflection coefficient kd with a similar method. That is, for example, as illustrated in the 10th row from the top of the table in FIG. 4, the encoder may transmit the diffuse reflection coefficient kd of the target point. That is, the encoder may derive the diffuse reflection coefficient kd of the target point on the basis of the reflected light intensity R of the target point, derive the predicted value R' by using the derived diffuse reflection coefficient, and encode the derived diffuse reflection coefficient kd.

Thus, by deriving the predicted value R' by applying the transmitted diffuse reflection coefficient kd, the decoder can reduce a decrease in prediction accuracy.

In this case, as illustrated in the 11th row from the top of the table in FIG. 2 or the 11th row from the top of the table in FIG. 4, the diffuse reflection coefficient kd may be always transmitted (for each point) That is, the decoder may update the diffuse reflection coefficient for each point. Then, the encoder may derive the diffuse reflection coefficient kd for each point, derive a predicted value of the target point by using a diffuse reflection coefficient of the object point, and encode the diffuse reflection coefficient for each point.

Furthermore, as illustrated in the 12th row from the top of the table in FIG. 2 and the 12th row from the top of the table in FIG. 4, the diffuse reflection coefficient kd may be transmitted at regular intervals (for each of a plurality of points). That is, the decoder may update the diffuse reflection coefficient for each of the plurality of points. Then, the encoder may derive the diffuse reflection coefficient for each of the plurality of points, derive a predicted value of the target point by using a latest diffuse reflection coefficient at that point of time, and encode the diffuse reflection coefficient when the diffuse reflection coefficient is derived.

Furthermore, as illustrated in the 13th row from the top of the table in FIG. 2 and the 13th row from the top of the table in FIG. 4, the diffuse reflection coefficient kd may be transmitted when a predetermined condition is satisfied. That is, the decoder may update the diffuse reflection coefficient kd when the predetermined condition is satisfied. Then, the encoder may derive the diffuse reflection coefficient kd when the predetermined condition is satisfied, derive the predicted value of the target point by using a latest diffuse reflection coefficient at that point of time, and encode the diffuse reflection coefficient when the diffuse reflection coefficient is derived.

For example, the decoder may update the diffuse reflection coefficient kd when an amount of change in the geometry of the target point is equal to or greater than a predetermined threshold value. Then, the encoder may derive the diffuse reflection coefficient when the amount of change in the geometry of the target point is equal to or greater than the predetermined threshold value.

Furthermore, as illustrated in the 14th row from the top of the table in FIG. 2 and the 14th row from the top of the table in FIG. 4, the diffuse reflection coefficient kd may be transmitted only for a first target point. That is, only an initial value may be transmitted. That is, the decoder may apply the same diffuse reflection coefficient kd to all points. Then, the encoder may derive the diffuse reflection coefficient kd for the first target point, derive predicted values for all the points by using the same diffuse reflection coefficient kd, and encode the diffuse reflection coefficient kd when the diffuse reflection coefficient kd is derived.

<Switching of Method for Deriving Diffuse Reflection Coefficient Kd>

As illustrated in the 15th row from the top of the table in FIG. 2, according to a condition, the decoder may switch between the above-described estimation of the diffuse reflection coefficient kd and application of the transmitted diffuse reflection coefficient kd (transmission of the applied diffuse reflection coefficient kd).

That is, as illustrated in FIG. 14, to derive the reflected light intensity R of the target point, the decoder may obtain the distance attenuation Zatt and the incident angle θ by estimating the diffuse reflection coefficient or applying, as the diffuse reflection coefficient kd of the target point, the diffuse reflection coefficient kd transmitted from the encoder, derive the predicted value R' by using these coefficients and the mathematical formula (3), and add the predictive residual Rres transmitted from the encoder and the predicted value R'.

With this arrangement, for example, it is possible to perform such control that the diffuse reflection coefficient kd is transmitted from the encoder to the decoder when the material of the object is likely to be different between the neighbor point and the target point, such as when a distance to the neighbor point is long, and, in other cases, the diffuse reflection coefficient kd is estimated on the basis of the diffuse reflection coefficient of the neighbor point. Accordingly, a decrease in encoding efficiency can be reduced.

For example, on the basis of a predetermined condition, the decoder may estimate the diffuse reflection coefficient kd of the target point on the basis of the diffuse reflection coefficient kd of the neighbor point positioned in vicinity of the target point, or apply the diffuse reflection coefficient kd used for generation of the predictive residual of the target point.

Furthermore, for example, as illustrated in the 16th row from the top of the table in FIG. 2, the decoder may perform the estimation if there is a neighbor point within the radius r, and if not, apply a transmitted diffuse reflection coefficient kd. For example, when there is a neighbor point within a predetermined distance from the target point, the decoder may estimate the diffuse reflection coefficient kd of the target point on the basis of the diffuse reflection coefficient kd of the neighbor point, and when there is no neighbor point within the predetermined distance from the target point, the decoder may apply the diffuse reflection coefficient kd used for generation of the predictive residual of the target point.

Furthermore, as illustrated in the 15th row from the top of the table in FIG. 4, according to a condition, the encoder may switch between the above-described estimation of the diffuse reflection coefficient kd and transmission of the applied diffuse reflection coefficient kd.

For example, on the basis of a predetermined condition, the encoder may estimate the diffuse reflection coefficient kd of the target point on the basis of the diffuse reflection coefficient kd of the neighbor point positioned in vicinity of the target point, or derive the diffuse reflection coefficient kd of the target point on the basis of the reflected light intensity of the target point.

Furthermore, for example, as illustrated in the 16th row from the top of the table in FIG. 4, when there is a neighbor point within a predetermined distance from the target point, the encoder may estimate the diffuse reflection coefficient kd of the target point on the basis of the diffuse reflection coefficient kd of the neighbor point, and when there is no neighbor point within the predetermined distance from the target point, the encoder may derive the diffuse reflection coefficient kd of the target point on the basis of the reflected light intensity of the target point.

<Transmission of Normal Vector>

Figure 15:
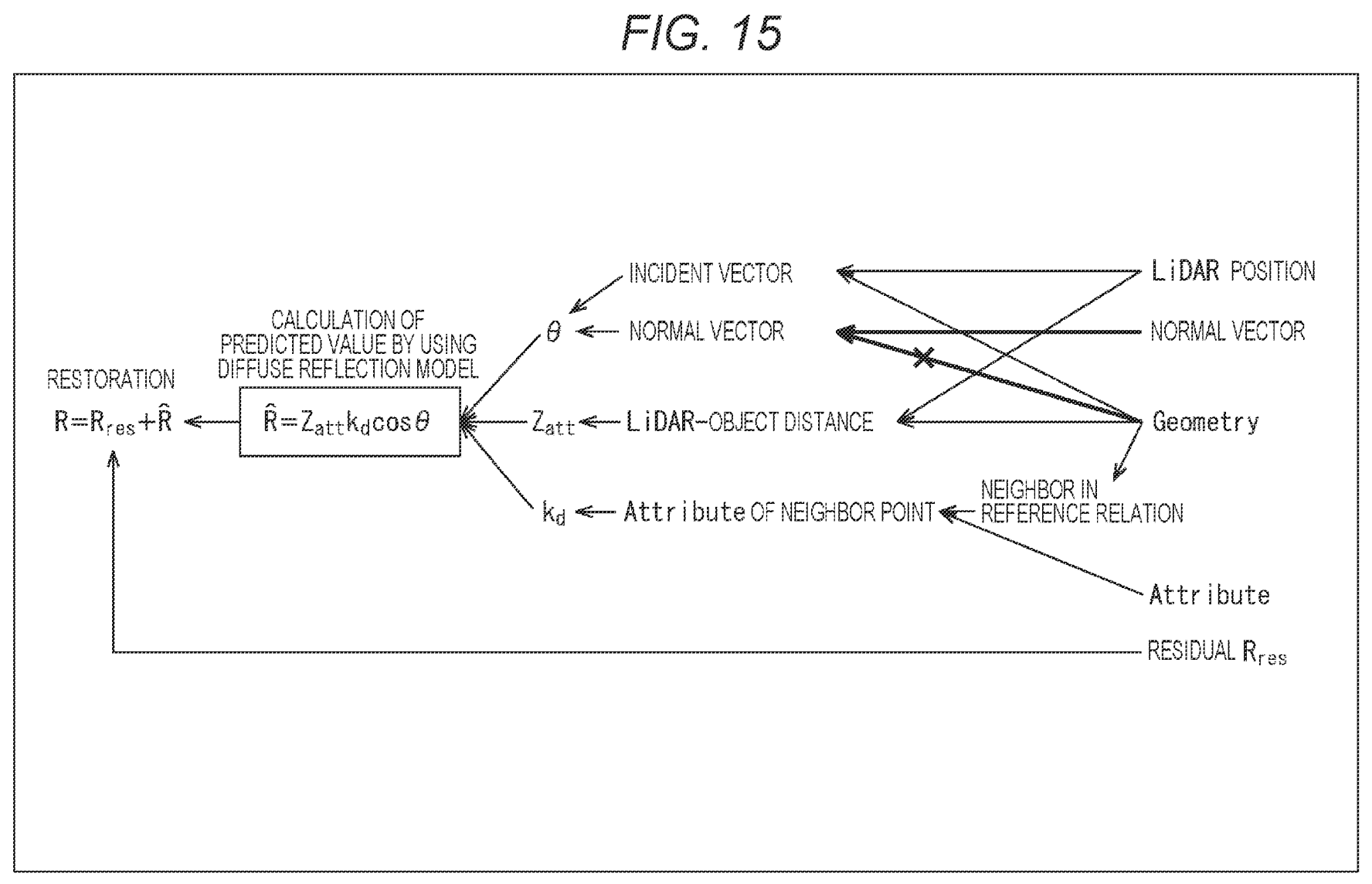

Furthermore, the normal vector N may be transmitted from the encoder to the decoder as illustrated in FIG. 15. That is, the decoder may derive the incident angle θ by using the normal vector N transmitted from the encoder.

For example, the decoder may derive the incident angle θ by applying a normal vector used for generation of the predictive residual of the target point in the encoder. Furthermore, the encoder may encode the normal vector N used for derivation of the incident angle θ. When the normal line information is signaled, cost for calculating the normal estimation can be reduced by utilizing the normal line information as is for restoration of the reflected light intensity.

<Specular Reflection Model>

For example, as illustrated in B of FIG. 6, when light is incident at the angle α (vector L) with respect to the normal vector N of the predetermined surface, the light may be strongly reflected in a certain direction. This is referred to as specular reflection. The Phong reflection model, which is one of light reflection models, is a specular reflection model in which such specular reflection is modeled. In the Phong reflection model, a reflected light intensity IP of specular reflection as in B of FIG. 6 can be expressed as the following mathematical formulas (6) and (7).

$$Ip = IR + Iin * ks * \cos^n \gamma \qquad (6)$$

$$\cos \gamma = \frac{R \cdot V}{|R||V|} \qquad (7)$$

Here, ks represents a specular reflection coefficient, R represents a reflection direction (reflection vector), and V represents a line-of-sight direction (line-of-sight vector).

In a case of LiDAR data, incident light is laser light and can ideally be constant (Iin=1). Furthermore, because it is not easily affected by an ambient light component, the ambient light intensity can be ideally regarded as 0 (Ia=0). Furthermore, the laser light attenuates according to distance. That is, the reflected light intensity depends on a shape, material, and distance of an object surface on which the laser light is reflected.

That is, in a case of LiDAR data, a reflected light intensity R of specular reflection can be expressed by the following mathematical formula (8).

$$R = Zatt[kd * \cos\theta + ks] \qquad (8)$$

As illustrated in the 11th row from the top of the table in FIG. 3 and the 11th row from the top of the table in FIG. 5, a reflection model in consideration of such specular reflection may be applied. That is, the reflection model is a specular reflection model, and the decoder and the encoder may derive, as coefficients of the specular reflection model, a specular reflection coefficient and diffuse reflection coefficient representing the material of the object surface, distance attenuation representing attenuation of light due to distance, and an incident angle of the light with respect to the object surface.

Figure 16:
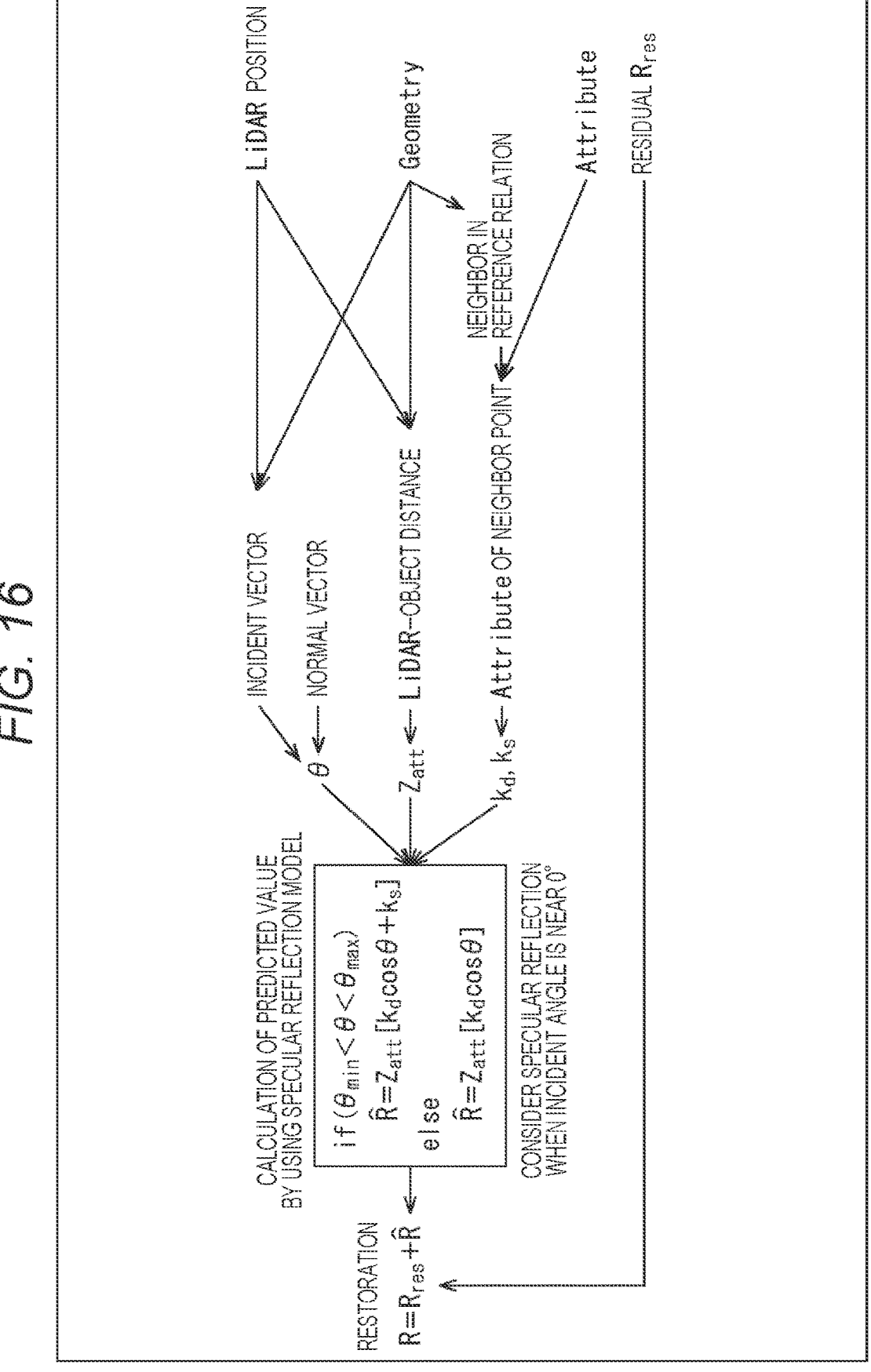
FIG. 16 is a diagram describing an example of predictive decoding when a specular reflection model is applied.

In this case, in order to derive the predicted value R', it is necessary to derive the diffuse reflection coefficient kd and a specular reflection coefficient ks. That is, as illustrated in FIG. 16, to derive the reflected light intensity R of the target point, the decoder may obtain the diffuse reflection coefficient kd and specular reflection coefficient ks of the neighbor point by using the decoded reflected light intensity of the neighbor point and the mathematical formula (8), obtain the distance attenuation Zatt and the incident angle θ by estimating the diffuse reflection coefficient kd and specular reflection coefficient ks of the target point on the basis of the diffuse reflection coefficient kd and specular reflection coefficient ks of the neighbor point, derive the predicted value R' by using these coefficients and the mathematical formula (3), and add the predictive residual Rres transmitted from the encoder and the predicted value R'.

By applying such a specular reflection model, a decrease in encoding efficiency can be reduced even when specular reflection occurs on the object surface.

<Specular Reflection Coefficient Ks>

For example, as illustrated in the 13th row from the top of the table in FIG. 3 and the 13th row from the top of the table in FIG. 5, the specular reflection coefficient ks may be a constant.

Furthermore, for example, as illustrated in the 14th row from the top of the table in FIG. 3 and the 14th row from the top of the table in FIG. 5, the specular reflection coefficient ks may be estimated by setting up two simultaneous equations from two neighbor points. For example, the decoder and the encoder may estimate, by using reflected light intensities of a plurality of neighbor points positioned in vicinity of the target point, specular reflection coefficients and diffuse reflection coefficients of the plurality of neighbor points, and estimate the specular reflection coefficient and diffuse reflection coefficient of the target point by using the estimated specular reflection coefficients and diffuse reflection coefficients of the neighbor points.

Furthermore, for example, as illustrated in the 15th row from the top of the table in FIG. 3, the decoder may apply, as the specular reflection coefficient ks of the target point, the specular reflection coefficient ks transmitted from the encoder. That is, the decoder may apply, as the specular reflection coefficient and diffuse reflection coefficient of the target point, the specular reflection coefficient and diffuse reflection coefficient used for generation of the predictive residual of the target point.

Furthermore, as illustrated in the 15 th row from the top of the table in FIG. 5, the encoder may transmit the specular reflection coefficient ks of the target point to the decoder. That is, the encoder may encode the specular reflection coefficient and diffuse reflection coefficient of the target point.

<Switching Models>

For example, as illustrated in the 17th row from the top of the table in FIG. 3 and the 17th row from the top of the table in FIG. 5, the reflection model to be applied may be switched on the basis of a predetermined condition. For example, the diffuse reflection model and specular reflection model described above may be switched.

For example, the decoder and the encoder may derive the coefficient of the specular reflection model when a predetermined condition is satisfied, and may derive the coefficient of the diffuse reflection model when the condition is not satisfied.

Figure 17:
FIG. 17 is a diagram describing an example of a specular reflection model application condition.

For example, as illustrated in the 18th row from the top of the table in FIG. 3 and the 18th row from the top of the table in FIG. 5, the reflection model to be applied may be selected on the basis of whether or not the incident angle is close to an angle of the normal vector. For example, as indicated by the thick arrows illustrated in FIG. 17, the specular reflection model may be applied when the incident vector is close to the normal vector, and the diffuse reflection model may be applied in other cases.

That is, the coefficient of the diffuse reflection model may be derived when a difference in angle between the incident angle of the light with respect to the object surface and the normal vector of the object surface is equal to or greater than a predetermined threshold value, and the coefficient of the specular reflection model may be derived when the difference in angle is smaller than the threshold value.

Furthermore, as illustrated in the bottom row of the table in FIG. 3, the decoder may select the reflection model to be applied, on the basis of a control flag transmitted from the encoder. Furthermore, as illustrated in the bottom row of the table in FIG. 5, the encoder may transmit, to the decoder, a control flag that specifies the reflection model to be applied by the decoder.

That is, the decoder may derive a coefficient of the reflection model specified by the transmitted control flag, between the diffuse reflection model and the specular reflection model. Furthermore, the encoder may derive the coefficient of the reflection model specified by the control flag, between the diffuse reflection model and the specular reflection model, and encode the control flag.

3. First Embodiment

<Encoding Apparatus>

Figure 18:
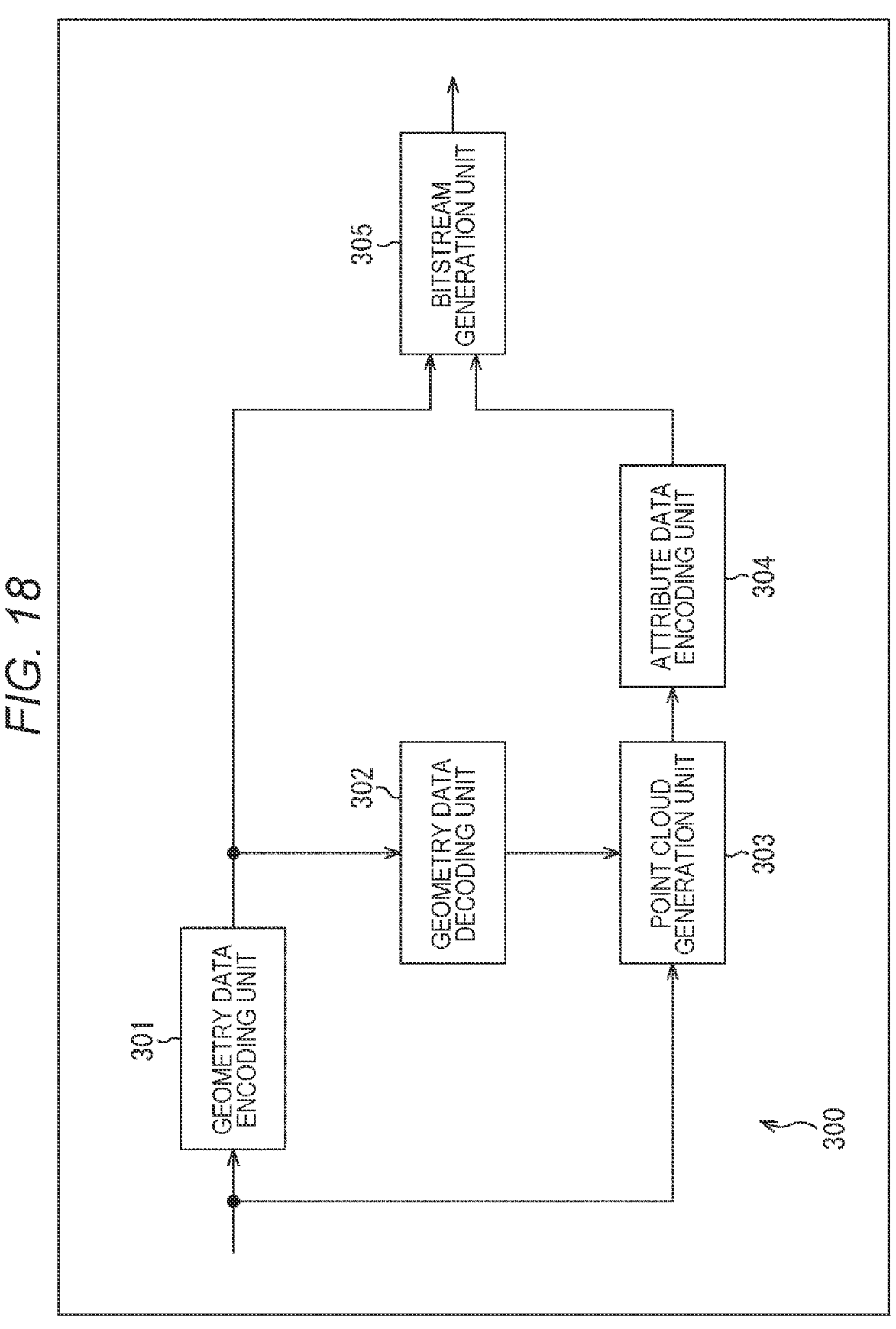
FIG. 18 is a block diagram illustrating a main configuration example of an encoding apparatus.

FIG. 18 is a block diagram illustrating an example of a configuration of an encoding apparatus, which is an aspect of an information processing apparatus to which the present technology is applied. An encoding apparatus 300 illustrated in FIG. 18 is an apparatus that encodes a point cloud (3D data) using LiDAR data described above as attribute data. The above-described present technology may be applied to the encoding apparatus 300.

Note that while FIG. 18 illustrates main elements such as processing units and data flows, those illustrated in FIG. 18 do not necessarily include all elements. That is, in the encoding apparatus 300, there may be a processing unit not illustrated as a block in FIG. 18, or there may be processing or a data flow not illustrated as an arrow or the like in FIG. 18.

As illustrated in FIG. 18, the encoding apparatus 300 includes, a geometry data encoding unit 301, a geometry data decoding unit 302, a point cloud generation unit 303, an attribute data encoding unit 304, and a bitstream generation unit 305.

The geometry data encoding unit 301 generates encoded data of the geometry data by encoding position information of a point cloud (3D data) input to the encoding apparatus 300. This encoding method is arbitrary. For example, processing such as filtering or quantization for noise reduction (denoising) may be performed. The geometry data encoding unit 301 supplies the generated encoded data to the geometry data decoding unit 302 and the bitstream generation unit 305.

The geometry data decoding unit 302 acquires the encoded data supplied from the geometry data encoding unit 301. The geometry data decoding unit 302 generates geometry data by decoding the encoded data. This decoding method is arbitrary as long as the method is a method corresponding to encoding by the geometry data encoding unit 301. For example, processing such as filtering or inverse quantization for denoising may be performed. The geometry data decoding unit 302 supplies the generated geometry data (decoding result) to the point cloud generation unit 303.

The point cloud generation unit 303 acquires attribute data of the point cloud input to the encoding apparatus 300 and the geometry data (decoding result) supplied from the geometry data decoding unit 302. The point cloud generation unit 303 performs processing (recolor processing) of matching the attribute data with the geometry data (decoding result). The point cloud generation unit 303 supplies the attribute data encoding unit 304 with the attribute data corresponding to the geometry data (decoding result).

The attribute data encoding unit 304 acquires the point cloud data (geometry data (decoding result) and attribute data) supplied from the point cloud generation unit 303. The attribute data encoding unit 304 generates encoded data of the attribute data by encoding the attribute data by using the geometry data (decoding result). The attribute data encoding unit 304 supplies the generated encoded data to the bitstream generation unit 105.

The bitstream generation unit 305 acquires the encoded data of the geometry data supplied from the geometry data encoding unit 301. Furthermore, the bitstream generation unit 305 acquires the encoded data of the attribute data supplied from the attribute data encoding unit 304. The bitstream generation unit 305 generates a bitstream including these encoded data by multiplexing these encoded data. The bitstream generation unit 305 outputs the generated bitstream to outside of the encoding apparatus 300. The bitstream is supplied to a decoding side apparatus (for example, a decoding apparatus described later) via an arbitrary communication medium or an arbitrary storage medium, for example.

In such an encoding apparatus 300, the present technology described above in the preceding chapter (<2. Predictive coding and predictive decoding using reflection model>) may be applied to the attribute data encoding unit 304. That is, in this case, the attribute data encoding unit 204 encodes the attribute data with a method to which the present technology described above in the preceding chapter (<2. Predictive coding and predictive decoding using reflection model>) is applied.

With such a configuration, the encoding apparatus 300 can encode, instead of a difference (predictive residual) in reflected light intensity from a neighbor point, a difference (predictive residual) between a reflected light intensity of a target point and a reflected light intensity derived by using a reflection model at the target point. Accordingly, the encoding apparatus 300 can reduce an effect of orientation of an object surface on the predictive residual. Therefore, the encoding apparatus 300 can reduce a decrease in prediction accuracy due to a change in the orientation of the object surface, that is, reduce a decrease in encoding efficiency.

Note that these processing units (the geometry data encoding unit 301 to the bitstream generation unit 305) have an arbitrary configuration. For example, each of the processing units may include a logic circuit that achieves the above-described processing. Furthermore, each of the processing units may include, for example, a central processing unit (CPU), a read only memory (ROM), a random access memory (RAM), and the like, and execute a program by using the CPU, the ROM, the RAM, and the like, thereby implementing the above-described processing. Needless to say, each processing unit may have both the configurations, and a part of the above-described processing may be achieved by a logic circuit and another may be achieved by executing the program. The configurations of the processing units may be independent from each other, and, for example, among the processing units, some processing units may achieve a part of the above-described processing with a logic circuit, some other processing units may achieve the above-described processing by executing a program, and still some other processing units may achieve the above-described processing with both a logic circuit and execution of a program.

<Attribute Data Encoding Unit>

FIG. 19 is a block diagram illustrating a main configuration example of the attribute data encoding unit 304 (FIG. 18). Note that while FIG. 19 illustrates main elements such as processing units and data flows, those illustrated in FIG. 19 do not necessarily include all elements. That is, in the attribute data encoding unit 304, there may be a processing unit not illustrated as a block in FIG. 19, or there may be processing or a data flow not illustrated as an arrow or the like in FIG. 19.

As illustrated in FIG. 19, the attribute data encoding unit 304 includes a control unit 321, a coefficient derivation unit 331, a prediction unit 332, a predictive residual generation unit 333, and an encoding unit 334.

The control unit 321 performs processing related to control of encoding of attribute data. For example, the control unit 321 controls operation of each of the processing units that are the control unit 321, the coefficient derivation unit 331, the prediction unit 332, the predictive residual generation unit 333, and the encoding unit 334. At that time, the control unit 321 can perform the control by applying the present technology described above in the preceding chapter (<2. Predictive coding and predictive decoding using reflection model>).

The coefficient derivation unit 331 is controlled by the control unit 321 and derives a coefficient of the reflection model (for example, a diffuse reflection model, a specular reflection model, or the like) to be applied. At that time, the coefficient derivation unit 331 can derive the coefficient by applying the present technology described above in the preceding chapter (<2. Predictive coding and predictive decoding using reflection model>). That is, the coefficient derivation unit 331 derives a coefficient of a reflection model of light on a surface of an object having a three-dimensional shape.

The prediction unit 332 is controlled by the control unit 321, and derives a predicted value R' of a reflected light intensity R of the target point by using the coefficient derived by the coefficient derivation unit 331. At that time, the prediction unit 332 may derive the predicted value R' by applying the present technology described above in the preceding chapter (<2. Predictive coding and predictive decoding using reflection model>). That is, the prediction unit 332 performs prediction processing by using the reflection model of the light on a surface of an object having a three-dimensional shape and a coefficient derived by the coefficient derivation unit 331, to derive a predicted value of a reflected light intensity that is attribute data of a point cloud representing the object as a set of points.

The predictive residual generation unit 333 is controlled by the control unit 321, and derives a predictive residual Rres that is a difference between the reflected light intensity R of the target point and the predicted value R' derived by the prediction unit 332. At that time, the predictive residual generation unit 333 may derive the predictive residual Rres by applying the present technology described above in the preceding chapter (<2. Predictive coding and predictive decoding using reflection model>). That is, the predictive residual generation unit 333 generates a predictive residual that is a difference between the reflected light intensity that is the attribute data of the point cloud representing an object having a three-dimensional shape as a set of points, and the predicted value derived by the prediction unit 332. That is, the predictive residual generation unit 333 can also be said to be a generation unit that generates the predictive residual.

The encoding unit 334 is controlled by the control unit 321, and generates the encoded data by encoding the predictive residual Rres generated by the predictive residual generation unit 333. This encoding method is arbitrary. At that time, the encoding unit 334 may generate encoded data by encoding the predictive residual Rres by applying the present technology described above in the preceding chapter (<2. Predictive coding and predictive decoding using reflection model>).

The encoding unit 334 supplies the generated encoded data of the predictive residual Rres to the bitstream generation unit 305 (FIG. 18). The bitstream generation unit 305 generates a bitstream including the encoded data of the predictive residual Rres generated in this manner, and outputs the generated bitstream to the outside of the encoding apparatus 300. This bitstream is transmitted to a decoder via, for example, a storage medium, a transmission medium, or the like.

With such a configuration, the attribute data encoding unit 304 can encode, instead of a difference (predictive residual) in reflected light intensity from a neighbor point, a difference (predictive residual) between the reflected light intensity of the target point and a reflected light intensity derived by using a reflection model at the target point. Accordingly, the encoding apparatus 300 can reduce an effect of orientation of an object surface on the predictive residual. Therefore, the encoding apparatus 300 can reduce a decrease in prediction accuracy due to a change in the orientation of the object surface, that is, reduce a decrease in encoding efficiency.

Note that the reflection model may be the diffuse reflection model. Then, the coefficient derivation unit 331 may be configured to derive, as coefficients, a diffuse reflection coefficient representing a material of the object surface, distance attenuation representing attenuation of light due to distance, and an incident angle of the light with respect to the object surface. At that time, the coefficient derivation unit 331 may estimate a diffuse reflection coefficient of the target point on the basis of a diffuse reflection coefficient of a neighbor point positioned in vicinity of the target point. For example, the coefficient derivation unit 331 may estimate a diffuse reflection coefficient of the target point on the basis of a diffuse reflection coefficient of a nearest neighbor point positioned in nearest vicinity of the target point. Furthermore, the coefficient derivation unit 331 may estimate the diffuse reflection coefficient of the target point on the basis of a diffuse reflection coefficient of a neighbor point positioned within a predetermined distance from the target point. Furthermore, the coefficient derivation unit 331 may estimate the diffuse reflection coefficient of the target point on the basis of the diffuse reflection coefficient of the neighbor point in a predetermined reference relation determined in advance.

Furthermore, the coefficient derivation unit 331 may derive the diffuse reflection coefficient of the target point on the basis of the reflected light intensity of the target point. Then, the prediction unit 332 may derive the predicted value by using the diffuse reflection coefficient derived by the coefficient derivation unit 331. Then, the encoding unit 334 may encode the diffuse reflection coefficient derived by the coefficient derivation unit 331. For example, the coefficient derivation unit 331 may derive the diffuse reflection coefficient for each point. In this case, the prediction unit 332 may derive the predicted value of the target point by using the diffuse reflection coefficient of the target point. Then, the encoding unit 334 may encode the diffuse reflection coefficient for each point. Furthermore, the coefficient derivation unit 331 may derive the diffuse reflection coefficient for each of a plurality of points. In this case, the prediction unit 332 may derive the predicted value of the target point by using a latest diffuse reflection coefficient. Then, when the coefficient derivation unit 331 derives the diffuse reflection coefficient, the encoding unit 334 may encode the diffuse reflection coefficient.

Furthermore, the coefficient derivation unit 331 may derive the diffuse reflection coefficient when a predetermined condition is satisfied. In this case, the prediction unit

332 may derive the predicted value of the target point by using a latest diffuse reflection coefficient. Then, when the coefficient derivation unit 331 derives the diffuse reflection coefficient, the encoding unit 334 may encode the diffuse reflection coefficient. For example, the coefficient derivation unit 331 may derive the diffuse reflection coefficient when an amount of change in a geometry of the target point is equal to or greater than a predetermined threshold value.

Furthermore, the coefficient derivation unit 331 may derive a diffuse reflection coefficient for a first target point. In this case, the prediction unit 332 may derive the predicted value by using the same diffuse reflection coefficient for all points. Then, when the coefficient derivation unit 331 derives the diffuse reflection coefficient, the encoding unit 334 may encode the diffuse reflection coefficient.

Furthermore, on the basis of a predetermined condition, the coefficient derivation unit 331 may estimate the diffuse reflection coefficient of the target point on the basis of the diffuse reflection coefficient of the neighbor point positioned in vicinity of the target point, or derive the diffuse reflection coefficient of the target point on the basis of the reflected light intensity of the target point. For example, when there is a neighbor point within a predetermined distance from the target point, the coefficient derivation unit 331 may estimate the diffuse reflection coefficient of the target point on the basis of a diffuse reflection coefficient of the neighbor point. Furthermore, when there is no neighbor point within the predetermined distance from the target point, the coefficient derivation unit 331 may derive the diffuse reflection coefficient of the target point on the basis of the reflected light intensity of the target point.

The coefficient derivation unit 331 may derive distance attenuation according to a model of attenuation of light due to distance. Furthermore, the coefficient derivation unit 331 may derive the distance attenuation on the basis of predetermined table information.

The coefficient derivation unit 331 may derive the incident angle by using a normal vector of the object surface and an incident vector indicating a light incident direction. In this case, the encoding unit 334 may encode an incident vector used for derivation of the incident angle.

Furthermore, the coefficient derivation unit 331 may estimate a normal vector of the target point on the basis of the geometry of the target point, and derive the incident angle by using the estimated normal vector.

Furthermore, the coefficient derivation unit 331 may estimate the normal vector of the target point on the basis of a geometry of the neighbor point positioned in vicinity of the target point, and derive the incident angle by using the estimated normal vector. For example, the coefficient derivation unit 331 may estimate the normal vector of the target point on the basis of geometries of a predetermined number of neighbor points, and derive the incident angle by using the estimated normal vector.

Furthermore, the coefficient derivation unit 331 may estimate the normal vector of the target point on the basis of a geometry of a neighbor point in a predetermined reference relation determined in advance, and derive the incident angle by using the estimated normal vector.

The encoding unit may encode the normal vector used for derivation of the incident angle.

Note that the reflection model may be the specular reflection model. Then, the coefficient derivation unit 331 may be configured to derive, as coefficients, a specular reflection coefficient and diffuse reflection coefficient representing a material of the object surface, distance attenuation representing attenuation of light due to distance, and an incident angle of the light with respect to the object surface. For example, the coefficient derivation unit 331 may apply a predetermined constant as the specular reflection coefficient. Furthermore, the coefficient derivation unit 331 may estimate, by using reflected light intensities of a plurality of neighbor points positioned in vicinity of the target point, specular reflection coefficients and diffuse reflection coefficients of the plurality of neighbor points, and estimate the specular reflection coefficient and diffuse reflection coefficient of the target point by using the estimated specular reflection coefficients and diffuse reflection coefficients of the neighbor points. Furthermore, the encoding unit 334 may encode the specular reflection coefficient and diffuse reflection coefficient derived by the coefficient derivation unit 331.

The coefficient derivation unit 331 may derive a coefficient of the specular reflection model when the predetermined condition is satisfied, and may derive a coefficient of the diffuse reflection model when the condition is not satisfied. For example, the coefficient derivation unit 331 may derive the coefficient of the diffuse reflection model when a difference in angle between the incident angle of the light with respect to the object surface and the normal vector of the object surface is equal to or greater than a predetermined threshold value, and derive the coefficient of the specular reflection model when the difference in angle is smaller than the threshold value.

The coefficient derivation unit 331 may derive a coefficient of the reflection model specified by a control flag between the diffuse reflection model and the specular reflection model. Then, the encoding unit 334 may encode the control flag.

Note that these processing units (the control unit 321, and the coefficient derivation unit 331 to the encoding unit 334) have an arbitrary configuration. For example, each of the processing units may include a logic circuit that achieves the above-described processing. Furthermore, each of the processing units may include, for example, a CPU, a ROM, a RAM, and the like, and execute a program by using the CPU, the ROM, the RAM, and the like to achieve the above-described processing.

Needless to say, each processing unit may have both the configurations, and a part of the above-described processing may be achieved by a logic circuit and another may be achieved by executing the program. The configurations of the processing units may be independent from each other, and, for example, among the processing units, some processing units may achieve a part of the above-described processing with a logic circuit, some other processing units may achieve the above-described processing by executing a program, and still some other processing units may achieve the above-described processing with both a logic circuit and execution of a program.

<Flow of Encoding Processing>

Figure 20:
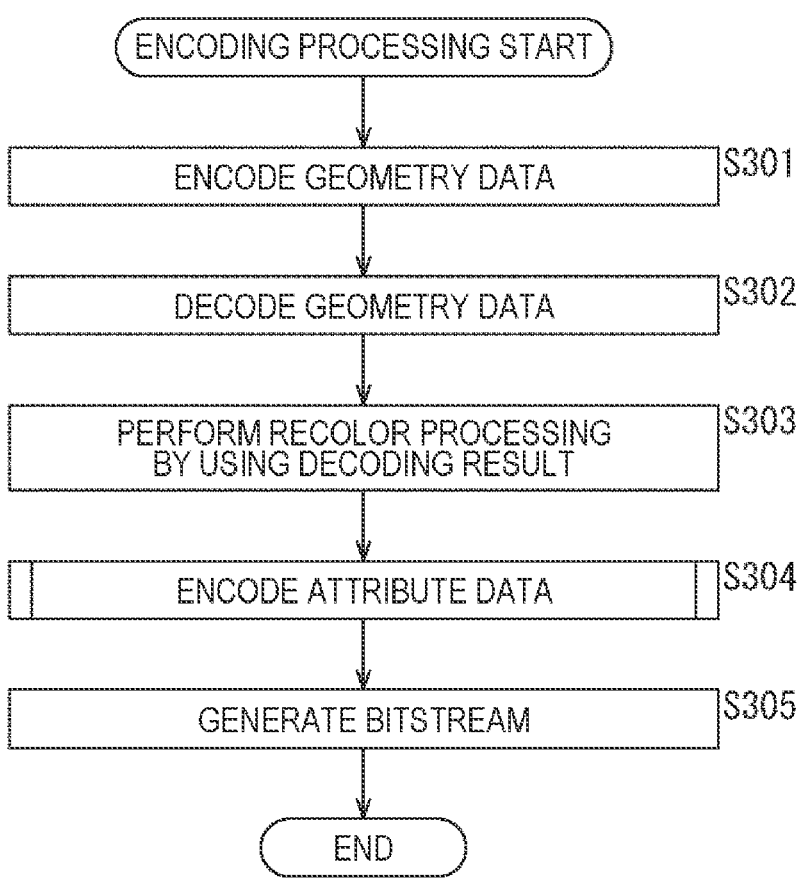
FIG. 20 is a flowchart describing an example of a flow of encoding processing.

An example of a flow of encoding processing executed by the encoding apparatus 300 will be described with reference to the flowchart in FIG. 20.

When the encoding processing is started, in Step S301, the geometry data encoding unit 301 of the encoding apparatus 300 generates encoded data of geometry data of input point cloud by encoding the geometry data.

In Step S302, the geometry data decoding unit 302 generates geometry data by decoding the encoded data generated in Step S301.

In Step S303, the point cloud generation unit 303 performs recolor processing by using attribute data of the input point cloud and the geometry data (decoding result) generated in Step S302, and causes the attribute data to correspond to the geometry data.

In Step S304, the attribute data encoding unit 304 generates encoded data of the attribute data by executing attribute data encoding processing to encode the attribute data subjected to the recolor processing in Step S303.

In Step S305, the bitstream generation unit 305 generates and outputs a bitstream including the encoded data of the geometry data generated in Step S301 and the encoded data of the attribute data generated in Step S304.

When the processing in Step S305 ends, the encoding processing ends.

<Flow of Attribute Data Encoding Processing 1>

Figure 21:
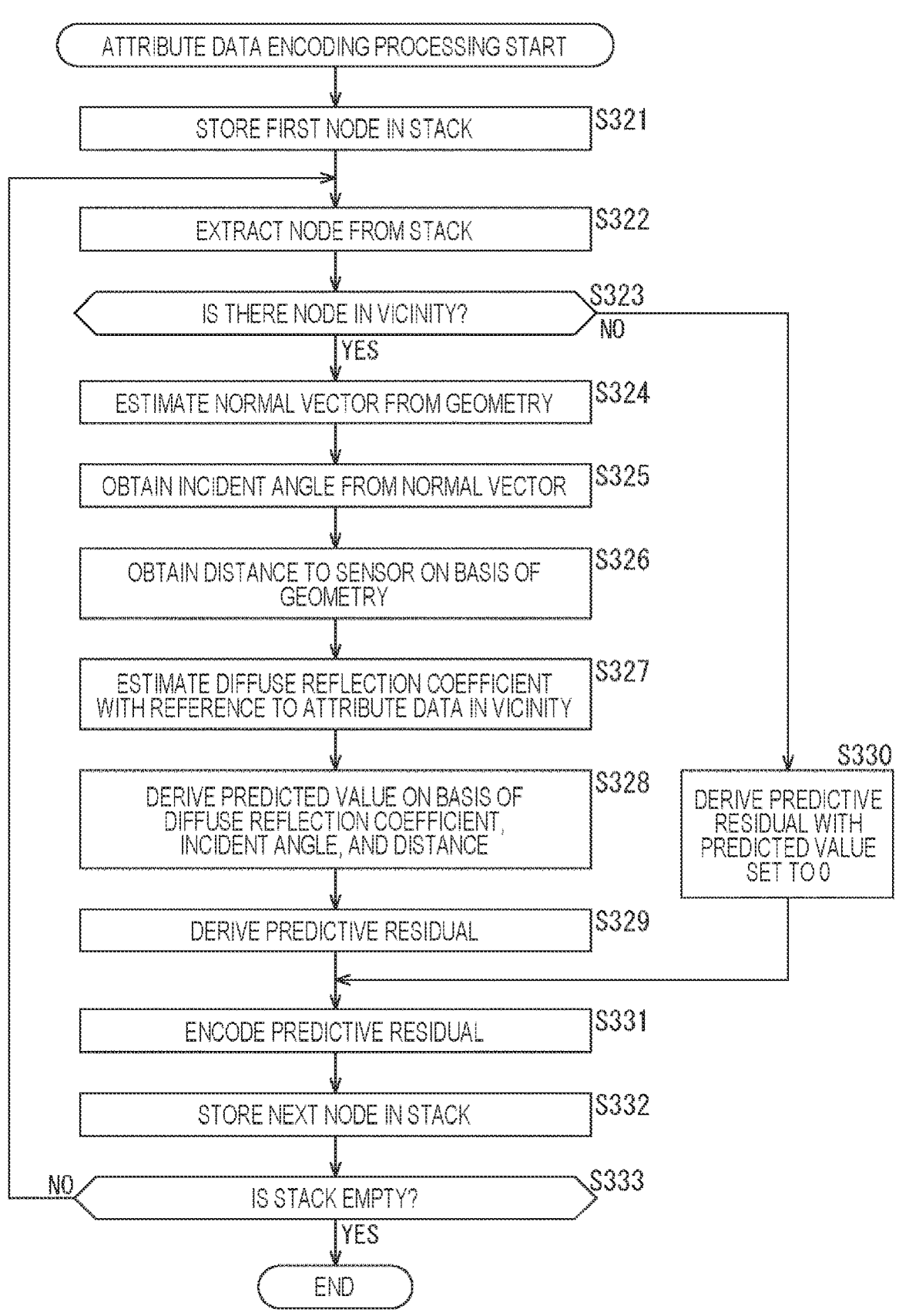
FIG. 21 is a flowchart describing an example of a flow of attribute data encoding processing.

Next, an example of a flow of the attribute data encoding processing executed in Step S304 in FIG. 20 will be described with reference to the flowchart in FIG. 21. Note that the flowchart in FIG. 21 corresponds to the example in FIG. 8. That is, there will be described an example of a flow of the attribute data encoding processing when a diffuse reflection coefficient kd of the target point is derived on the basis of attribute data of a neighbor point.

When the attribute data encoding processing is started, in Step S321, the control unit 321 stores a first node in a stack.

In Step S322, the control unit 321 extracts a node to be processed from the stack.

In Step S323, the control unit 321 determines whether or not there is a node in vicinity. When it is determined that there is a neighbor point, the processing proceeds to Step S324.

In Step S324, the coefficient derivation unit 331 estimates a normal vector on the basis of a geometry.

In Step S325, the coefficient derivation unit 331 derives an incident angle θ from the normal vector.

In Step S326, the coefficient derivation unit 331 obtains a distance to a sensor on the basis of the geometry.

In Step S327, the coefficient derivation unit 331 estimates a diffuse reflection coefficient kd with reference to the attribute data of the neighbor point.

In Step S328, the prediction unit 332 derives a predicted value R' on the basis of the derived diffuse reflection coefficient, incident angle, and distance.

In Step S329, the predictive residual generation unit 333 derives a predictive residual Rres. When the processing in Step S329 ends, the processing proceeds to Step S331. Furthermore, when it is determined in Step S323 that there is no neighbor point, the processing proceeds to Step S330.

In Step S330, the predictive residual generation unit 333 derives the predictive residual Rres with the predicted value R' set to 0. When the processing in Step S330 ends, the processing proceeds to Step S331.

In Step S331, the encoding unit 334 generates the encoded data by encoding the predictive residual Rres.

In Step S332, the control unit 321 stores a next node in the stack.

In Step S333, the control unit 321 determines whether or not the stack is empty. When it is determined that the stack is not empty, the processing returns to Step S322, and the subsequent processing is repeated. Furthermore, when it is determined in Step S333 that the stack is empty, the attribute data encoding processing ends, and the processing returns to FIG. 20.

<Flow of Attribute Data Encoding Processing 2>

Figure 22:
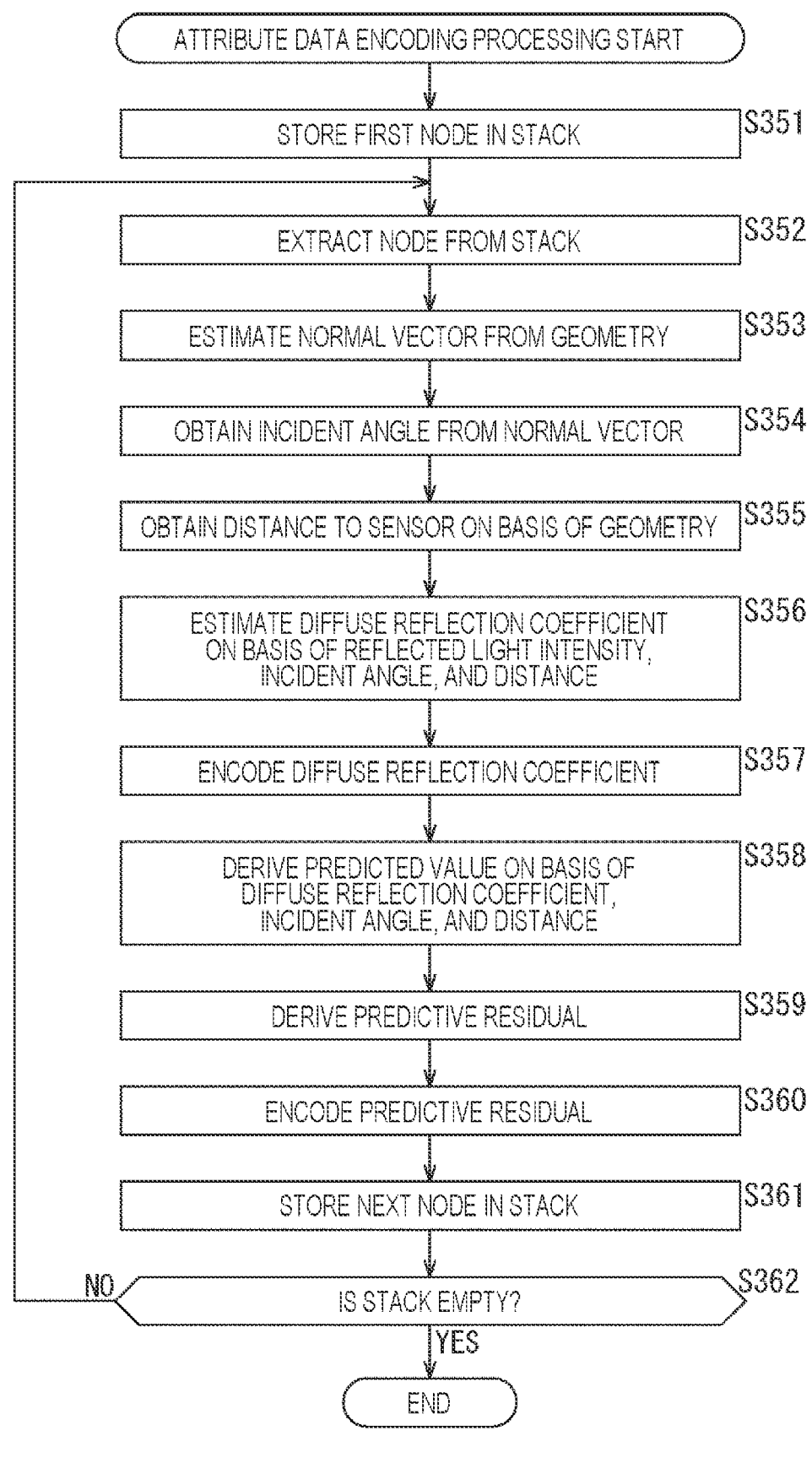
FIG. 22 is a flowchart describing an example of a flow of attribute data encoding processing.

Next, an example of a flow of the attribute data encoding processing executed in Step S304 in FIG. 20 will be described with reference to the flowchart in FIG. 22. Note that the flowchart in FIG. 22 corresponds to the example in FIG. 13. That is, there will be described an example of a flow of the attribute data encoding processing when the diffuse reflection coefficient kd of the target point is transmitted from an encoder to the decoder.

When the attribute data encoding processing is started, in Step S351, the control unit 321 stores a first node in a stack.

In Step S352, the control unit 321 extracts a node to be processed from the stack.

In Step S353, the coefficient derivation unit 331 estimates a normal vector on the basis of a geometry.

In Step S354, the coefficient derivation unit 331 derives an incident angle θ from the normal vector.

In Step S355, the coefficient derivation unit 331 obtains a distance to the sensor on the basis of the geometry.

In Step S356, the coefficient derivation unit 331 estimates a diffuse reflection coefficient kd on the basis of the reflected light intensity R of the target point, the incident angle θ, and the distance.

In Step S357, the encoding unit 334 generates the encoded data by encoding the diffuse reflection coefficient kd.

In Step S358, the prediction unit 332 derives a predicted value R' on the basis of the derived diffuse reflection coefficient, incident angle, and distance.

In Step S359, the predictive residual generation unit 333 derives the predictive residual Rres.

In Step S360, the encoding unit 334 generates the encoded data by encoding the predictive residual Rres.

In Step S361, the control unit 321 stores a next node in the stack.

In Step S362, the control unit 321 determines whether or not the stack is empty. When it is determined that the stack is not empty, the processing returns to Step S352, and the subsequent processing is repeated. Furthermore, when it is determined in Step S333 that the stack is empty, the attribute data encoding processing ends, and the processing returns to FIG. 20.

<Flow of Attribute Data Encoding Processing 3>

Figure 23:
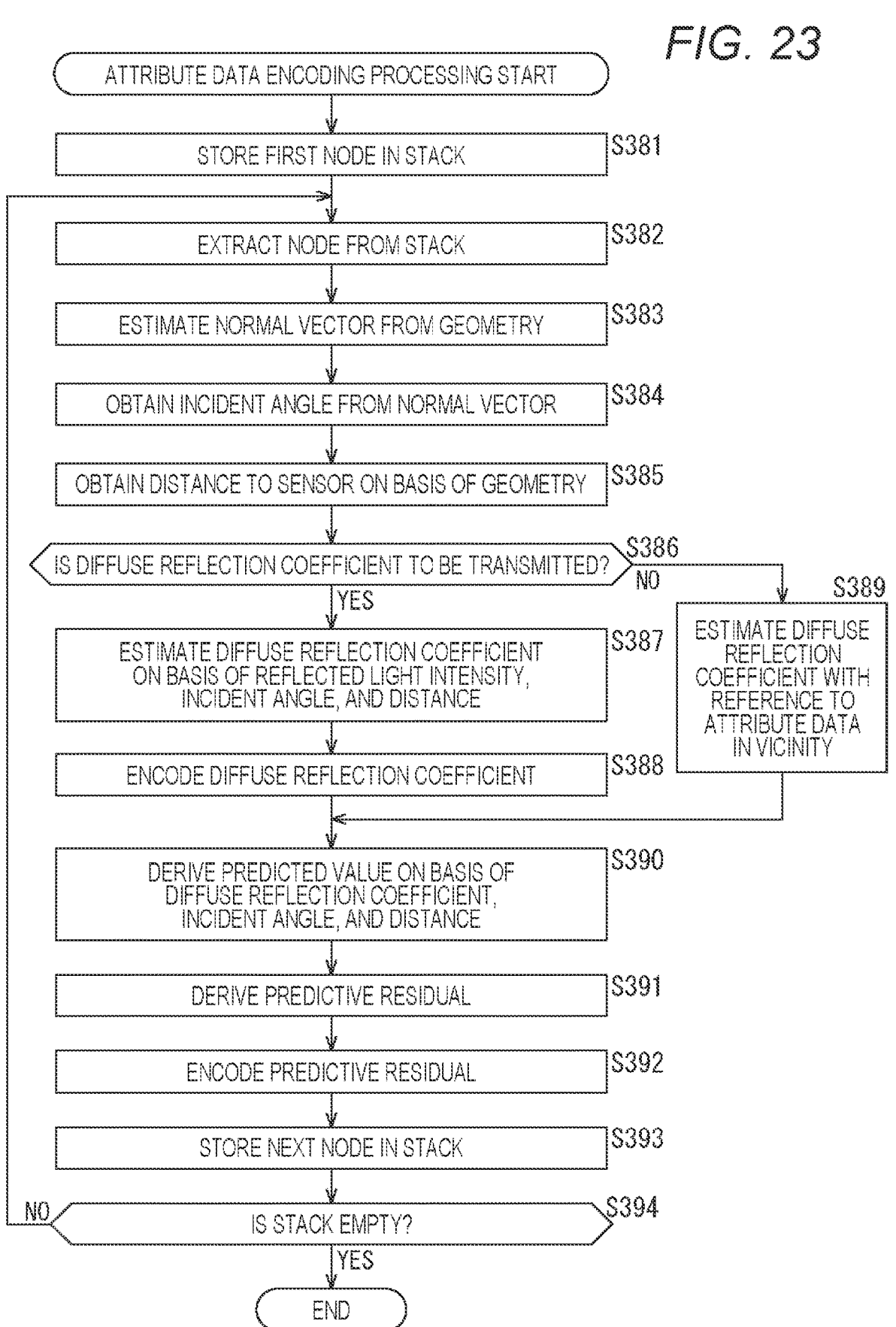
FIG. 23 is a flowchart describing an example of a flow of attribute data encoding processing.

Next, an example of a flow of the attribute data encoding processing executed in Step S304 in FIG. 20 will be described with reference to the flowchart in FIG. 23. Note that the flowchart in FIG. 23 corresponds to the example in FIG. 14. That is, there will be described an example of a flow of the attribute data encoding processing when a method for deriving the diffuse reflection coefficient kd is switched.

When the attribute data encoding processing is started, in Step S381, the control unit 321 stores a first node in the stack.

In Step S382, the control unit 321 extracts a node to be processed from the stack.

In Step S383, the coefficient derivation unit 331 estimates a normal vector on the basis of a geometry.

In Step S384, the coefficient derivation unit 331 derives an incident angle θ from the normal vector.

In Step S385, the coefficient derivation unit 331 obtains a distance to the sensor on the basis of the geometry.

In Step S386, the control unit 321 determines whether or not to transmit a diffuse reflection coefficient kd to the decoder. When it is determined to transmit, the processing proceeds to Step S387.

In Step S387, the coefficient derivation unit 331 estimates the diffuse reflection coefficient kd on the basis of the reflected light intensity R of the target point, the incident angle θ, and the distance.

In Step S388, the encoding unit 334 generates the encoded data by encoding the diffuse reflection coefficient kd. When the processing in Step S388 ends, the processing proceeds to Step S390.

Furthermore, when it is determined in Step S386 not to transmit the diffuse reflection coefficient kd to the decoder, the processing proceeds to Step S389.

In Step S389, the coefficient derivation unit 331 estimates the diffuse reflection coefficient kd of the target point with reference to the attribute data of the neighbor point. When the processing in Step S389 ends, the processing proceeds to Step S390.

In Step S390, the prediction unit 332 derives a predicted value R' on the basis of the derived diffuse reflection coefficient, incident angle, and distance.

In Step S391, the predictive residual generation unit 333 derives a predictive residual Rres.

In Step 392, the encoding unit 334 generates the encoded data by encoding the predictive residual Rres.

In Step S393, the control unit 321 stores a next node in the stack.

In Step S394, the control unit 321 determines whether or not the stack is empty. When it is determined that the stack is not empty, the processing returns to Step S382, and the subsequent processing is repeated. Furthermore, when it is determined in Step S394 that the stack is empty, the attribute data encoding processing ends, and the processing returns to FIG. 20.

By executing each processing as described above, the encoding apparatus 300 can encode, instead of a difference (predictive residual) in reflected light intensity from a neighbor point, a difference (predictive residual) between a reflected light intensity of a target point and a reflected light intensity derived by using a reflection model at the target point. Accordingly, the encoding apparatus 300 can reduce an effect of orientation of an object surface on the predictive residual. Therefore, the encoding apparatus 300 can reduce a decrease in prediction accuracy due to a change in the orientation of the object surface, that is, reduce a decrease in encoding efficiency.

4. Second Embodiment

<Decoding Apparatus>

Figure 24:
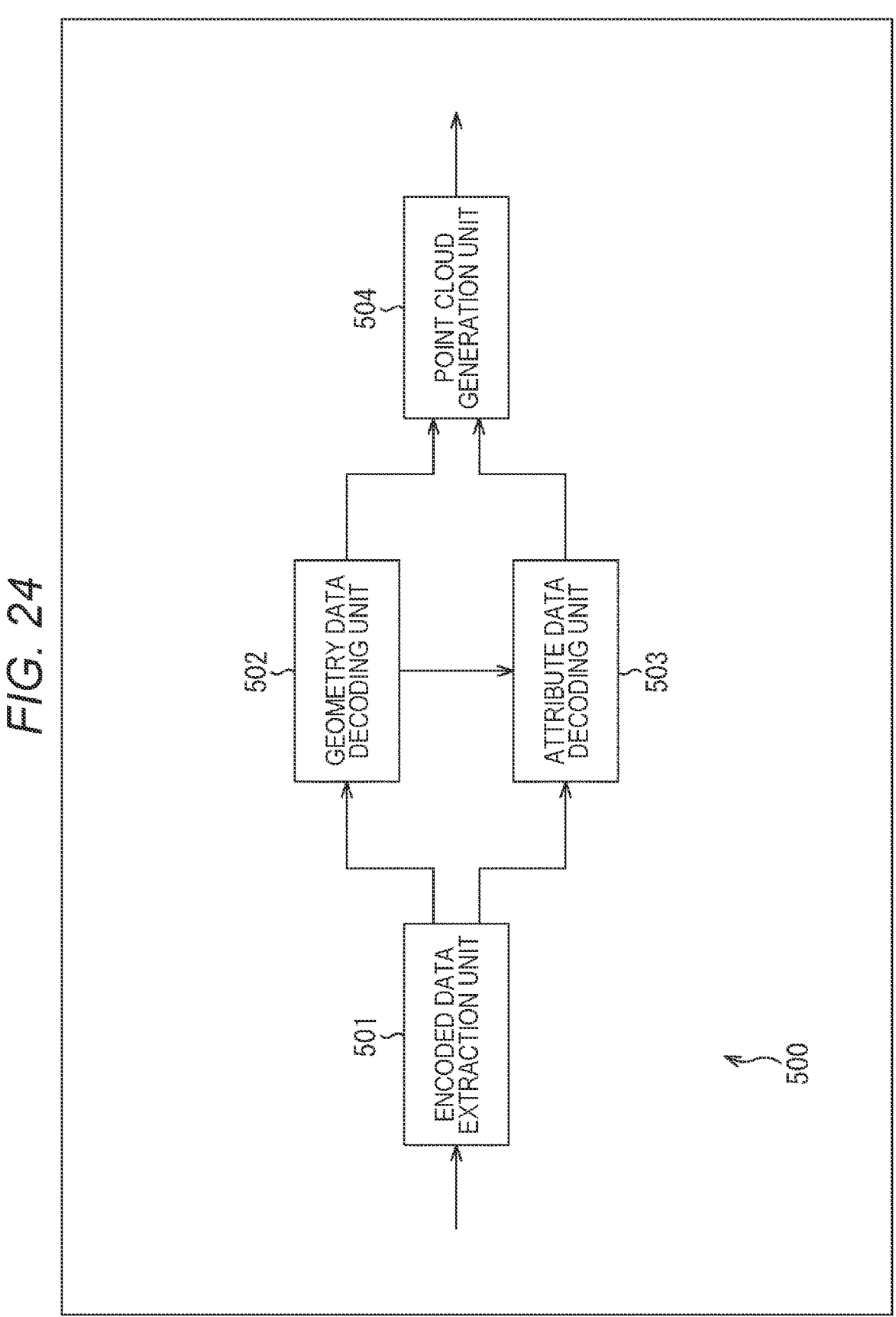
FIG. 24 is a block diagram illustrating a main configuration example of a decoding apparatus.

FIG. 24 is a block diagram illustrating an example of a configuration of a decoding apparatus that is an aspect of an information processing apparatus to which the present technology is applied. A decoding apparatus 500 illustrated in FIG. 24 is an apparatus that decodes encoded data of a point cloud (3D data). The above-described present technology may be applied to the decoding apparatus 500.

Note that while FIG. 24 illustrates main elements such as processing units and data flows, those illustrated in FIG. 24 do not necessarily include all elements. That is, in the decoding apparatus 500, there may be a processing unit not illustrated as a block in FIG. 24, or there may be processing or a data flow not illustrated as an arrow or the like in FIG. 24.

As illustrated in FIG. 24, the decoding apparatus 500 includes an encoded data extraction unit 501, a geometry data decoding unit 502, an attribute data decoding unit 503, and a point cloud generation unit 504.

The encoded data extraction unit 501 extracts encoded data of geometry data and attribute data from a bitstream input to the decoding apparatus 500. The encoded data extraction unit 501 supplies the extracted encoded data of the geometry data to the geometry data decoding unit 502. The encoded data extraction unit 501 supplies the extracted encoded data of the attribute data to the attribute data decoding unit 503.

The geometry data decoding unit 502 acquires the encoded data of the geometry data, the encoded data being supplied from the encoded data extraction unit 501. The geometry data decoding unit 502 generates the geometry data (decoding result) by decoding the encoded data. This decoding method is arbitrary as long as the method is similar to the case of the geometry data decoding unit 302 of the encoding apparatus 300. The geometry data decoding unit 502 supplies the generated geometry data (decoding result) to the attribute data decoding unit 503 and the point cloud generation unit 504.

The attribute data decoding unit 503 acquires the encoded data of the attribute data, encoded data being supplied from the encoded data extraction unit 501. The attribute data decoding unit 503 acquires the geometry data (decoding result) supplied from the geometry data decoding unit 502.

The attribute data decoding unit 503 decodes the encoded data by using the geometry data (decoding result) to generate attribute data (decoding result). The attribute data decoding unit 503 supplies the generated attribute data (decoding result) to the point cloud generation unit 504.

The point cloud generation unit 504 acquires the geometry data (decoding result) supplied from the geometry data decoding unit 502. The point cloud generation unit 504 acquires the attribute data (decoding result) supplied from the attribute data decoding unit 503. The point cloud generation unit 504 generates point cloud data (decoding result) by associating the geometry data (decoding result) with the attribute data (decoding result). The point cloud generation unit 504 outputs the generated point cloud data (decoding result) to outside of the decoding apparatus 500.

In such a decoding apparatus 500, the present technology described above in the second preceding chapter (<2. Predictive coding and predictive decoding using reflection model>) may be applied to the attribute data decoding unit 503. That is, in this case, the attribute data decoding unit 503 generates attribute data (decoding result) by decoding the encoded data of the attribute data with a method to which the present technology described above in the second preceding chapter (<2. Predictive coding and predictive decoding using reflection model>) is applied.

With such a configuration, the decoding apparatus 500 can encode the attribute data such that the attribute data can be independently decoded for each slice. Therefore, the attribute data can be decoded more reliably.

Note that these processing units (the encoded data extraction unit 501 to the point cloud generation unit 504) have an arbitrary configuration. For example, each of the processing units may include a logic circuit that achieves the above-described processing. Furthermore, each of the processing units may include, for example, a CPU, a ROM, a RAM, and the like, and execute a program by using the CPU, the ROM, the RAM, and the like to achieve the above-described processing.

Needless to say, each processing unit may have both the configurations, and a part of the above-described processing may be achieved by a logic circuit and another may be achieved by executing the program. The configurations of the processing units may be independent from each other, and, for example, among the processing units, some processing units may achieve a part of the above-described processing with a logic circuit, some other processing units may achieve the above-described processing by executing a program, and still some other processing units may achieve the above-described processing with both a logic circuit and execution of a program.

<Attribute Data Decoding Unit>

Figure 25:
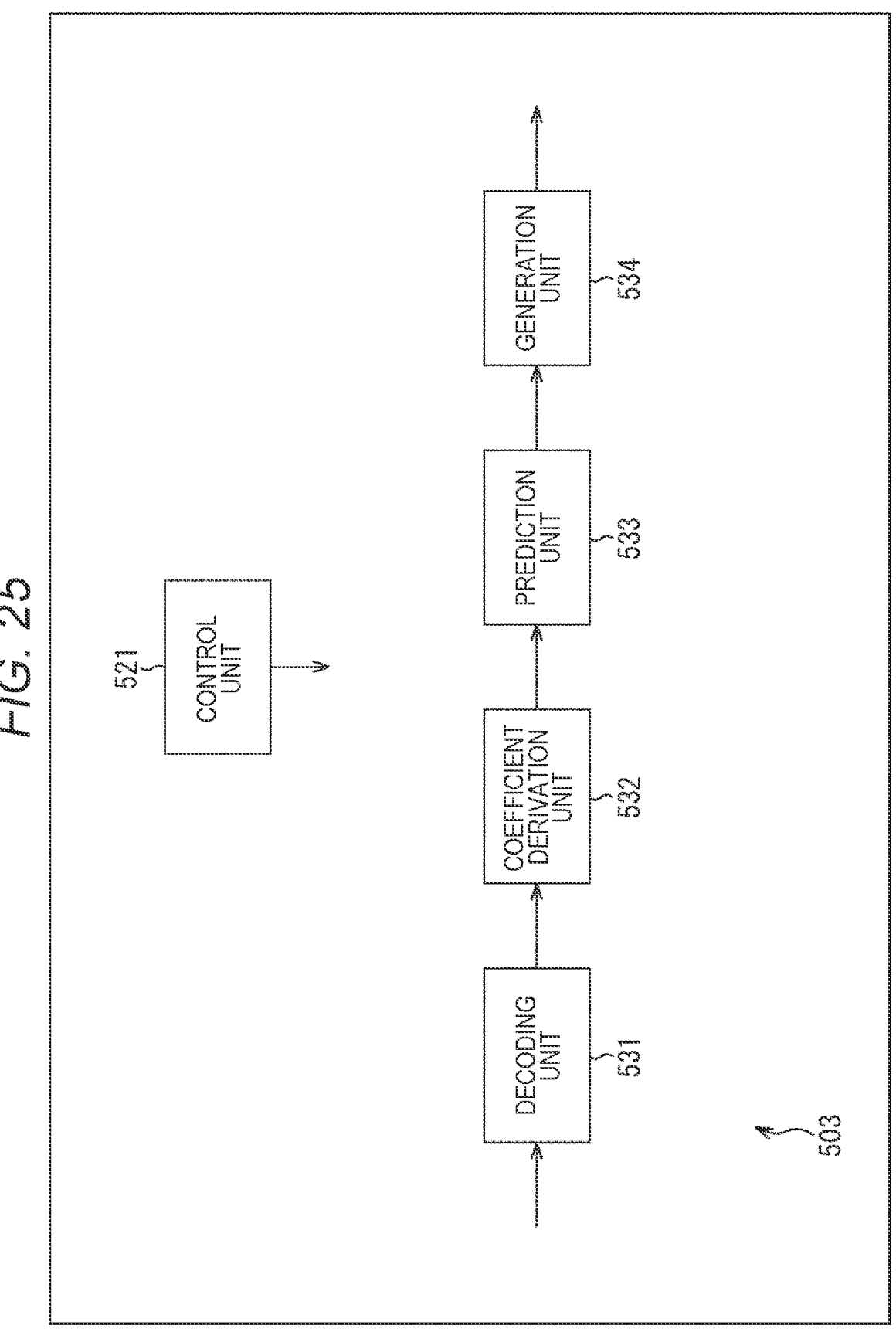
FIG. 25 is a block diagram illustrating a main configuration example of an attribute data decoding unit.

FIG. 25 is a block diagram illustrating a main configuration example of the attribute data decoding unit 503 (FIG. 24). Note that while FIG. 25 illustrates main elements such as processing units and data flows, those illustrated in FIG. 25 do not necessarily include all elements. That is, in the attribute data decoding unit 503, there may be a processing unit not illustrated as a block in FIG. 25, or there may be processing or a data flow not illustrated as an arrow or the like in FIG. 25.

As illustrated in FIG. 25, the attribute data decoding unit 503 includes a control unit 521, a decoding unit 531, a coefficient derivation unit 532, a prediction unit 533, and a generation unit 534.

The control unit 521 performs processing related to control of decoding of attribute data. For example, the control unit 521 controls operation of each of the processing units that are the decoding unit 531, the coefficient derivation unit 532, the prediction unit 533, and the generation unit 534. At that time, the control unit 521 can perform the control by applying the present technology described above in the second preceding chapter (<2. Predictive coding and predictive decoding using reflection model>).

The decoding unit 531 acquires the encoded data of the attribute data supplied from the encoded data extraction unit 501 (FIG. 24). The decoding unit 531 decodes the encoded data. By this decoding, a predictive residual Rres of the attribute data (reflected light intensity) is obtained. At that time, the decoding unit 531 may decode the encoded data by applying the present technology described above in the second preceding chapter (<2. Predictive coding and predictive decoding using reflection model>). That is, the decoding unit 531 generates a predictive residual by decoding encoded data of predictive residual that is a difference between a reflected light intensity that is attribute data of a point cloud representing an object having a three-dimensional shape as a set of points, and a predicted value of the reflected light intensity generated by using a reflection model of light on a surface of the object. Note that this decoding method is arbitrary as long as the method is a method corresponding to encoding method by the encoding unit 334 (FIG. 19) in the encoding apparatus 300. The decoding unit 531 supplies the generated predictive residual Rres to the coefficient derivation unit 532.

The coefficient derivation unit 532 is controlled by the control unit 521 and derives a coefficient of the reflection model (for example, a diffuse reflection model, a specular reflection model, or the like) to be applied. At that time, the coefficient derivation unit 532 can derive the coefficient by applying the present technology described above in the second preceding chapter (<2. Predictive coding and predictive decoding using reflection model>).

The prediction unit 533 is controlled by the control unit 521, and derives a predicted value R' of a reflected light intensity R of the target point by using the coefficient derived by the coefficient derivation unit 532. At that time, the prediction unit 533 may derive the predicted value R' by applying the present technology described above in the second preceding chapter (<2. Predictive coding and predictive decoding using reflection model>). That is, the prediction unit 533 performs prediction processing by using the reflection model of the light on a surface of an object having a three-dimensional shape and a coefficient derived by the coefficient derivation unit 532, to derive a predicted value of a reflected light intensity that is attribute data of a point cloud representing the object as a set of points, the predicted value being generated by using the reflection model of the light on the object surface.

The generation unit 534 generates a reflected light intensity R of the target point by adding the predictive residual Rres obtained by the decoding unit 531 and the predicted value R' obtained by the prediction unit 533. At that time, the generation unit 534 may generate the reflected light intensity R of the target point by applying the present technology described above in the second preceding chapter (<2. Predictive coding and predictive decoding using reflection model>). That is, by adding the predictive residual obtained by the decoding unit 531 and the predicted value derived by the prediction unit 533, the generation unit 534 generates the reflected light intensity that is the attribute data of the point cloud representing an object having a three-dimensional shape as a set of points. The generation unit 534 supplies the generated reflected light intensity R to the point cloud generation unit 504 (FIG. 24) as attribute data.

With such a configuration, the attribute data decoding unit 503 can derive the reflected light intensity from, instead of a difference (predictive residual) in reflected light intensity from a neighbor point, a difference (predictive residual) between a reflected light intensity of a target point and a reflected light intensity derived by using a reflection model at the target point. Accordingly, the decoding apparatus 500 can reduce an effect of orientation of an object surface on the predictive residual. Therefore, the decoding apparatus 500 can reduce a decrease in prediction accuracy due to a change in the orientation of the object surface, that is, reduce a decrease in encoding efficiency.

The reflection model may be the diffuse reflection model. Then, the coefficient derivation unit 532 may be configured to derive, as coefficients, a diffuse reflection coefficient representing a material of the object surface, distance attenuation representing attenuation of light due to distance, and an incident angle of the light with respect to the object surface. At that time, the coefficient derivation unit 532 may estimate a diffuse reflection coefficient of the target point on the basis of a diffuse reflection coefficient of a neighbor point positioned in vicinity of the target point.

For example, the coefficient derivation unit 532 may estimate a diffuse reflection coefficient of the target point on the basis of a diffuse reflection coefficient of a nearest neighbor point positioned in nearest vicinity of the target point. Furthermore, for example, the coefficient derivation unit 532 may estimate the diffuse reflection coefficient of the target point on the basis of a diffuse reflection coefficient of a neighbor point positioned within a predetermined distance from the target point. Furthermore, for example, the coefficient derivation unit 532 may estimate the diffuse reflection coefficient of the target point on the basis of the diffuse reflection coefficient of the neighbor point in a predetermined reference relation determined in advance.

Furthermore, the coefficient derivation unit 532 may apply the diffuse reflection coefficient used for generation of the predictive residual of the target point. For example, the coefficient derivation unit 532 may update the diffuse reflection coefficient for each point. Furthermore, for example, the coefficient derivation unit 532 may update the diffuse reflection coefficient when a predetermined condition is satisfied. For example, the coefficient derivation unit 532 may update the diffuse reflection coefficient when the amount of change in a geometry of the target point is equal to or greater than the predetermined threshold value. Furthermore, the coefficient derivation unit 532 may apply the same diffuse reflection coefficient to all points.

On the basis of a predetermined condition, the coefficient derivation unit 532 may estimate the diffuse reflection coefficient of the target point on the basis of the diffuse reflection coefficient of the neighbor point positioned in vicinity of the target point, or apply the diffuse reflection coefficient used for generation of the predictive residual of the target point. For example, when there is a neighbor point within a predetermined distance from the target point, the coefficient derivation unit 532 may estimate the diffuse reflection coefficient of the target point on the basis of the diffuse reflection coefficient of the neighbor point, and when there is no neighbor point within the predetermined distance from the target point, the coefficient derivation unit 532 may apply the diffuse reflection coefficient used for generation of the predictive residual of the target point.

The coefficient derivation unit 532 may derive distance attenuation according to a model of attenuation of light due to distance.

The coefficient derivation unit 532 may derive the distance attenuation on the basis of predetermined table information.

The coefficient derivation unit 532 may derive the incident angle by using a normal vector of the object surface and an incident vector indicating a light incident direction. At that time, the coefficient derivation unit 532 may derive the incident angle by using an incident vector used for generation of the predictive residual of the target point. Furthermore, the coefficient derivation unit 532 may estimate a normal vector of the target point on the basis of the geometry of the target point, and derive the incident angle by using the estimated normal vector.

Furthermore, the coefficient derivation unit 532 may estimate the normal vector of the target point on the basis of a geometry of the neighbor point positioned in vicinity of the target point, and derive the incident angle by using the estimated normal vector. For example, the coefficient derivation unit 532 may estimate the normal vector of the target point on the basis of geometries of the predetermined number of neighbor points, and derive the incident angle by using the estimated normal vector.

Furthermore, the coefficient derivation unit 532 may estimate the normal vector of the target point on the basis of a geometry of a neighbor point in a predetermined reference relation determined in advance, and derive the incident angle by using the estimated normal vector.

The coefficient derivation unit 532 may derive the incident angle by applying a normal vector used for generation of the predictive residual of the target point.

The reflection model may be the specular reflection model. Then, the coefficient derivation unit 532 may be configured to derive, as coefficients, a specular reflection coefficient and diffuse reflection coefficient representing a material of the object surface, distance attenuation representing attenuation of light due to distance, and an incident angle of the light with respect to the object surface.

At that time, the coefficient derivation unit 532 may apply a predetermined constant as the specular reflection coefficient. Furthermore, the coefficient derivation unit 532 may estimate, by using reflected light intensities of a plurality of neighbor points positioned in vicinity of the target point, specular reflection coefficients and diffuse reflection coefficients of the plurality of neighbor points, and estimate the specular reflection coefficient and diffuse reflection coefficient of the target point by using the estimated specular reflection coefficients and diffuse reflection coefficients of the neighbor points. Furthermore, the coefficient derivation unit 532 may apply the specular reflection coefficient and diffuse reflection coefficient used for generation of the predictive residual of the target point.

The coefficient derivation unit 532 may derive a coefficient of the specular reflection model when the predetermined condition is satisfied, and may derive a coefficient of the diffuse reflection model when the condition is not satisfied. For example, the coefficient derivation unit 532 may derive the coefficient of the diffuse reflection model when a difference in angle between the incident angle of the light with respect to the object surface and the normal vector of the object surface is equal to or greater than a predetermined threshold value, and derive the coefficient of the specular reflection model when the difference in angle is smaller than the threshold value.

The coefficient derivation unit 532 may derive a coefficient of the reflection model specified by a transmitted control flag, between the diffuse reflection model and the specular reflection model.

Note that these processing units (the control unit 521, and the decoding unit 531 to the generation unit 534) have an arbitrary configuration. For example, each of the processing units may include a logic circuit that achieves the above-described processing. Furthermore, each of the processing units may include, for example, a CPU, a ROM, a RAM, and the like, and execute a program by using the CPU, the ROM, the RAM, and the like to achieve the above-described processing. Needless to say, each processing unit may have both the configurations, and a part of the above-described processing may be achieved by a logic circuit and another may be achieved by executing the program. The configurations of the processing units may be independent from each other, and, for example, among the processing units, some processing units may achieve a part of the above-described processing with a logic circuit, some other processing units may achieve the above-described processing by executing a program, and still some other processing units may achieve the above-described processing with both a logic circuit and execution of a program.

<Flow of Decoding Processing>

Figure 26:
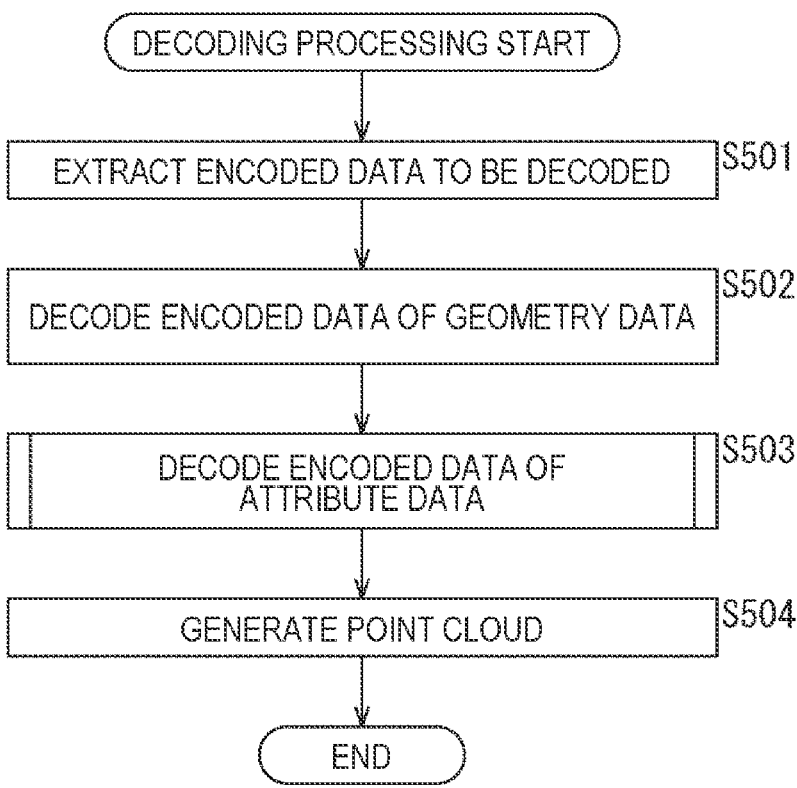
FIG. 26 is a flowchart describing an example of a flow of decoding processing.

Next, an example of a flow of decoding processing executed by the decoding apparatus 500 will be described with reference to the flowchart in FIG. 26.

When the decoding processing is started, in Step S501, the encoded data extraction unit 501 of the decoding apparatus 500 acquires and holds the bitstream, and extracts the encoded data of the geometry data and attribute data.

In Step S502, the geometry data decoding unit 502 generates geometry data (decoding result) by decoding the encoded data extracted in Step S501.

In Step S503, the attribute data decoding unit 503 generates attribute data (reflected light intensity R) by executing attribute data decoding processing to decode the encoded data extracted in Step S501.

In Step S504, the point cloud generation unit 504 generates a point cloud (decoding result) by executing point cloud generation processing to associate the geometry data generated in Step S502 with the attribute data (reflected light intensity R) generated in Step S503.

When the processing in Step S504 ends, the decoding processing ends.

The above-described present technology may be applied to the attribute data decoding processing executed in Step S504 of such decoding processing. That is, in this case, with a method to which the present technology described above is applied, the attribute data decoding unit 503 decodes the encoded data of the attribute data by executing the attribute data decoding processing.

<Flow of Attribute Data Decoding Processing 1>

Figure 27:
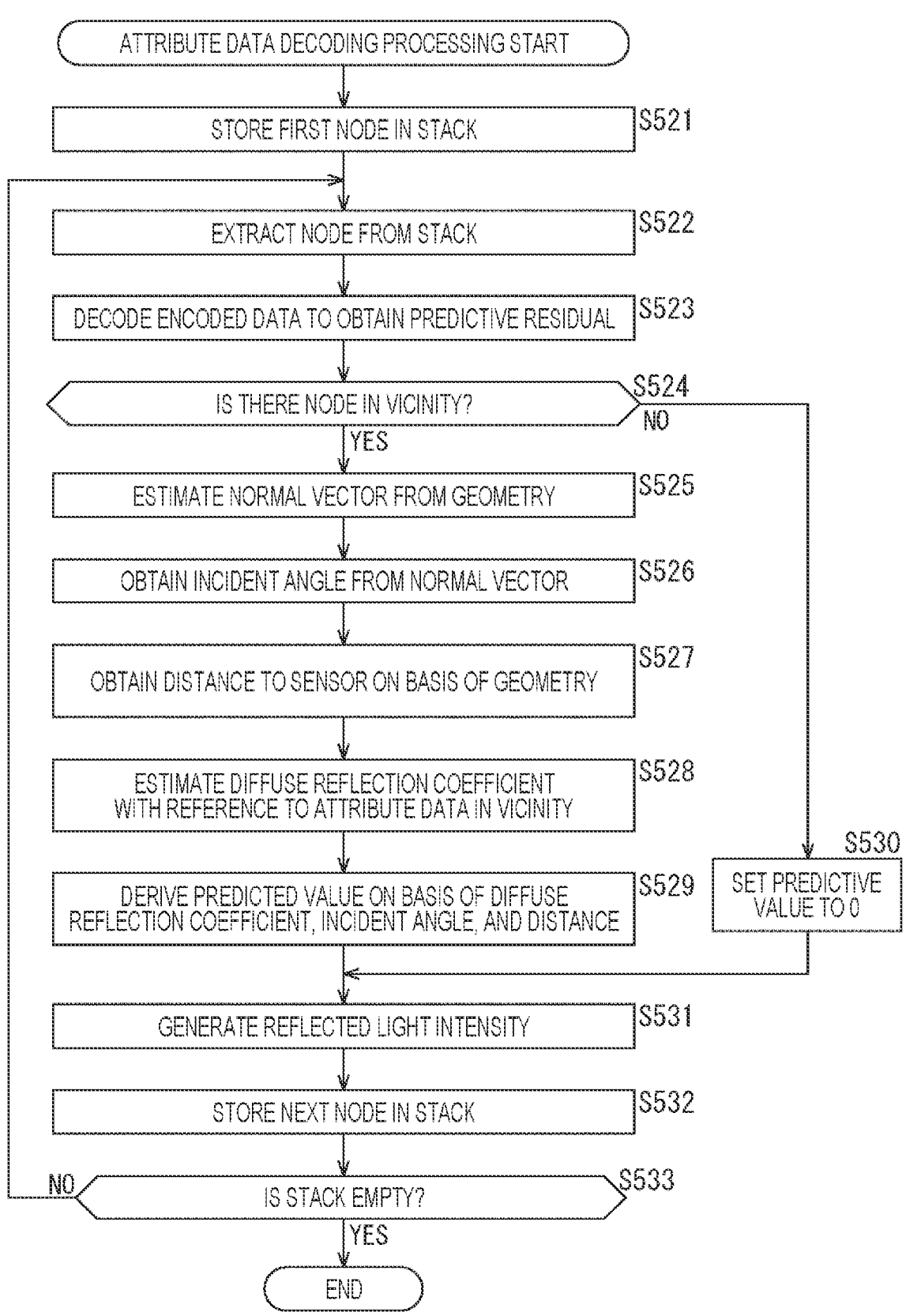
FIG. 27 is a flowchart describing an example of a flow of attribute data decoding processing.

Next, an example of a flow of the attribute data decoding processing executed in Step S503 in FIG. 26 will be described with reference to the flowchart in FIG. 27. Note that the flowchart in FIG. 27 corresponds to the example in FIG. 8. That is, there will be described an example of a flow of the attribute data decoding processing when a diffuse reflection coefficient kd of the target point is derived on the basis of attribute data of a neighbor point.

When the attribute data decoding processing is started, in Step S521, the control unit 521 stores a first node in a stack.

In Step S522, the control unit 521 extracts a node to be processed from the stack.

In Step S523, the decoding unit 531 decodes the encoded data to obtain the predictive residual.

In Step S524, the control unit 521 determines whether or not there is a node in vicinity. When it is determined that there is a neighbor point, the processing proceeds to Step S525.

In Step S525, the coefficient derivation unit 532 estimates a normal vector on the basis of a geometry.

In Step S526, the coefficient derivation unit 532 derives an incident angle θ from the normal vector.

In Step S527, the coefficient derivation unit 532 obtains a distance to a sensor on the basis of the geometry.

In Step S528, the coefficient derivation unit 532 estimates a diffuse reflection coefficient kd with reference to the attribute data of the neighbor point.

In Step S529, the prediction unit 533 derives a predicted value R' on the basis of the derived diffuse reflection coefficient, incident angle, and distance. When the processing in Step S529 ends, the processing proceeds to Step S531. Furthermore, when it is determined in Step S524 that there is no neighbor point, the processing proceeds to Step S530.

In Step S530, the prediction unit 533 sets the predicted value R' to 0. When the processing in Step S530 ends, the processing proceeds to Step S531.

In Step S531, the generation unit 534 generates a reflected light intensity R of the target point by adding the derived predicted value R' and the predictive residual Rres.

In Step S532, the control unit 521 stores a next node in the stack.

In Step S533, the control unit 521 determines whether or not the stack is empty. When it is determined that the stack is not empty, the processing returns to Step S522, and the subsequent processing is repeated. Furthermore, when it is determined in Step S533 that the stack is empty, the attribute data encoding processing ends, and the processing returns to FIG. 27.

<Flow of Attribute Data Decoding Processing 2>

Next, an example of a flow of the attribute data decoding processing executed in Step S503 in FIG. 26 will be described with reference to the flowchart in FIG. 28. Note that the flowchart in FIG. 28 corresponds to the example in FIG. 13. That is, there will be described an example of a flow of the attribute data decoding processing when the diffuse reflection coefficient kd of the target point is transmitted from the encoder to the decoder.

When the attribute data decoding processing is started, in Step S551, the control unit 521 stores a first node in the stack.

In Step S552, the control unit 521 extracts a node to be processed from the stack.

In Step S553, the decoding unit 531 decodes the encoded data to obtain the diffuse reflection coefficient transmitted from the encoder.

In Step S554, the decoding unit 531 decodes the encoded data to obtain the predictive residual Rres transmitted from the encoder.

In Step S555, the coefficient derivation unit 532 estimates a normal vector on the basis of a geometry.

In Step S556, the coefficient derivation unit 532 derives an incident angle θ from the normal vector.

In Step S557, the coefficient derivation unit 532 obtains a distance to the sensor on the basis of the geometry.

In Step S558, the prediction unit 533 derives a predicted value R' on the basis of the diffuse reflection coefficient, incident angle, and distance that are transmitted from the encoder.

In Step S559, the generation unit 534 generates a reflected light intensity R of the target point by adding the derived predicted value R' and the predictive residual Rres.

In Step S560, the control unit 521 stores a next node in the stack.

In Step S561, the control unit 521 determines whether or not the stack is empty. When it is determined that the stack is not empty, the processing returns to Step S552, and the subsequent processing is repeated. Furthermore, when it is determined in Step S561 that the stack is empty, the attribute data encoding processing ends, and the processing returns to FIG. 27.

<Flow of Attribute Data Decoding Processing 3>

Figure 29:
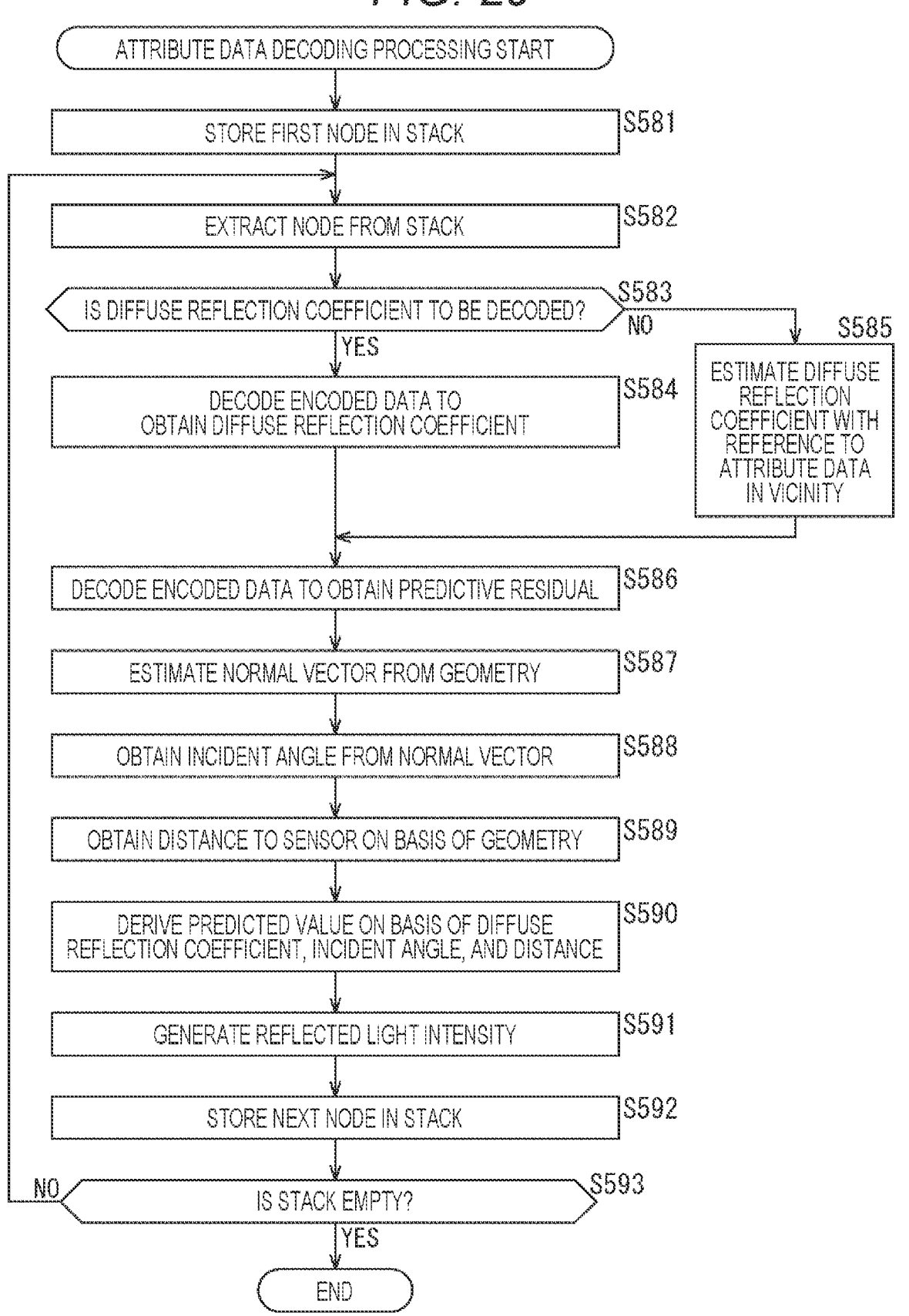
FIG. 29 is a flowchart describing an example of a flow of attribute data decoding processing.

Next, an example of a flow of the attribute data decoding processing executed in Step S503 in FIG. 26 will be described with reference to the flowchart in FIG. 29. Note that the flowchart in FIG. 29 corresponds to the example in FIG. 14. That is, there will be described an example of a flow of the attribute data decoding processing when a method for deriving the diffuse reflection coefficient kd is switched.

When the attribute data decoding processing is started, in Step S581, the control unit 521 stores a first node in the stack.

In Step S582, the control unit 521 extracts a node to be processed from the stack.

In Step S583, the control unit 521 determines whether or not to decode diffuse reflection coefficient. When it is determined to decode, the processing proceeds to Step S584.

In Step S584, the decoding unit 531 decodes the encoded data to obtain the diffuse reflection coefficient transmitted from the encoder. When the processing in Step S584 ends, the processing proceeds to Step S586.

Furthermore, when it is determined in Step S583 not to decode the diffuse reflection coefficient, the processing proceeds to Step S585. In Step S585, the coefficient derivation unit 532 estimates a diffuse reflection coefficient with reference to the attribute data in vicinity. When the processing in Step S505 ends, the processing proceeds to Step S586.

In Step S586, the decoding unit 531 decodes the encoded data to obtain the predictive residual Rres transmitted from the encoder.

In Step S587, the coefficient derivation unit 532 estimates a normal vector on the basis of a geometry.

In Step S588, the coefficient derivation unit 532 derives an incident angle θ from the normal vector.

In Step S589, the coefficient derivation unit 532 obtains a distance to the sensor on the basis of the geometry.

In Step S590, the prediction unit 533 derives a predicted value R' on the basis of the diffuse reflection coefficient, incident angle, and distance that are transmitted from the encoder.

In Step S591, the generation unit 534 generates a reflected light intensity R of the target point by adding the derived predicted value R' and the predictive residual Rres.

In Step S592, the control unit 521 stores a next node in the stack.

In Step S593, the control unit 521 determines whether or not the stack is empty. When it is determined that the stack is not empty, the processing returns to Step S582, and the subsequent processing is repeated. Furthermore, when it is determined in Step S593 that the stack is empty, the attribute data encoding processing ends, and the processing returns to FIG. 27.

By executing each processing as described above, the decoding apparatus 500 can derive the reflected light intensity from, instead of a difference (predictive residual) in reflected light intensity from a neighbor point, a difference (predictive residual) between a reflected light intensity of a target point and a reflected light intensity derived by using a reflection model at the target point. Accordingly, the decoding apparatus 500 can reduce an effect of orientation of an object surface on the predictive residual. Therefore, the decoding apparatus 500 can reduce a decrease in prediction accuracy due to a change in the orientation of the object surface, that is, reduce a decrease in encoding efficiency.

5. Supplementary Note

<3D Data>

The present technology can be applied to encoding and decoding of 3D data of an arbitrary standard. That is, in so far as there is no conflict with the above-described present technology, various types of processing such as an encoding/decoding method, and specifications of various types of data such as 3D data and metadata are arbitrary. Furthermore, in so far as there is no conflict with the present technology, part of the above-described processing or specifications may be omitted.

<Computer>

The above-described series of processing can be executed by hardware or software. When a series of processing is executed by software, a program included in the software is installed on a computer. Here, the computer includes a computer incorporated in dedicated hardware, a general-purpose personal computer capable of executing various functions by installing various programs, and the like, for example.

Figure 30:
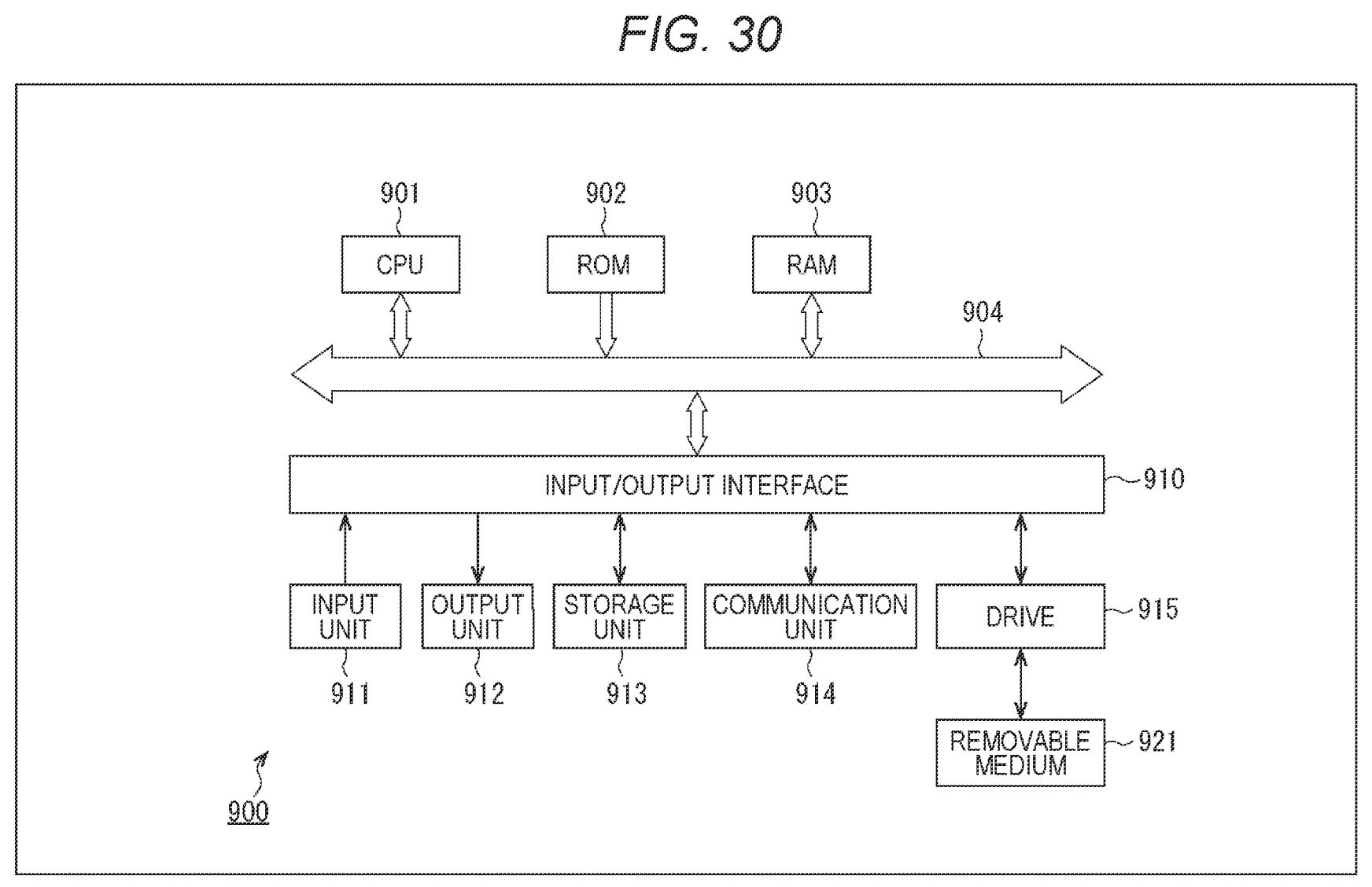

FIG. 30 is a block diagram illustrating a configuration example of hardware of a computer that executes the above-described series of processing by a program.

In a computer 900 illustrated in FIG. 30, a central processing unit (CPU) 901, a read only memory (ROM) 902, and a random access memory (RAM) 903 are mutually connected via a bus 904.

Furthermore, an input/output interface 910 is also connected to the bus 904. An input unit 911, an output unit 912, a storage unit 913, a communication unit 914, and a drive 915 are connected to the input/output interface 910.

The input unit 911 includes, for example, a keyboard, a mouse, a microphone, a touch panel, an input terminal, and the like. The output unit 912 includes, for example, a display, a speaker, an output terminal, and the like. The storage unit 913 includes, for example, a hard disk, a RAM disk, a non-volatile memory and the like. The communication unit 914 includes, for example, a network interface. The drive 915 drives a removable medium 921 such as a magnetic disk, an optical disk, a magneto-optical disk, or a semiconductor memory.

In the computer configured as described above, for example, the CPU 901 loads a program stored in the storage unit 913 into the RAM 903 via the input/output interface 910 and the bus 904 and executes the program, whereby the above-described series of processing is performed. Furthermore, the RAM 903 also appropriately stores data and the like necessary for the CPU 901 to execute various types of processing.

A program executed by the computer can be applied by being recorded on the removable medium 921 as a package medium, or the like, for example. In this case, the program can be installed in the storage unit 913 via the input/output interface 910 by attaching the removable medium 921 to the drive 915.

Furthermore, the program can also be provided via a wired or wireless transmission medium such as a local area network, the Internet, or digital satellite broadcasting. In this case, the program can be received by the communication unit 914 and installed in the storage unit 913.

In addition, this program can be installed in the ROM 902 or the storage unit 913 in advance.

Applicable Target of Present Technology

The present technology may be applied to any configuration. For example, the present technology may be applied to various electronic devices.

Furthermore, for example, the present technology can also be implemented as a partial configuration of an apparatus, such as a processor (for example, a video processor) as a system large scale integration (LSI) or the like, a module (for example, a video module) using a plurality of the processors or the like, a unit (for example, a video unit) using a plurality of the modules or the like, or a set (for example, a video set) obtained by further adding other functions to the unit.

Furthermore, for example, the present technology can also be applied to a network system including a plurality of apparatuses. For example, the present technology may be implemented as cloud computing shared and processed in cooperation by a plurality of apparatuses via a network. For example, the present technology may be implemented in a cloud service that provides a service related to an image (moving image) to any terminal such as a computer, an audiovisual (AV) device, a portable information processing terminal, or an Internet of Things (IoT) device.

Note that, in the present specification, a system means a set of a plurality of components (apparatuses, modules (parts) and the like), and it does not matter whether or not all the components are in the same housing. Therefore, both of a plurality of apparatuses stored in different housings and connected via a network, and one apparatus in which a plurality of modules is stored in one housing are systems.

Field and Application to which Present Technology is Applicable

The system, apparatus, processing unit and the like to which the present technology is applied may be used in arbitrary fields such as traffic, medical care, crime prevention, agriculture, livestock industry, mining, beauty care, factory, household appliance, weather, and natural surveillance, for example. Furthermore, application thereof is also arbitrary.

OTHERS

Note that, in the present specification, various kinds of information (such as metadata) related to encoded data (a bitstream) may be transmitted or recorded in any form as long as it is associated with the encoded data. Here, the term "associating" means, when processing one data, allowing other data to be used (to be linked), for example. That is, the data associated with each other may be collected as one data or may be made individual data. For example, information associated with the encoded data (image) may be transmitted on a transmission path different from that of the encoded data (image). Furthermore, for example, the information associated with the encoded data (image) may be recorded in a recording medium different from that of the encoded data (image) (or another recording area of the same recording medium). Note that, this "association" may be of not entire data but a part of data. For example, an image and information corresponding to the image may be associated with each other in any unit such as a plurality of frames, one frame, or a part within a frame.

Note that, in the present specification, terms such as "combine", "multiplex", "add", "integrate", "include", "store", "put in", "introduce", and "insert" mean, for example, to combine a plurality of objects into one, such as to combine encoded data and metadata into one data, and mean one method of "associating" described above.

Furthermore, the embodiments of the present technology are not limited to the above-described embodiments, and various modifications are possible without departing from the scope of the present technology.

For example, a configuration described as one apparatus (or processing unit) may be divided and configured as a plurality of apparatuses (or processing units). Conversely, configurations described above as a plurality of apparatuses (or processing units) may be collectively configured as one apparatus (or processing unit). Furthermore, a configuration other than the above-described configurations may be added to the configuration of each apparatus (or each processing unit). Moreover, if the configuration and operation of the entire system are substantially the same, a part of the configuration of a certain apparatus (or processing unit) may be included in the configuration of another apparatus (or another processing unit).

Furthermore, for example, the above-described programs may be executed in an arbitrary apparatus. In this case, the apparatus is only required to have a necessary function (functional block and the like) and obtain necessary information.

Furthermore, for example, each step in one flowchart may be executed by one apparatus, or may be executed by being shared by a plurality of apparatuses. Moreover, when a plurality of pieces of processing is included in one step, the plurality of pieces of processing may be executed by one apparatus, or may be shared and executed by a plurality of apparatuses. In other words, a plurality of pieces of processing included in one step can be executed as a plurality of steps. Conversely, the pieces of processing described as a plurality of steps can be collectively executed as one step.

Furthermore, for example, in a program executed by the computer, processing of steps describing the program may be executed in a time-series order in the order described in the present specification, or may be executed in parallel or individually at a required timing such as when a call is made. That is, unless there is a contradiction, the processing of each step may be executed in an order different from the order described above. Moreover, this processing of steps describing program may be executed in parallel with processing of another program, or may be executed in combination with processing of another program.

Furthermore, for example, a plurality of technologies related to the present technology can be implemented independently as a single entity as long as there is no contradiction. It goes without saying that any plurality of present technologies can be implemented in combination. For example, part or all of the present technology described in any of the embodiments can be implemented in combination with part or all of the present technology described in other embodiments. Furthermore, part or all of any of the above-described present technology can be implemented using together with another technology that is not described above.

Note that the present technology can also have the following configuration.

(1) An information processing apparatus including a decoding unit that generates a predictive residual that is a difference between a reflected light intensity that is attribute data of a point cloud representing an object having a three-dimensional shape as a set of points and a predicted value of the reflected light intensity generated by using a reflection model of light on a surface of the object, by decoding encoded data of the predictive residual, a coefficient derivation unit that derives a coefficient of the reflection model, a prediction unit that derives the predicted value by performing prediction processing by using the reflection model and the coefficient, and a generation unit that generates the reflected light intensity by adding the predictive residual obtained by the decoding unit and the predicted value derived by the prediction unit.

(2) The information processing apparatus according to (1), in which the reflection model is a diffuse reflection model, and the coefficient derivation unit is configured to derive, as the coefficients, a diffuse reflection coefficient representing a material of the object surface, distance attenuation representing attenuation of the light due to distance, and an incident angle of the light with respect to the object surface.

(3) The information processing apparatus according to (2), in which the coefficient derivation unit estimates the diffuse reflection coefficient of a target point on the basis of the diffuse reflection coefficient of a neighbor point positioned in vicinity of the target point.

(4) The information processing apparatus according to (3), in which the coefficient derivation unit estimates the diffuse reflection coefficient of the target point on the basis of the diffuse reflection coefficient of a nearest neighbor point positioned in nearest vicinity of the target point.

(5) The information processing apparatus according to (3) or (4), in which the coefficient derivation unit estimates the diffuse reflection coefficient of the target point on the basis of the diffuse reflection coefficient of the neighbor point positioned within a predetermined distance from the target point.

(6) The information processing apparatus according to any one of (3) to (5), in which the coefficient derivation unit estimates the diffuse reflection coefficient of the target point on the basis of the diffuse reflection coefficient of the neighbor point in a predetermined reference relation determined in advance.

(7) The information processing apparatus according to any one of (2) to (6), in which the coefficient derivation unit applies the diffuse reflection coefficient used for generation of the predictive residual of a target point.

(8) The information processing apparatus according to (7), in which the coefficient derivation unit updates the diffuse reflection coefficient for each point.

(9) The information processing apparatus according to (7) or (8), in which the coefficient derivation unit updates the diffuse reflection coefficient for each of a plurality of points.

(10) The information processing apparatus according to any one of (7) to (9), in which the coefficient derivation unit updates the diffuse reflection coefficient when a predetermined condition is satisfied.

(11) The information processing apparatus according to (10), in which the coefficient derivation unit updates the diffuse reflection coefficient when an amount of change in geometry of the target point is equal to or greater than a predetermined threshold value.

(12) The information processing apparatus according to (7)

in which the coefficient derivation unit applies same the diffuse reflection coefficient to all points.

(13) The information processing apparatus according to any one of (2) to (12), in which, on the basis of a predetermined condition, the coefficient derivation unit estimates the diffuse reflection coefficient of a target point on the basis of the diffuse reflection coefficient of a neighbor point positioned in vicinity of the target point, or applies the diffuse reflection coefficient used for generation of the predictive residual of the target point.

(14) The information processing apparatus according to (13), in which, when there is the neighbor point within a predetermined distance from the target point, the coefficient derivation unit estimates the diffuse reflection coefficient of the target point on the basis of the diffuse reflection coefficient of the neighbor point, and when there is no the neighbor point within the predetermined distance from the target point, the coefficient derivation unit applies the diffuse reflection coefficient used for generation of the predictive residual of the target point.

(15) The information processing apparatus according to any one of (2) to (14), in which, according to a model of attenuation of the light due to distance, the coefficient derivation unit derives the distance attenuation.

(16) The information processing apparatus according to any one of (2) to (15), in which the coefficient derivation unit derives the distance attenuation on the basis of predetermined table information.

(17) The information processing apparatus according to any one of (2) to (16), in which the coefficient derivation unit derives the incident angle by using a normal vector of the object surface and an incident vector indicating an incident direction of the light.

(18) The information processing apparatus according to (17), in which the coefficient derivation unit derives the incident angle by using the incident vector used for generation of the predictive residual of a target point.

(19) The information processing apparatus according to (17) or (18), in which the coefficient derivation unit estimates the normal vector of a target point on the basis of a geometry of the target point, and derives the incident angle by using estimated the normal vector.

(20) The information processing apparatus according to any one of (17) to (19), in which the coefficient derivation unit estimates the normal vector of a target point on the basis of a geometry of a neighbor point positioned in vicinity of the target point, and derives the incident angle by using estimated the normal vector.

(21) The information processing apparatus according to (20), in which the coefficient derivation unit estimates the normal vector of the target point on the basis of geometries of a predetermined number of the neighbor points, and derives the incident angle by using estimated the normal vector.

(22) The information processing apparatus according to (20) or (21), in which the coefficient derivation unit estimates the normal vector of the target point on the basis of a geometry of the neighbor point in a predetermined reference relation determined in advance, and derives the incident angle by using estimated the normal vector.

(23) The information processing apparatus according to any one of (17) to (22), in which the coefficient derivation unit derives the incident angle by applying the normal vector used for generation of the predictive residual of a target point.

(24) The information processing apparatus according to any one of (1) to (23), in which the reflection model is a specular reflection model, and the coefficient derivation unit is configured to derive, as the coefficients, a specular reflection coefficient and diffuse reflection coefficient representing a material of the object surface, distance attenuation representing attenuation of the light due to distance, and an incident angle of the light with respect to the object surface.

(25) The information processing apparatus according to (24), in which the coefficient derivation unit applies a predetermined constant as the specular reflection coefficient.

(26) The information processing apparatus according to (24) or (25), in which the coefficient derivation unit estimates the specular reflection coefficients and diffuse reflection coefficients of a plurality of neighbor points positioned in vicinity of a target point by using the reflected light intensities of the neighbor points, and estimates the specular reflection coefficient and diffuse reflection coefficient of the target point by using estimated the specular reflection coefficients and diffuse reflection coefficients of the neighbor points.

(27) The information processing apparatus according to any one of (24) to (26), in which the coefficient derivation unit applies the specular reflection coefficient and diffuse reflection coefficient used for generation of the predictive residual of a target point.

(28) The information processing apparatus according to any one of (1) to (27), in which the coefficient derivation unit derives the coefficient of a specular reflection model when a predetermined condition is satisfied, and derives the coefficient of a diffuse reflection model when the condition is not satisfied.

(29) The information processing apparatus according to (28), in which the coefficient derivation unit derives the coefficient of the diffuse reflection model when a difference in angle between an incident angle of the light with respect to the object surface and a normal vector of the object surface is equal to or greater than a predetermined threshold value, and derives the coefficient of the specular reflection model when the difference in angle is smaller than the threshold value.

(30) The information processing apparatus according to any one of (1) to (29), in which the coefficient derivation unit derives the coefficient of the reflection model specified by a transmitted control flag, between a diffuse reflection model and a specular reflection model.

(31) An information processing method including generating a predictive residual that is a difference between a reflected light intensity that is attribute data of a point cloud representing an object having a three-dimensional shape as a set of points and a predicted value of the reflected light intensity generated by using a reflection model of light on a surface of the object, by decoding encoded data of the predictive residual, deriving a coefficient of the reflection model, deriving the predicted value by performing prediction processing by using the reflection model and the coefficient, and generating the reflected light intensity by adding the predictive residual obtained by decoding the encoded data and derived the predicted value.

(41) An information processing apparatus including a coefficient derivation unit that derives a coefficient of a reflection model of light on a surface of an object having a three-dimensional shape, a prediction unit that derives a predicted value of a reflected light intensity that is attribute data of a point cloud representing the object as a set of points, by performing prediction processing by using the reflection model and the coefficient, a generation unit that generates a predictive residual that is a difference between the reflected light intensity and the predicted value derived by the prediction unit, and an encoding unit that encodes the predictive residual generated by the generation unit.

(42) The information processing apparatus according to (41), in which the reflection model is a diffuse reflection model, and the coefficient derivation unit is configured to derive, as the coefficients, a diffuse reflection coefficient representing a material of the object surface, distance attenuation representing attenuation of the light due to distance, and an incident angle of the light with respect to the object surface.

(43) The information processing apparatus according to (42), in which the coefficient derivation unit estimates the diffuse reflection coefficient of a target point on the basis of the diffuse reflection coefficient of a neighbor point positioned in vicinity of the target point.

(44) The information processing apparatus according to (43), in which the coefficient derivation unit estimates the diffuse reflection coefficient of the target point on the basis of the diffuse reflection coefficient of a nearest neighbor point positioned in nearest vicinity of the target point.

(45) The information processing apparatus according to (43) or (44), in which the coefficient derivation unit estimates the diffuse reflection coefficient of the target point on the basis of the diffuse reflection coefficient of the neighbor point positioned within a predetermined distance from the target point.

(46) The information processing apparatus according to any one of (43) to (45), in which the coefficient derivation unit estimates the diffuse reflection coefficient of the target point on the basis of the diffuse reflection coefficient of the neighbor point in a predetermined reference relation determined in advance.

(47) The information processing apparatus according to any one of (42) to (46), in which the coefficient derivation unit derives the diffuse reflection coefficient of a target point on the basis of the reflected light intensity of the target point, the prediction unit derives the predicted value by using the diffuse reflection coefficient derived by the coefficient derivation unit, and the encoding unit encodes the diffuse reflection coefficient derived by the coefficient derivation unit.

(48) The information processing apparatus according to (47), in which the coefficient derivation unit derives the diffuse reflection coefficient for each point, the prediction unit derives the predicted value of the target point by using the diffuse reflection coefficient of the target point, and the encoding unit encodes the diffuse reflection coefficient for each point.

(49) The information processing apparatus according to (47) or (48), in which the coefficient derivation unit derives the diffuse reflection coefficient for each of a plurality of points, the prediction unit derives the predicted value of the target point by using a latest the diffuse reflection coefficient, and when the coefficient derivation unit derives the diffuse reflection coefficient, the encoding unit encodes the diffuse reflection coefficient.

(50) The information processing apparatus according to any one of (47) to (49), in which the coefficient derivation unit derives the diffuse reflection coefficient when a predetermined condition is satisfied, the prediction unit derives the predicted value of the target point by using a latest the diffuse reflection coefficient, and when the coefficient derivation unit derives the diffuse reflection coefficient, the encoding unit encodes the diffuse reflection coefficient.

(51) The information processing apparatus according to (50), in which the coefficient derivation unit derives the diffuse reflection coefficient when an amount of change in geometry of the target point is equal to or greater than a predetermined threshold value.

(52) The information processing apparatus according to (47), in which the coefficient derivation unit derives the diffuse reflection coefficient for first the target point, the prediction unit derives the predicted values for all points by using same the diffuse reflection coefficient, and the encoding unit encodes the diffuse reflection coefficient when the coefficient derivation unit derives the diffuse reflection coefficient.

(53) The information processing apparatus according to any one of (42) to (52), in which, on the basis of a predetermined condition, the coefficient derivation unit estimates the diffuse reflection coefficient of a target point on the basis of the diffuse reflection coefficient of a neighbor point positioned in vicinity of the target point, or derives the diffuse reflection coefficient of the target point on the basis of the reflected light intensity of the target point.

(54) The information processing apparatus according to (53), in which, when there is the neighbor point within a predetermined distance from the target point, the coefficient derivation unit estimates the diffuse reflection coefficient of the target point on the basis of the diffuse reflection coefficient of the neighbor point, and when there is no the neighbor point within the predetermined distance from the target point, the coefficient derivation unit derives the diffuse reflection coefficient of the target point on the basis of the reflected light intensity of the target point.

(55) The information processing apparatus according to any one of (42) to (54), in which the coefficient derivation unit derives the distance attenuation according to a model of attenuation of the light due to distance.

(56) The information processing apparatus according to any one of (42) to (55), in which the coefficient derivation unit derives the distance attenuation on the basis of predetermined table information.

(57) The information processing apparatus according to any one of (42) to (56), in which the coefficient derivation unit derives the incident angle by using a normal vector of the object surface and an incident vector indicating an incident direction of the light.

(58) The information processing apparatus according to (57), in which the encoding unit encodes the incident vector used for derivation of the incident angle.

(59) The information processing apparatus according to (57) or (58), in which the coefficient derivation unit estimates the normal vector of a target point on the basis of a geometry of the target point, and derives the incident angle by using estimated the normal vector.

(60) The information processing apparatus according to any one of (57) to (59), in which the coefficient derivation unit estimates the normal vector of a target point on the basis of a geometry of a neighbor point positioned in vicinity of the target point, and derives the incident angle by using estimated the normal vector.

(61) The information processing apparatus according to (60), in which the coefficient derivation unit estimates the normal vector of the target point on the basis of geometries of a predetermined number of the neighbor points, and derives the incident angle by using estimated the normal vector.

(62) The information processing apparatus according to (60) or (61), in which the coefficient derivation unit estimates the normal vector of the target point on the basis of a geometry of the neighbor point in a predetermined reference relation determined in advance, and derives the incident angle by using estimated the normal vector.

(63) The information processing apparatus according to any one of (57) to (62), in which the encoding unit encodes the normal vector used for derivation of the incident angle.

(64) The information processing apparatus according to any one of (41) to (63), in which the reflection model is a specular reflection model, and the coefficient derivation unit is configured to derive, as the coefficients, a specular reflection coefficient and diffuse reflection coefficient representing a material of the object surface, distance attenuation representing attenuation of the light due to distance, and an incident angle of the light with respect to the object surface.

(65) The information processing apparatus according to (64), in which the coefficient derivation unit applies a predetermined constant as the specular reflection coefficient.

(66) The information processing apparatus according to (64) or (65), in which the coefficient derivation unit estimates the specular reflection coefficients and diffuse reflection coefficients of a plurality of neighbor points positioned in vicinity of a target point by using the reflected light intensities of the neighbor points, and estimates the specular reflection coefficient and diffuse reflection coefficient of the target point by using estimated the specular reflection coefficients and diffuse reflection coefficients of the neighbor points.

(67) The information processing apparatus according to any one of (64) to (66), in which the encoding unit encodes the specular reflection coefficient and the diffuse reflection coefficient that are derived by the coefficient derivation unit.

(68) The information processing apparatus according to any one of (41) to (67), in which the coefficient derivation unit derives the coefficient of a specular reflection model when a predetermined condition is satisfied, and derives the coefficient of a diffuse reflection model when the condition is not satisfied.

(69) The information processing apparatus according to (68), in which the coefficient derivation unit derives the coefficient of the diffuse reflection model when a difference in angle between an incident angle of the light with respect to the object surface and a normal vector of the object surface is equal to or greater than a predetermined threshold value, and derives the coefficient of the specular reflection model when the difference in angle is smaller than the threshold value.

(70) The information processing apparatus according to any one of (41) to (69), in which the coefficient derivation unit derives the coefficient of the reflection model specified by a control flag, between a diffuse reflection model and a specular reflection model, and the encoding unit encodes the control flag.

(71) An information processing method including deriving a coefficient of a reflection model of light on a surface of an object having a three-dimensional shape, deriving a predicted value of a reflected light intensity that is attribute data of a point cloud representing the object as a set of points, by performing prediction processing by using the reflection model and the coefficient, generating a predictive residual that is a difference between the reflected light intensity and derived the predicted value, and encoding generated the predictive residual.

REFERENCE SIGNS LIST

300 Encoding apparatus
301 Geometry data encoding unit
302 Geometry data decoding unit
303 Point cloud generation unit
304 Attribute data decoding unit
305 Bitstream generation unit
321 Control unit
331 Coefficient derivation unit
332 Prediction unit
333 Predictive residual generation unit
334 Encoding unit
500 Decoding apparatus
501 Encoded data extraction unit
502 Geometry data decoding unit
503 Attribute data decoding unit
504 Point cloud generation unit
521 Control unit
531 Decoding unit
532 Coefficient derivation unit
533 Prediction unit
534 Generation unit
900 Computer

The invention claimed is:

1. An information processing apparatus comprising:

a decoding unit that generates a predictive residual that is a difference between a reflected light intensity that is attribute data of a point cloud representing an object having a three-dimensional shape as a set of points and a predicted value of the reflected light intensity generated by using a reflection model of light on a surface of the object, by decoding encoded data of the predictive residual;

a coefficient derivation unit that derives a coefficient of the reflection model;

a prediction unit that derives the predicted value by performing prediction processing by using the reflection model and the coefficient; and a generation unit that generates the reflected light intensity by adding the predictive residual obtained by the decoding unit and the predicted value derived by the prediction unit.

2. The information processing apparatus according to claim 1, wherein the reflection model is a diffuse reflection model, and the coefficient derivation unit is configured to derive, as the coefficients, a diffuse reflection coefficient representing a material of the object surface, distance attenuation representing attenuation of the light due to distance, and an incident angle of the light with respect to the object surface.

3. The information processing apparatus according to claim 2, wherein the coefficient derivation unit estimates the diffuse reflection coefficient of a target point on a basis of the diffuse reflection coefficient of a neighbor point positioned in vicinity of the target point.

4. The information processing apparatus according to claim 3, wherein the coefficient derivation unit estimates the diffuse reflection coefficient of the target point on a basis of the diffuse reflection coefficient of a nearest neighbor point positioned in nearest vicinity of the target point.

5. The information processing apparatus according to claim 3, wherein the coefficient derivation unit estimates the diffuse reflection coefficient of the target point on a basis of the diffuse reflection coefficient of the neighbor point positioned within a predetermined distance from the target point.

6. The information processing apparatus according to claim 3, wherein the coefficient derivation unit estimates the diffuse reflection coefficient of the target point on a basis of the diffuse reflection coefficient of the neighbor point in a predetermined reference relation determined in advance.

7. The information processing apparatus according to claim 2, wherein the coefficient derivation unit applies the diffuse reflection coefficient used for generation of the predictive residual of a target point.

8. The information processing apparatus according to claim 2, wherein, on a basis of a predetermined condition, the coefficient derivation unit estimates the diffuse reflection coefficient of a target point on a basis of the diffuse reflection coefficient of a neighbor point positioned in vicinity of the target point, or applies the diffuse reflection coefficient used for generation of the predictive residual of the target point.

9. The information processing apparatus according to claim 2, wherein the coefficient derivation unit derives the incident angle by using a normal vector of the object surface and an incident vector indicating an incident direction of the light.

10. The information processing apparatus according to claim 9, wherein the coefficient derivation unit derives the incident angle by applying the normal vector used for generation of the predictive residual of a target point.

11. The information processing apparatus according to claim 1, wherein the reflection model is a specular reflection model, and the coefficient derivation unit is configured to derive, as the coefficients, a specular reflection coefficient and diffuse reflection coefficient representing a material of the object surface, distance attenuation representing attenuation of the light due to distance, and an incident angle of the light with respect to the object surface.

12. The information processing apparatus according to claim 11, wherein the coefficient derivation unit estimates the specular reflection coefficients and diffuse reflection coefficients of a plurality of neighbor points positioned in vicinity of a target point by using the reflected light intensities of the neighbor points, and estimates the specular reflection coefficient and diffuse reflection coefficient of the target point by using estimated the specular reflection coefficients and diffuse reflection coefficients of the neighbor points.

13. The information processing apparatus according to claim 11, wherein the coefficient derivation unit applies the specular reflection coefficient and diffuse reflection coefficient used for generation of the predictive residual of a target point.

14. The information processing apparatus according to claim 1, wherein the coefficient derivation unit derives the coefficient of a specular reflection model when a predetermined condition is satisfied, and derives the coefficient of a diffuse reflection model when the condition is not satisfied.

15. An information processing method comprising:

generating a predictive residual that is a difference between a reflected light intensity that is attribute data of a point cloud representing an object having a three-dimensional shape as a set of points and a predicted value of the reflected light intensity generated by using a reflection model of light on a surface of the object, by decoding encoded data of the predictive residual;

deriving a coefficient of the reflection model;

deriving the predicted value by performing prediction processing by using the reflection model and the coefficient; and generating the reflected light intensity by adding the predictive residual obtained by decoding the encoded data and derived the predicted value.

16. An information processing apparatus comprising:

a coefficient derivation unit that derives a coefficient of a reflection model of light on a surface of an object having a three-dimensional shape;

a prediction unit that derives a predicted value of a reflected light intensity that is attribute data of a point cloud representing the object as a set of points, by performing prediction processing by using the reflection model and the coefficient;

a generation unit that generates a predictive residual that is a difference between the reflected light intensity and the predicted value derived by the prediction unit; and an encoding unit that encodes the predictive residual generated by the generation unit.

17. The information processing apparatus according to claim 16, wherein the reflection model is a diffuse reflection model, and the coefficient derivation unit is configured to derive, as the coefficients, a diffuse reflection coefficient representing a material of the object surface, distance attenuation representing attenuation of the light due to distance, and an incident angle of the light with respect to the object surface.

18. The information processing apparatus according to claim 17, wherein the coefficient derivation unit derives the diffuse reflection coefficient of a target point on a basis of the reflected light intensity of the target point, the prediction unit derives the predicted value by using the diffuse reflection coefficient derived by the coefficient derivation unit, and the encoding unit encodes the diffuse reflection coefficient derived by the coefficient derivation unit.

19. The information processing apparatus according to claim 16, wherein the reflection model is a specular reflection model, and the coefficient derivation unit is configured to derive, as the coefficients, a specular reflection coefficient and diffuse reflection coefficient representing a material of the object surface, distance attenuation representing attenuation of the light due to distance, and an incident angle of the light with respect to the object surface.

20. An information processing method comprising:

deriving a coefficient of a reflection model of light on a surface of an object having a three-dimensional shape;

deriving a predicted value of a reflected light intensity that is attribute data of a point cloud representing the object as a set of points, by performing prediction processing by using the reflection model and the coefficient;

generating a predictive residual that is a difference between the reflected light intensity and derived the predicted value; and encoding generated the predictive residual.

* * * * *